April 21, 1931. C. E. CHALMERS 1,801,801
MULTIPLE FARE COLLECTING AND CHANGE MAKING MACHINE
Filed April 12, 1929 16 Sheets-Sheet 1

INVENTOR
Charles. E. Chalmers
BY
Bohleber & Ledbetter
ATTORNEYS

April 21, 1931.   C. E. CHALMERS   1,801,801
MULTIPLE FARE COLLECTING AND CHANGE MAKING MACHINE
Filed April 12, 1929    16 Sheets-Sheet 4

INVENTOR
Charles E. Chalmers
BY Bohleber & Ledbetter
ATTORNEYS

April 21, 1931.  C. E. CHALMERS  1,801,801
MULTIPLE FARE COLLECTING AND CHANGE MAKING MACHINE
Filed April 12, 1929    16 Sheets-Sheet 5

INVENTOR
Charles E. Chalmers
BY Bohleber & Ledbetter
ATTORNEYS

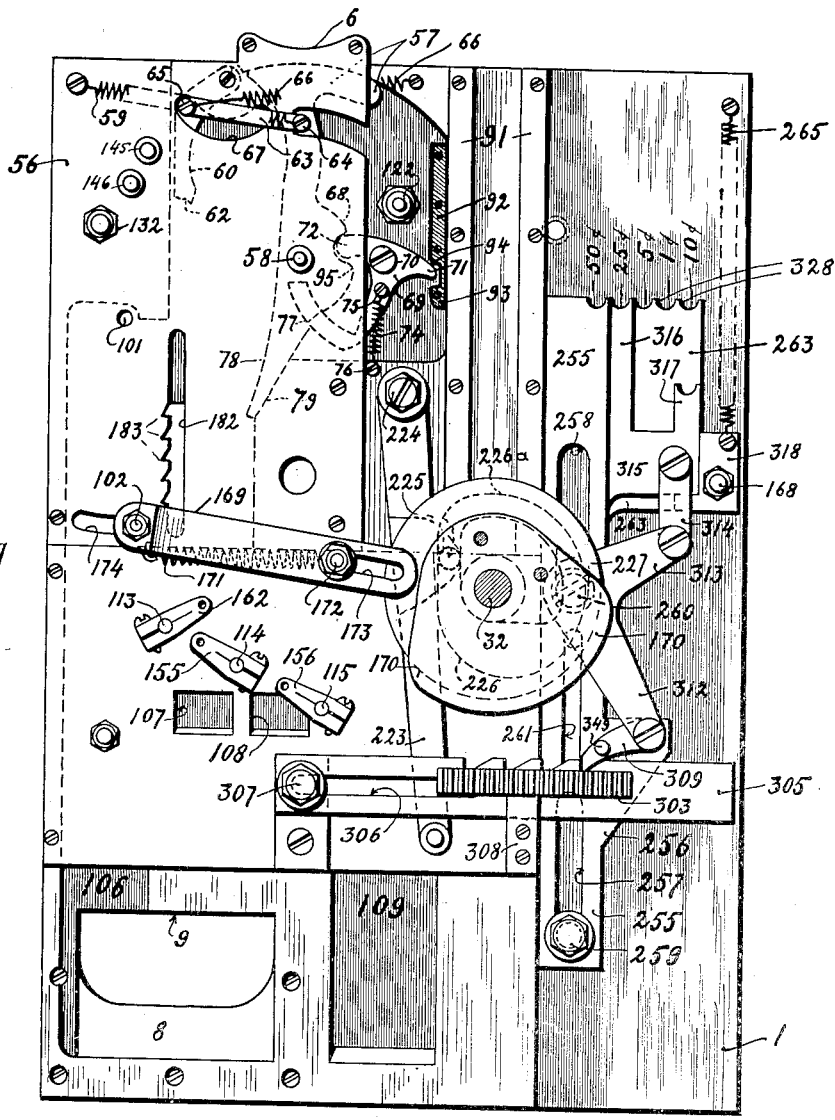

April 21, 1931.  C. E. CHALMERS  1,801,801
MULTIPLE FARE COLLECTING AND CHANGE MAKING MACHINE
Filed April 12, 1929   16 Sheets-Sheet 7
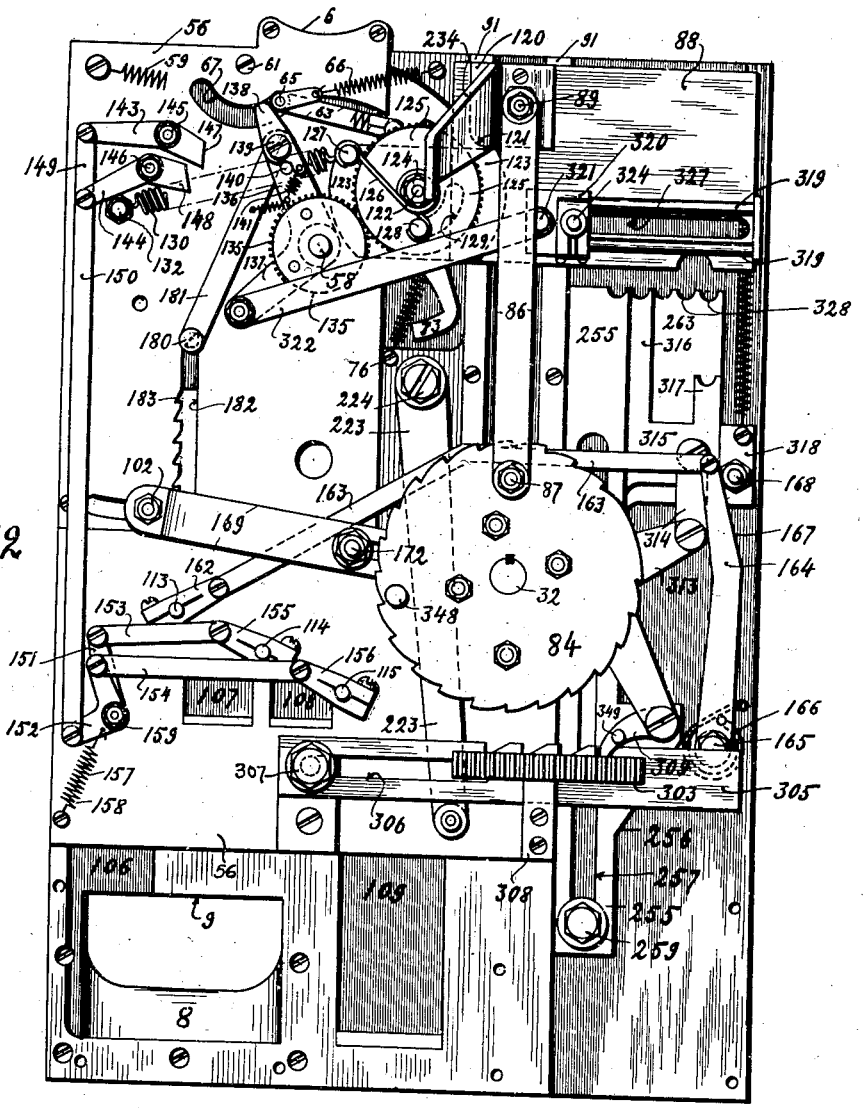
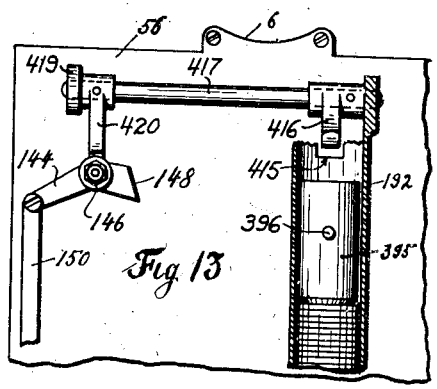
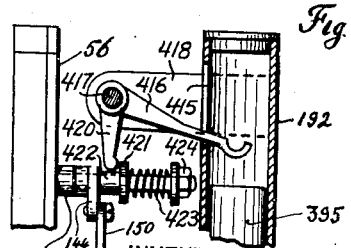
INVENTOR
*Charles E. Chalmers*
BY
*Bohleber + Ledbetter*
ATTORNEYS

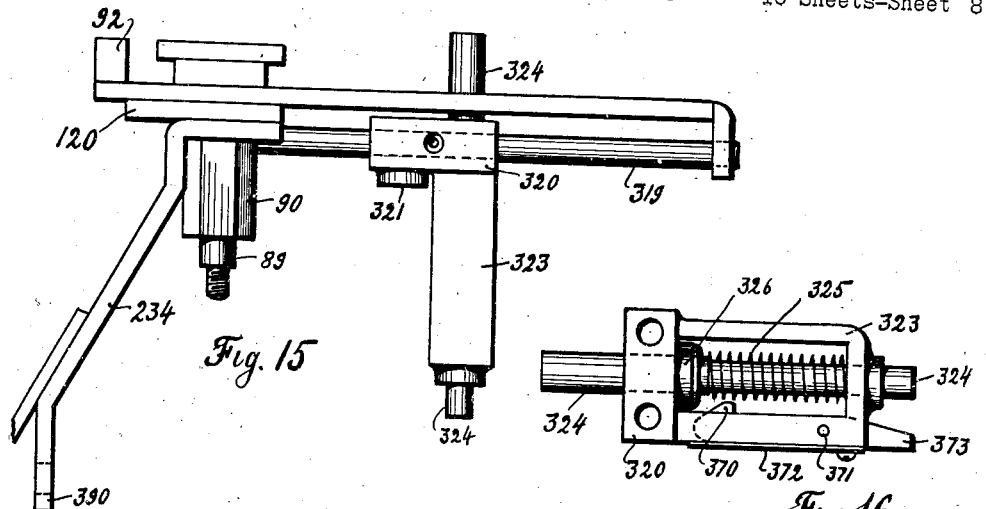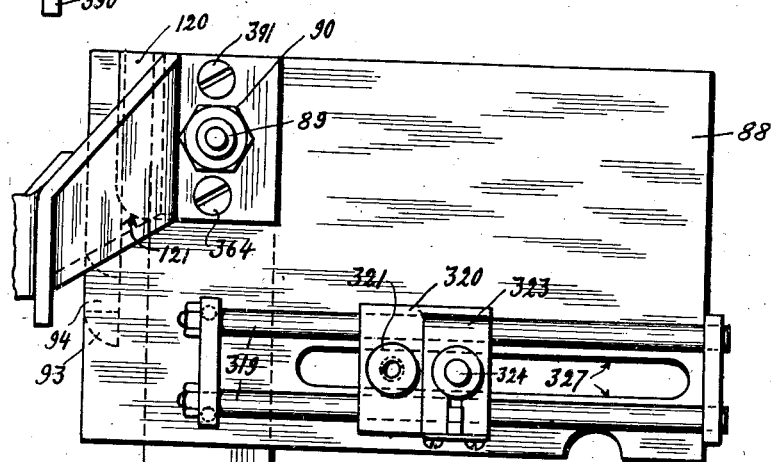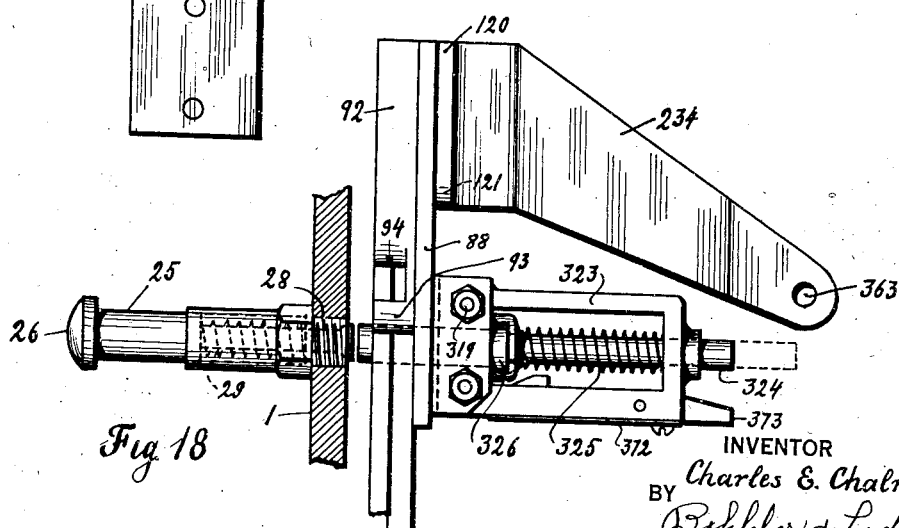

April 21, 1931.    C. E. CHALMERS    1,801,801
MULTIPLE FARE COLLECTING AND CHANGE MAKING MACHINE
Filed April 12, 1929    16 Sheets-Sheet 9
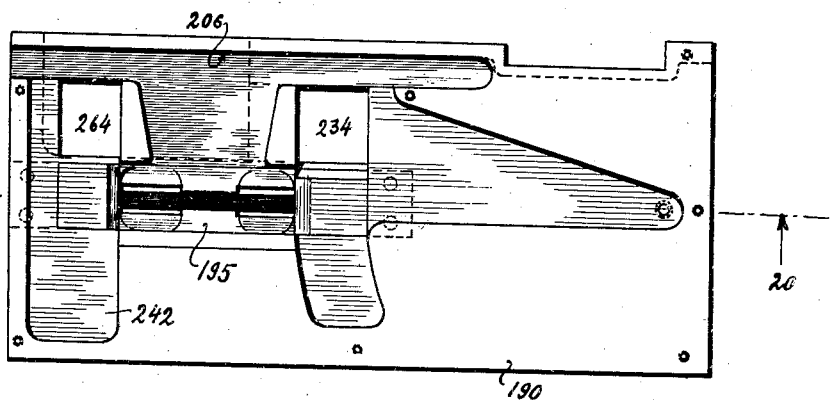
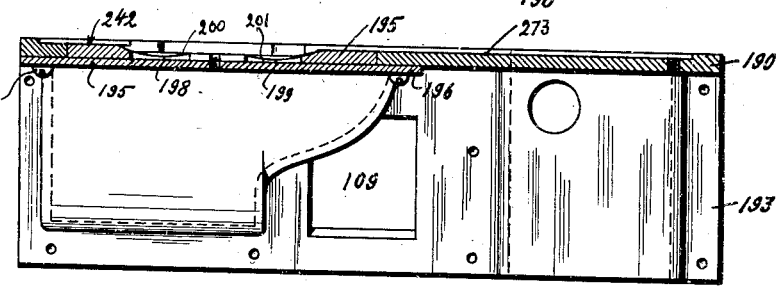
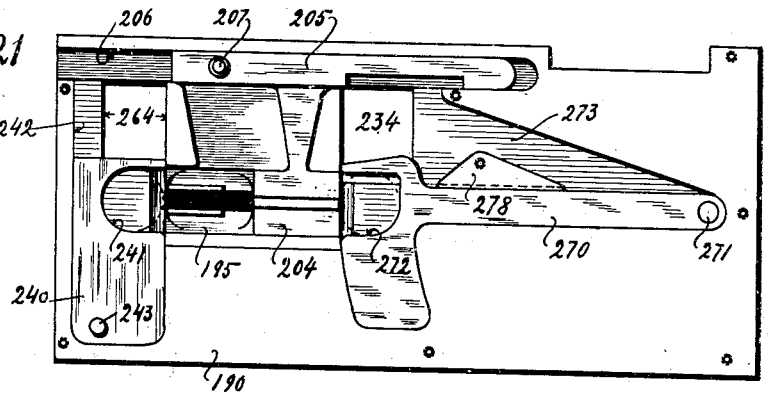
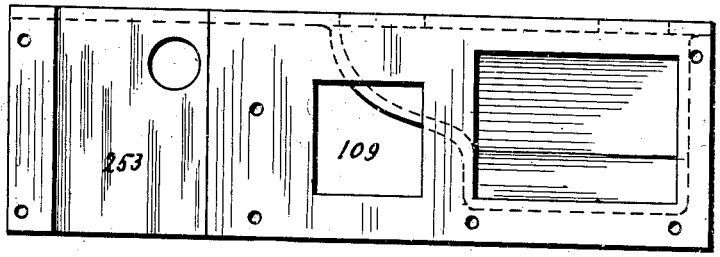
INVENTOR
*Charles E. Chalmers*
BY
*Bohleber & Ledbetter*
ATTORNEYS April 21, 1931. C. E. CHALMERS 1,801,801
MULTIPLE FARE COLLECTING AND CHANGE MAKING MACHINE
Filed April 12, 1929 16 Sheets-Sheet 10
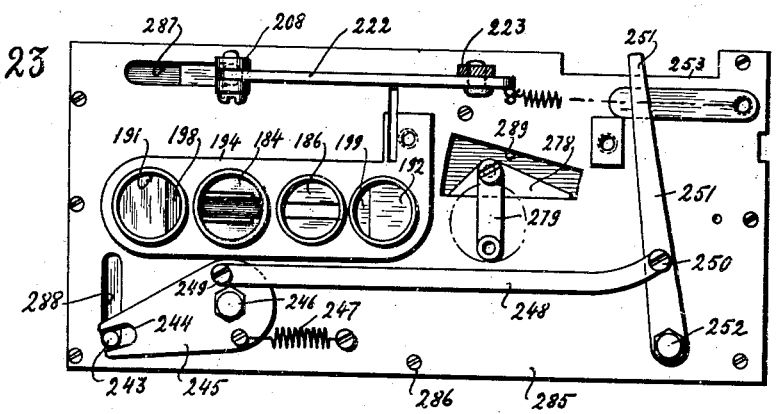
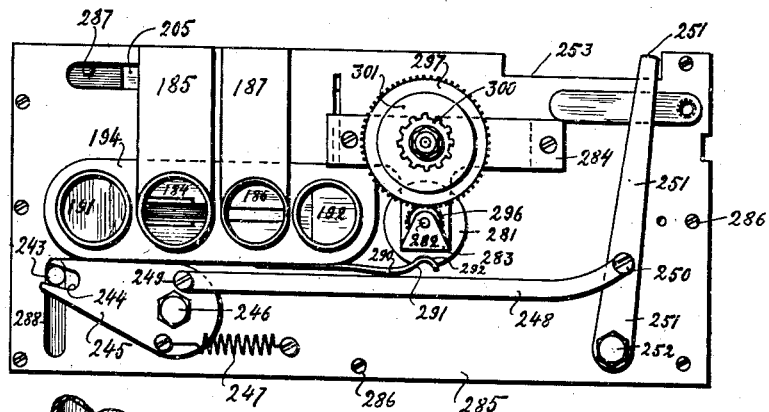
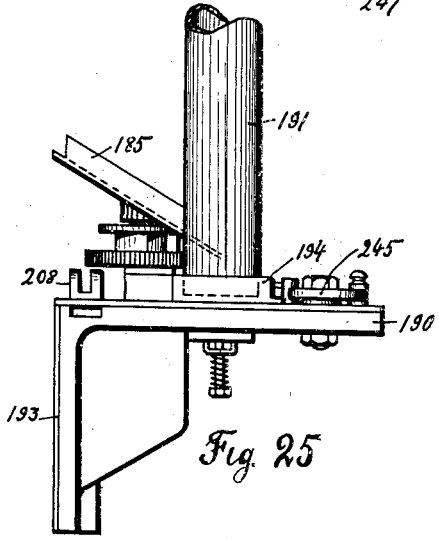
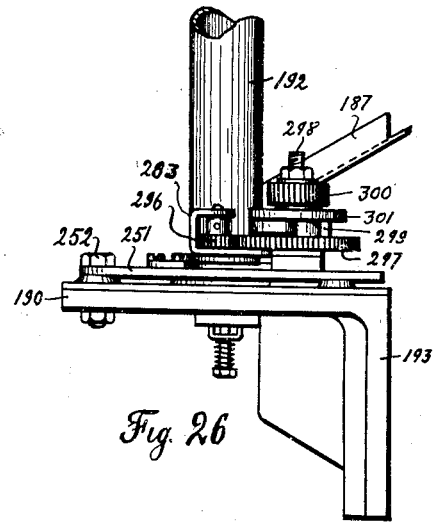
INVENTOR
Charles E. Chalmers
BY
Bohleber + Ledbetter
ATTORNEYS April 21, 1931. C. E. CHALMERS 1,801,801
MULTIPLE FARE COLLECTING AND CHANGE MAKING MACHINE
Filed April 12, 1929 16 Sheets-Sheet 11
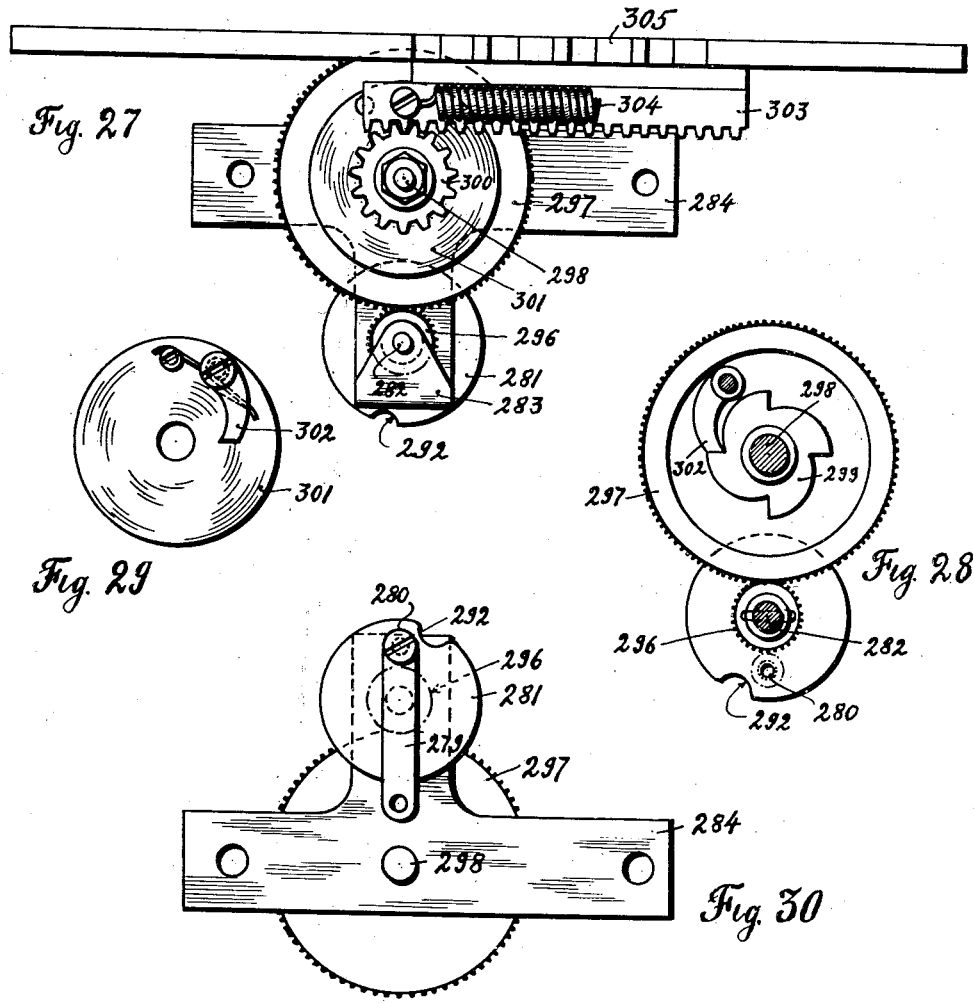
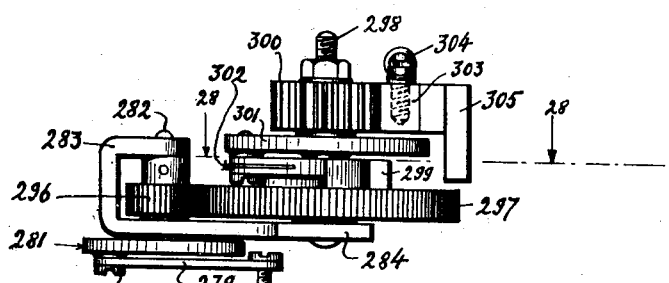
INVENTOR
Charles E. Chalmers
BY
Bohleber + Ledbetter
ATTORNEYS

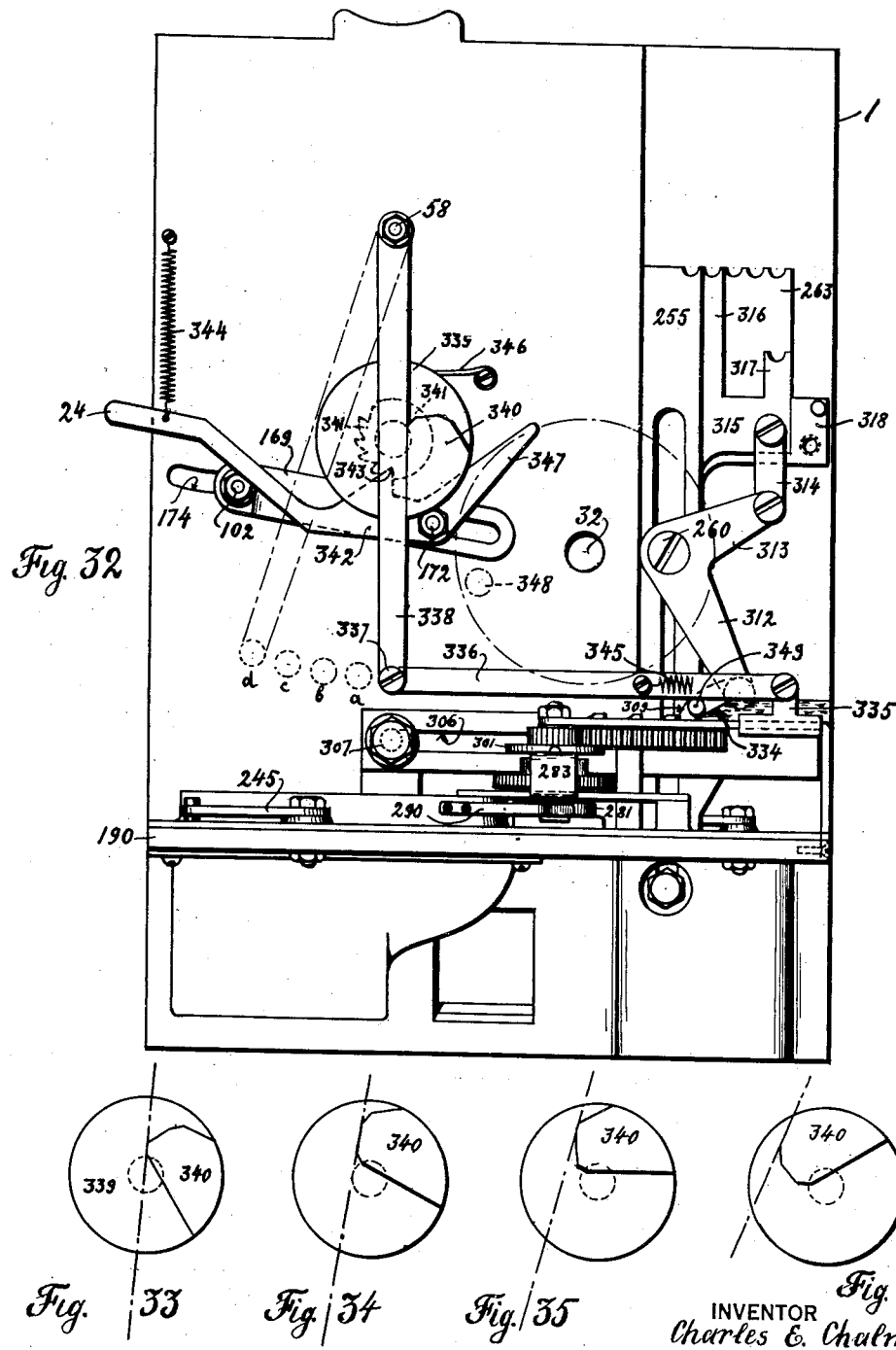

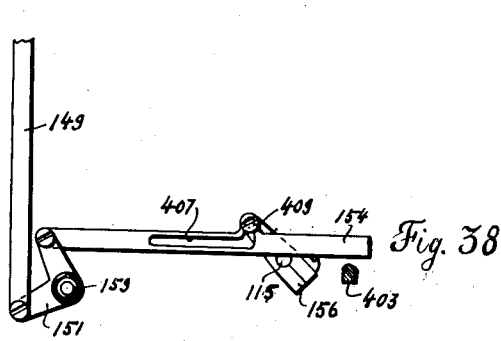
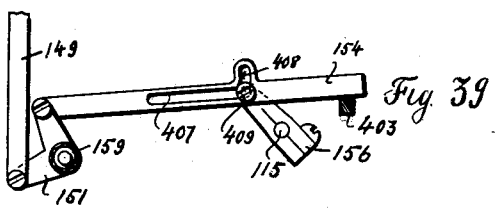
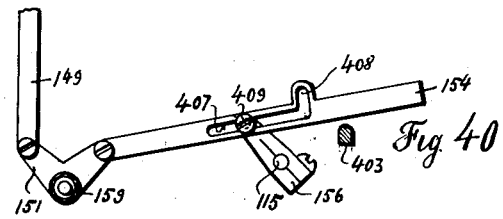
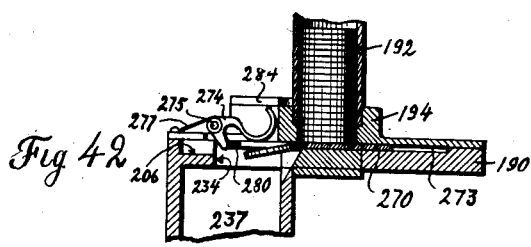
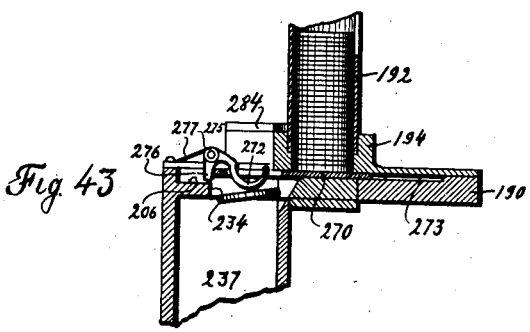
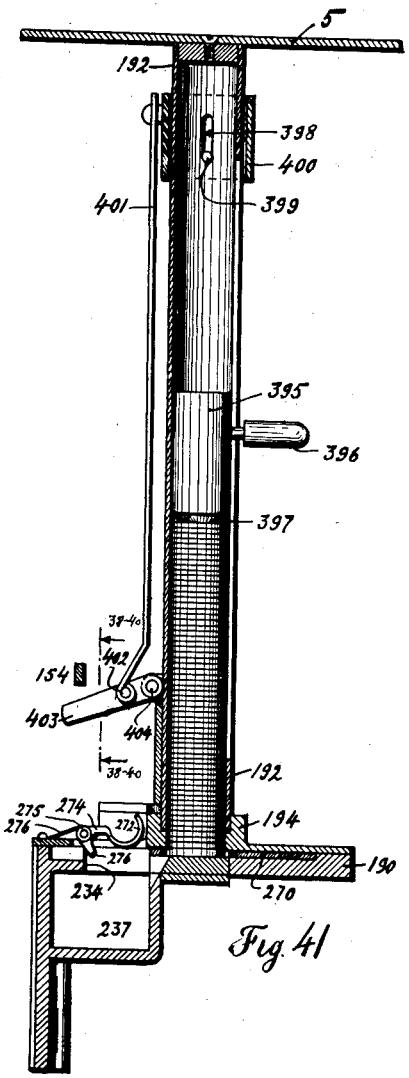

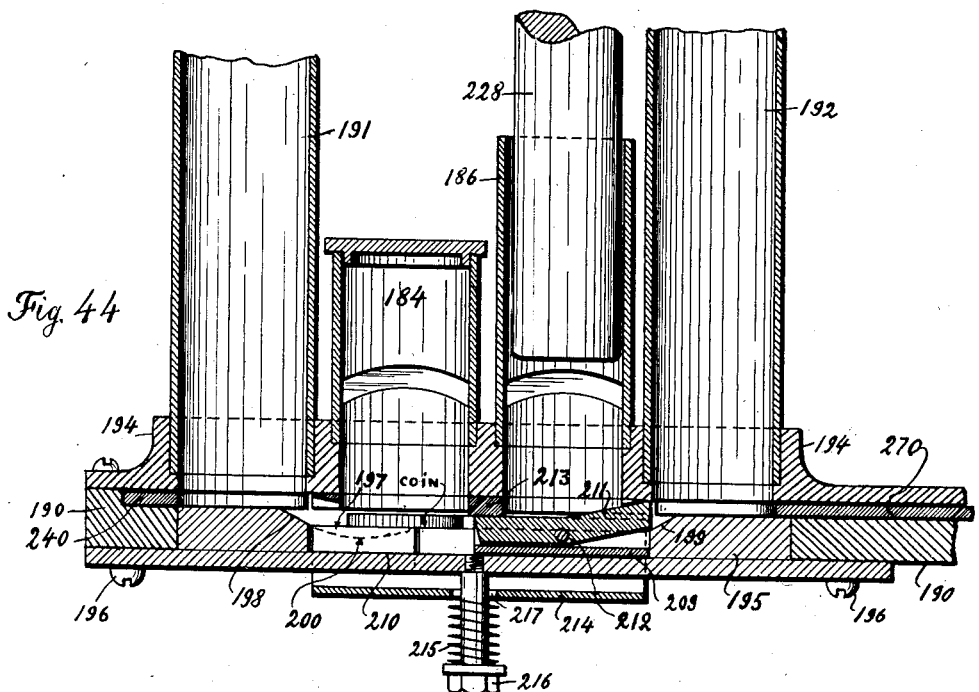
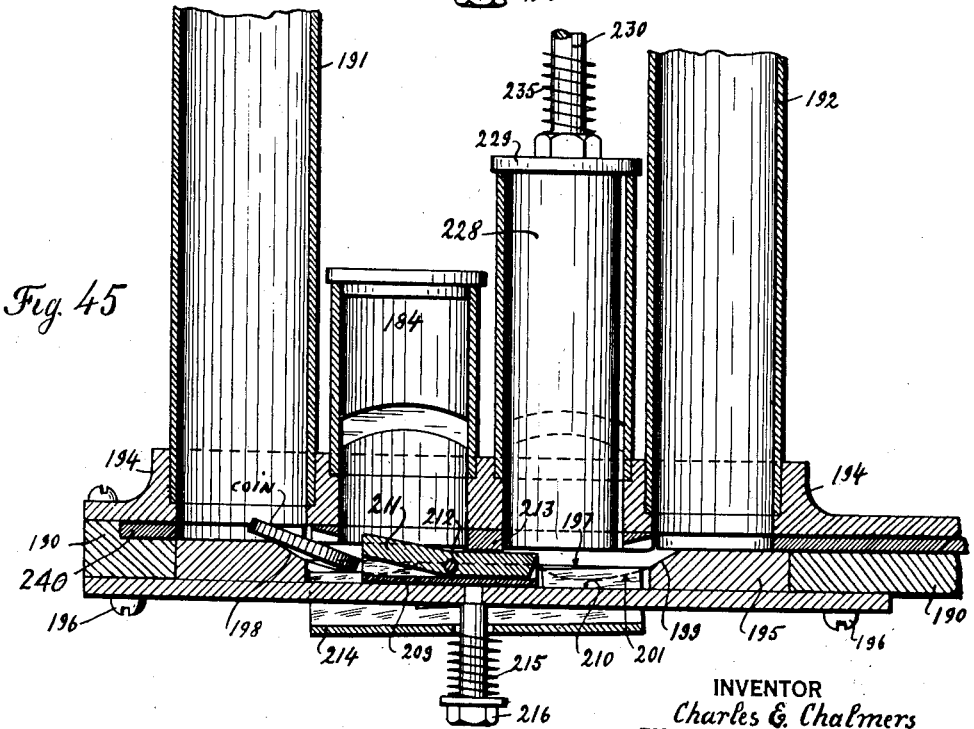

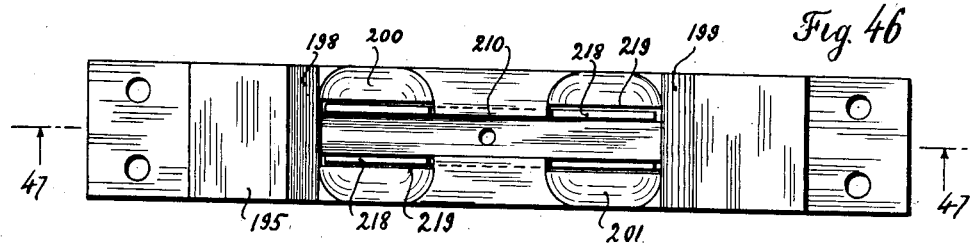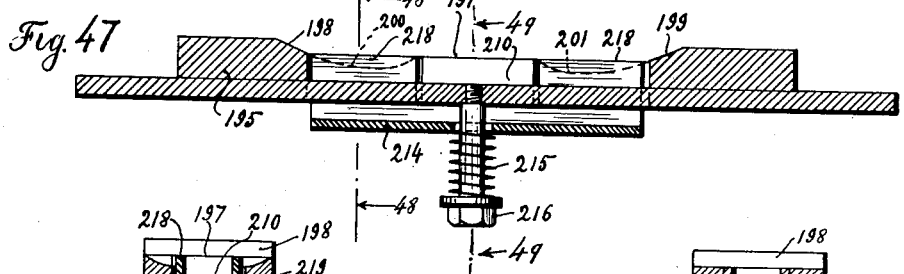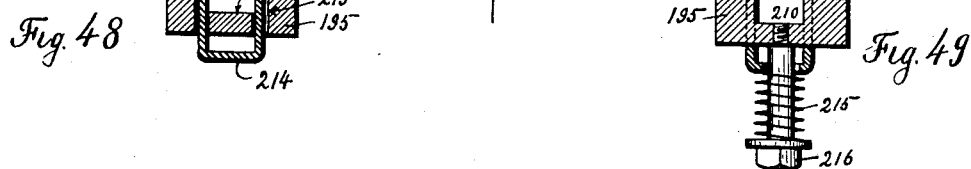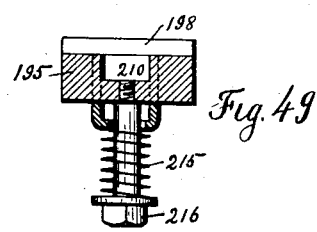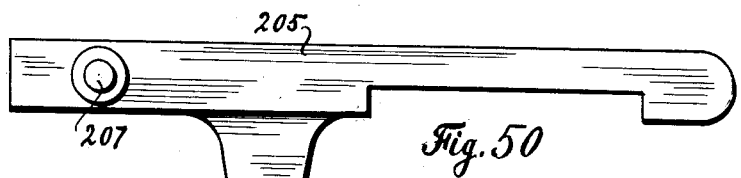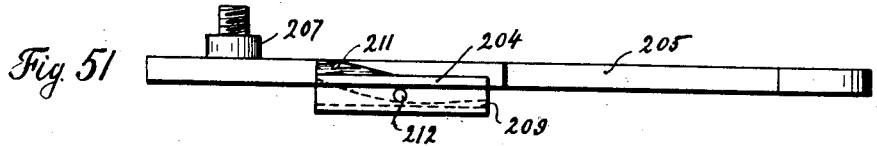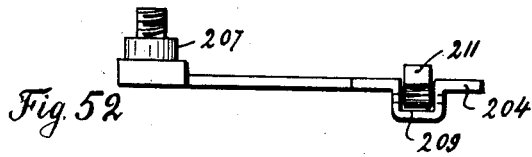

Patented Apr. 21, 1931

1,801,801

UNITED STATES PATENT OFFICE

CHARLES E. CHALMERS, OF NEW YORK, N. Y.

MULTIPLE-FARE-COLLECTING AND CHANGE-MAKING MACHINE

Application filed April 12, 1929. Serial No. 354,491.

This invention relates to apparatus or a machine adapted for use in collecting money and making change in places where admission is charged, as for example, street cars and the like, and in stores where commodities are sold, and contemplates a machine which will eliminate or minimize the "human factor" and the possibility of mistake and dishonesty on the part of persons charged with collecting such money, and is particularly well adapted for use where the collector has other duties to perform, such as on so-called "one-man cars" where the motorman is required to collect fares, make change and act as conductor.

It is an object of this invention to provide a machine which will be entirely automatic in its operation, and which will be capable of operation by anyone, to receive coins, to collect and register the desired amount and return the necessary change in case the amount to be collected is less than the amount of the coin deposited.

It is a further object of this invention to provide a machine of the class described which cannot be fraudulently operated to cause return of a greater amount in change than the amount deposited, and which will be positive and reliable in operation at all times.

It is a further object of this invention to provide a machine, which when slightly modified, is capable of use as a mechanical change maker, and which will return the full amount deposited, but in other coins.

Finally, and in general, it is an object of this invention to provide a compact, reliable and inexpensive machine which may be used in the collection of money and making of change and particularly in cases where relatively large numbers of relatively small coins must be handled, and which will eliminate or minimize the loss due to mistake or dishonesty on the part either of the payer of the coin or the collector thereof.

The features of novelty which I believe to be characteristic of my invention are pointed out with particularity in the appended claims. My invention itself however, both as to its fundamental principles and as to its practical embodiments will best be understood by reference to the specification and accompanying drawings, in which—

Fig. 9 is a similar view on a plane nearer the rear of the machine and showing additional coin classifying and change making mechanism;

Fig. 10 is a more detailed view of the cam members on the operating shaft;

Fig. 11 is a side elevation of Fig. 10;

Fig. 12 is a view similar to Fig. 9 on a plane nearer the rear of the machine showing the coin distributing mechanism, coin classifier mechanism and additional change making mechanism;

Figs. 13 and 14 show the mechanism which automatically bypasses change coins when the change coin magazine is full.

Fig. 15 is a plan view of a detail of the change making mechanism;

Fig. 16 is a view of portions of the projecting and change making mechanism of Fig. 15;

Fig. 17 is an elevation of Fig. 15;

Fig. 18 shows the change making mechanism of Fig. 17 and its operative relation with the rejecting button;

Fig. 19 is a plan view of the sub-panel;

Fig. 20 is a section on the line 20—20 of Fig. 19;

Fig. 21 shows the coin ejectors mounted on the sub-panel of Fig. 19;

Fig. 22 is a front view of the sub-panel;

Fig. 23 is a view similar to Fig. 21 and shows additional change coin ejecting mechanism;

Fig. 24 is a similar view but in operative position and shows in addition the driving mechanisms for the change coin ejectors.

Fig. 25 is a view from the right side of the change coin storage receptacles;

Fig. 26 is a similar view from the left side of the change coin storage receptacles;

Fig. 27 is a detail view of additional change coin ejector driving mechanism;

Fig. 28 is a detail view of certain driving mechanism of Fig. 27;

Fig. 29 is a detail view of the ratchet mechanism of Fig. 28;

Fig. 30 is a view of the underside of the mechanism of Fig. 27;

Fig. 31 is a side elevation of Fig. 27;

Fig. 32 shows the multiple fare collecting and portions of the change making mechanisms;

Figs. 33, 34, 35 and 36 show the positions of the multiple fare controlling cam respectively for 2 fares, 3 fares, 4 fares and 5 fares.

Figure 37:
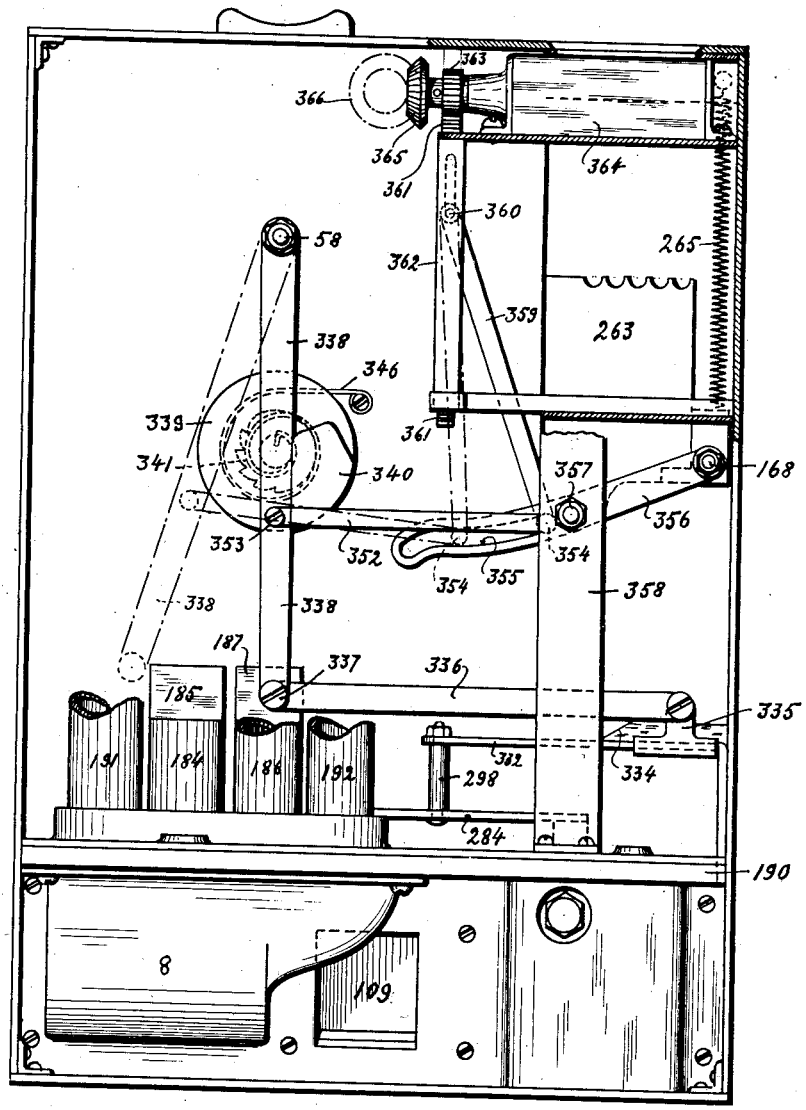

Fig. 37 shows the totalizing collector counter with its driving mechanisms and a portion of the multiple fare collecting mechanism;

Figs. 38, 39 and 40 show the details of the nickel gates for the coin distributing mechanism;

Fig. 41 is a section through the nickel change coin receptacle and nickel ejecting device;

Figs. 42 and 43 show a detail of the change coin ejector mechanism;

Figs. 44 and 45 are enlarged sectional views of the automatic magazine loading mechanism.

Fig. 46 is a plan view of the sub panel and shuttle slide.

Fig. 47 is a sectional view on line 47—47 of Fig. 46;

Fig. 48 is a sectional view on line 48—48 of Fig. 47;

Fig. 49 is a sectional view on line 49—49 of Fig. 47;

Fig. 50 is a plan view of the shuttle;

Fig. 51 is an elevational view of Fig. 50;

Fig. 52 is a side view of the shuttle of Fig. 50.

By way of example I have shown such a machine particularly adapted for use on street cars and which receives coins deposited by passengers in payment of fare, collects fares, makes and delivers change, and performs various other operations with a minimum of attention from the operator. According to my invention the machine is constructed and arranged to receive all coins in common use such for example as pennies, nickels, dimes, quarters and half-dollars, and is furthermore provided with selector mechanism by which the operator may indicate the number of fares to be collected or amount to be paid and also with an operating control by which he may then operate or clear the machine by a simple means, such as a crank, and the machine will collect the coin deposited by the passenger, record the number or amount of fares paid and return or deliver to the passenger the proper amount of change in accordance with the denomination of coin deposited and the amount to be collected.

To illustrate the adaptability of the machine, if the price of the fare is 5¢ and the passenger upon entering has a nickel, he will deposit the same in the coin receptor slot. The operator may then operate or clear the machine by rotating the crank and the machine will collect and register the nickel deposited by the passenger. If however, the passenger deposits a dime instead of a nickel, upon operation or clearing of the machine by the crank just as before, the dime will be collected, one fare registered, and a nickel will be returned to the passenger without any action by the operator except that of turning the crank. Similarly if the passenger deposits a quarter in payment of one fare, upon operation of the machine the quarter will be collected, one fare registered and four nickels returned or delivered to the passenger. Similarly if the passenger deposits a half-dollar, upon operation of the machine it will collect the coin, register one fare and return to the passenger the proper change consisting of a quarter and four nickels and all without requiring any adjustment or control by the operator, except to turn the crank.

If, however, the passenger desires to pay more than one fare the machine may be set to collect the number desired. For example, if the passenger deposits a dime in payment of two fares the machine may be set to collect two fares, and upon operation of the machine, the dime will be collected, two fares registered and no change returned. If the passenger deposits a quarter in payment of two fares, operation of the machine will collect the quarter, record two fares and return three nickels to the passenger. Similarly if a passenger deposits a half-dollar the machine will collect the same, record two fares and return the proper change consisting of a quarter and three nickels. Similar action takes place for the payment of three fares and four fares when the passenger deposits a quarter or a half-dollar. If the passenger deposits a half-dollar for the payment of five fares operation of the machine will collect the coin deposited and return the proper change consisting of one quarter. It is to be noted that in all cases the change consists of nickels and quarters. Pennies and dimes are not delivered by the machine as change for reasons which will be understood later.

If through mistake or dishonesty a passenger deposits a coin insufficient for the payment of the fare, or deposits a counterfeit or slug, the machine may be operated to return the coin or slug deposited to the passenger and will not record the collection of a fare. It will however record a rejected coin for purposes to be explained later.

The machine is preferably so arranged that only one coin at a time may be deposited under any conditions as otherwise, in the embodiment of the invention illustrated and described, this might interfere with the proper operation of the machine and cause the incorrect amount of change to be delivered as will be more clearly explained later.

For convenience of description and understanding of my invention the mechanism will be subdivided and explained with reference to the various sub-divisions and to the cooperation of the various sub-divisions with one another. In general my invention contemplates (1) coin-receptor mechanism; (2) coin classifying apparatus; (3) coin distributing mechanism; (4) change delivery mechanism; (5) multiple fare mechanism; (6) collection counting mechanism; (7) rejection mechanism; and (8) full change coin receptacle mechanism.

The coin receptor mechanism comprises a slot of suitable dimensions to receive any coin deposited by the passenger and convey it to the coin classifier which comprises apparatus adapted to receive the coin deposited and to classify it according to size and value. Each of the different sized coins finally comes to rest in a different position in the classifier, for example, dimes in one place, pennies in another, nickels in another and so on. Both of these mechanisms (1) and (2) are operated simply and solely by the insertion of a coin by the passenger; in other words no operation by the operator or conductor is required to cause the machine to receive a coin and classify it, whereas all other mechanisms are operated by the one operating or clearing control. The coin distributor (3) distributes the various coins in accordance with a predetermined plan; for instance, nickels are deposited in a nickel receptacle, unless the receptacle is full, and quarters in a quarter receptacle, while dimes, half-dollars and pennies are delivered to a third receptacle adapted to receive all three. The change delivery mechanism (4) delivers to passengers the proper amount of change in nickels or nickels and quarters depending upon the denomination of the coins deposited and the number of fares to be paid. In case a passenger desires to pay more than one fare the operator will bring into opertion the multiple fare mechanism (5) which controls the change delivery mechanism to deliver the proper change in accordance with the coin deposited and the number of fares to be paid. In all cases of fare collection the collection counter mechanism (6) will be operated to record the number of fares collected per trip and the total number of fares which have passed through the machine since beginning operation.

A rejection mechanism (7) which is operable by the conductor to return to the passenger the coin deposited when desired, renders the change delivery mechanism (4) and the collection counting mechanism inoperative to prevent the delivery of change and the indication of a collection of fare. Separate rejection counters, however, record the number of rejections of each sized coin made by the machine. Finally full change coin receptacle mechanism (8) is provided which prevents the operation of the gate which directs the nickel into the nickel passage when the nickel change coin receptacle is full and allows it to pass to the general coin receptacle provided primarily for pennies, dimes and half-dollars. In addition, various interlocking devices between the groups of mechanism already referred to, serve to prevent the operation of certain groups of mechanism under particular conditions as will be later explained.

*External features*

Figure 1:
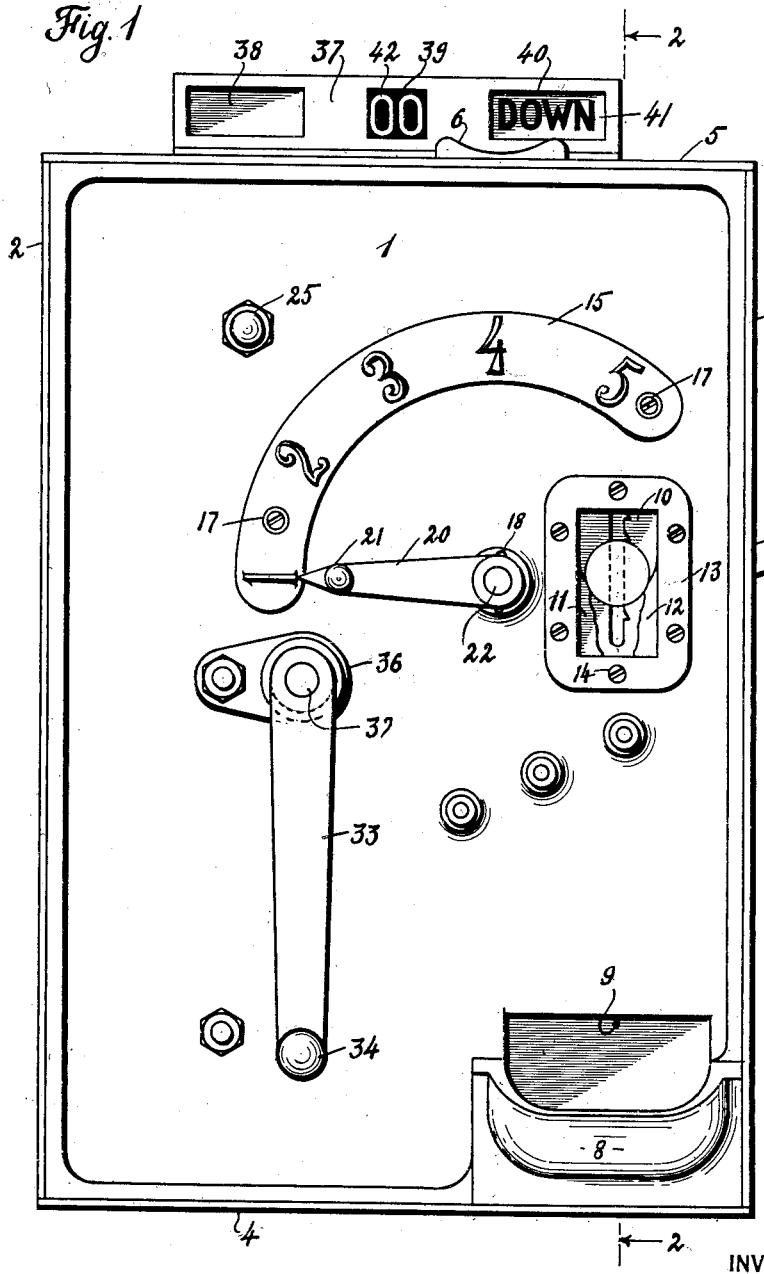
Fig. 1 is a front elevation of the machine according to my invention.
Figure 2:
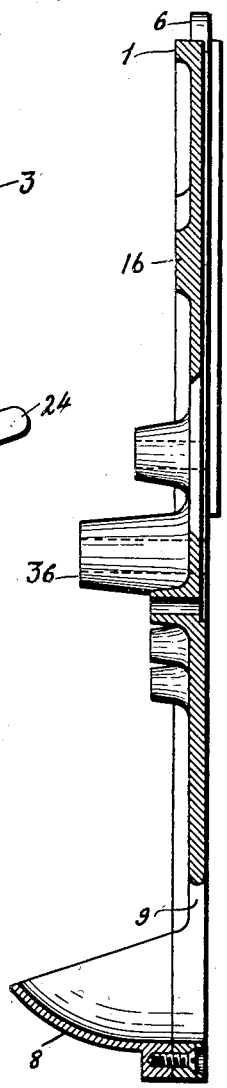
Fig. 2 is a sectional view of the front plate of the machine taken on line 2—2 of Fig. 1.

Referring to Fig. 1, 1 designates the front panel or wall of the machine and 2, 3, 4 and 5 the side, bottom and top walls respectively. The coin receptor 6 has a slot 7 (see Fig. 7) in which the passenger deposits his coin in payment of a fare or fares. A change delivery cup or receptacle 8 is provided into which the machine delivers the change or rejected coins through the perforation 9 in the front wall 1 of the machine. An inspection window 10 enables the conductor or collector to observe the coin deposited by the passenger in operative position in the machine, as it is arrested or held in the jaws 11 and 12 respectively in Fig. 7, of the coin classifier or gauge which will later be described in more detail. A suitable frame 13 for the window 10, removably secured to the front plate 1 by the screws 14, permits easy removal of the glass for any desired purpose.

A fare dial 15 shown in Fig. 1 provided with figures indicating the number of fares to be collected, is preferably in the form of a curved metal strip which is secured to a boss 16 on the front wall 1 of the machine by suitable screws 17. A fare selector 20 is provided to select and indicate the number of fares which the machine is set to collect and for convenience in operating, the fare selector has a suitable projecting fingerpiece or handle 21. The fare selector is mounted for rotation upon fare selector shaft 22 and held in position thereon by a pin 18 passing through the fare selector 20 and through the fare selector shaft 22 respectively. An error or correcting lever 24 is provided and projects through the side panel so that in case the fare selector has been set to collect the wrong number of fares, the correcting lever 24 may be operated to enable the fare selector to be returned to normal position and reset.

A rejector pin 25 (Fig. 3) permits the operator to reject the deposited coin from the machine when desired for any reason whatever and an operating button 26 on the end of the pin serves as a stop to limit the inward movement of the pin. The rejector pin 25 is slidably mounted in a boss 27 fixed to the front panel. This boss may be threaded as at 28 (see Fig. 18) into the front panel or a boss integral with the panel may be used. The spring 29 holds the ejector pin in its outer retracted position.

A main operating or clearing shaft 32 is equipped with an operating arm 33 carrying a suitable knob or handle 34 which is secured to the main operating shaft in any known way, as for example by a pin 35 passing through the arm 33 and shaft 32. For the purpose of strengthening the machine and providing a large bearing surface for the main operating or control shaft an outwardly extending boss 36 is employed which is secured to the front plate 1.

A trip indicator 37 having a window 39 indicates the number of fares collected per trip. The windows 38 and 40 are arranged to display an indicator of the designation of the trip such as sign 41 while window 39 is arranged to show a fare register 42 for indicating the number of fares collected per trip.

Figure 3:
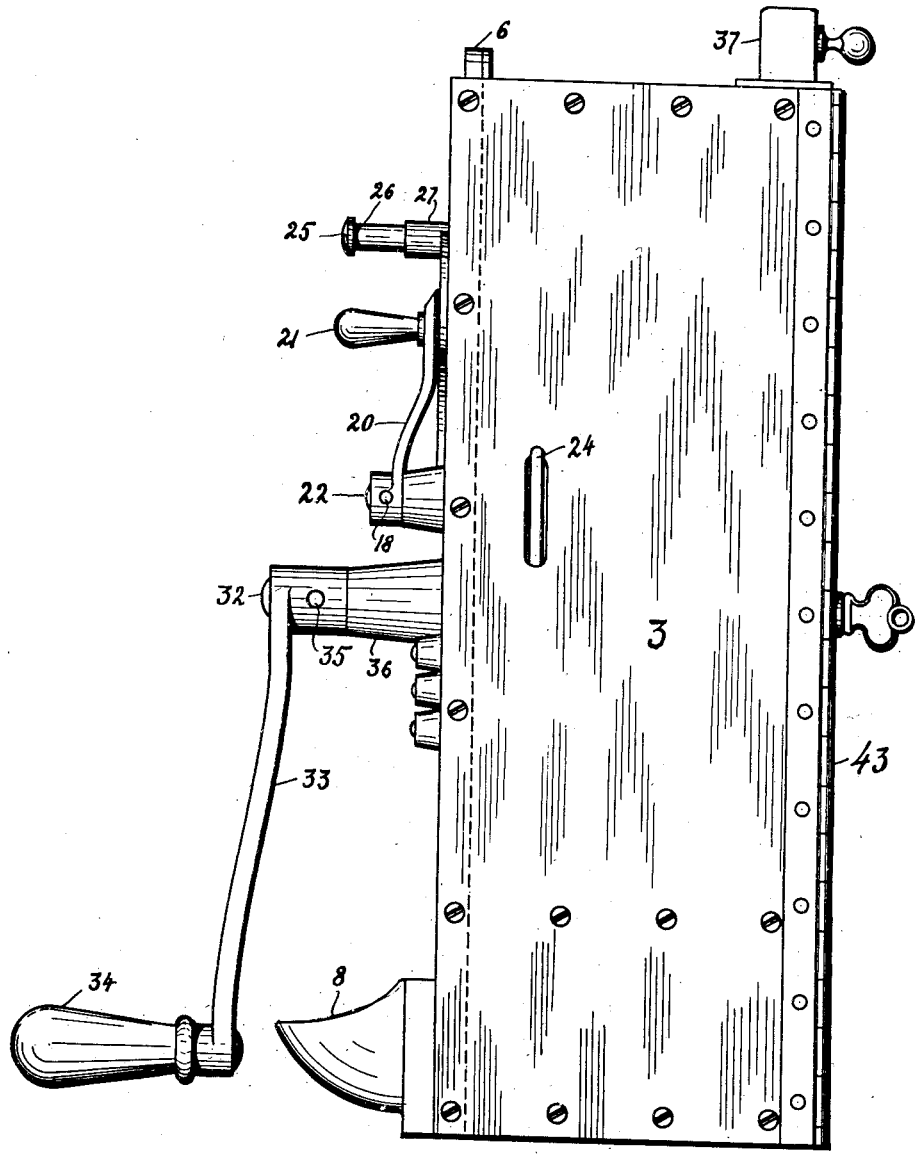
Fig. 3 is a view from the right side of the machine.
Figure 4:
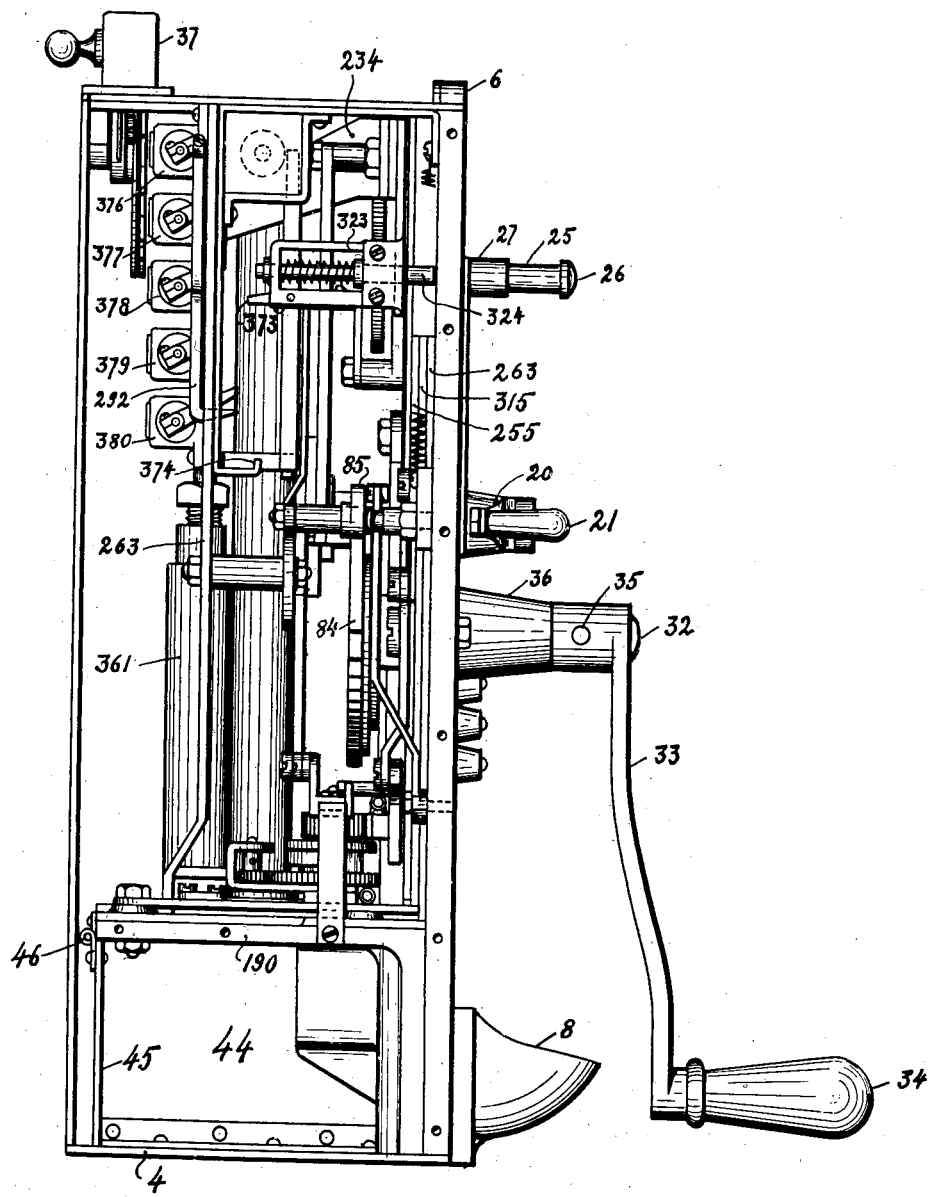
Fig. 4 is a view from the left side of the machine with the side panel removed showing the interior mechanism.
Figure 5:
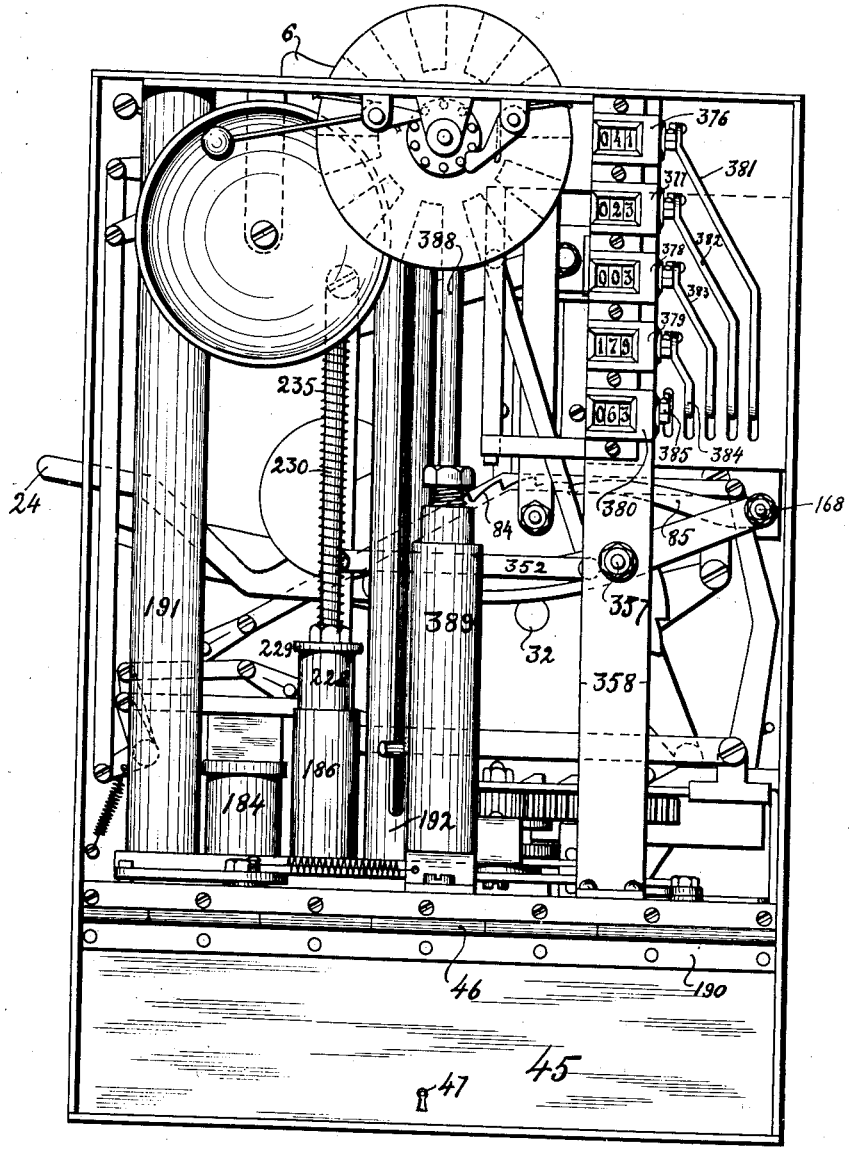
Fig. 5 is a rear view of the machine with the rear panel removed.

In order to render the interior of the machine easily accessible as illustrated by Fig. 5, the rear panel as shown in Fig. 3 is hinged at 43 and the panel may be locked to prevent tampering with the mechanism by the operator or by any unauthorized person. Figs. 4 and 5 also show the large general coin storage receptacle or chamber 44 provided for all pennies, dimes, and half-dollars, and for the excess nickels which will be referred to and described in detail, which may be reached through a plate 45 hinged at 46 and provided with a lock 47. The coins reach this coin receptacle through a passageway 109 as shown in Figs. 9, 12 and 37.

Coin receptor mechanism

Figures 7, 8:
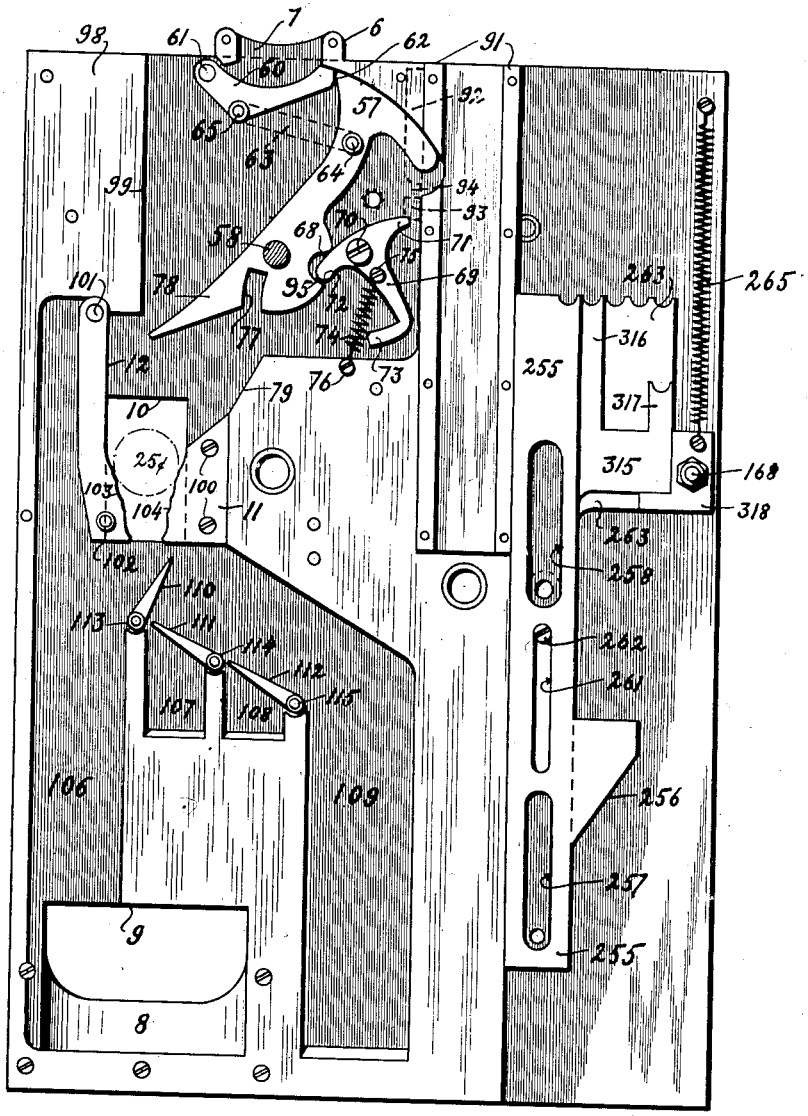
Fig. 7 shows the coin receptor, coin classifier, coin distribution gates and passages and a portion of the change making mechanism as secured to the front panel.
Fig. 8 is a plan view of Fig. 2.

Referring now more particularly to Fig. 7 the slot 7 of the coin receptor 6, already referred to, is of just sufficient width and depth to permit the largest coin to be used by the machine to pass readily therein. In this example the slot is just of sufficient size to allow a half-dollar to pass readily through the passage. The back of the slot 7 is formed by a backing plate 56 (see Fig. 9), and a suitable shutter 57 is provided which is adapted, inter alia, to swing across the slot when a coin is deposited to prevent the reception by the machine of more than one coin at a time.

The shutter 57 (Figs. 7 and 9) is pivoted on a rod 58 for swinging movement to the position indicated in Fig. 9 by dotted lines to which position it is biased by shutter spring 59. The shutter is normally held in the position shown in Fig. 7 against the tension of spring 59 by a suitable coin trigger 60 pivoted at 61 for swinging movement to the position shown in Fig. 9 and having a notch 62 in its free end. A connecting rod 63 is pivoted at one end as at 64 to shutter 57 and at the other end as at 65 to the coin trigger 60. A lost motion arrangement, such as providing a hole through the trigger slightly larger than the pivot screw 65, permits of a slight amount of lost motion between coin trigger 60 and connecting rod 63, the purpose of which is to enable the shutter 57 to contact in the trigger notch 62 and thereby hold the trigger and shutter in coin receiving position as shown in Fig. 7. A trigger spring 66 (Fig. 9) has one end anchored to front panel 1 and its other end attached to connecting rod trigger pivot 65 (Fig. 7), which latter end travels in the slot 67 of plate 56. The shutter 57 is provided with an indentation or recess 68 and a shutter interlocking lever 69 is pivoted at 70 for swinging movement and has a pair of outwardly projecting arms 71 and 72, the latter arm projecting into recess 68 of the shutter, and a locking hook 73. The shutter interlocking lever 69 has an operating spring 74 connected at one end to pin 75 on lever 69 and at the other end to pin 76 forming a fixed point. The shutter 57 is provided with a locking slot 77 arranged to receive locking hook 73 on interlocking lever 69. The lower end of the shutter 57 has an extension 78 which cooperates with edge 79 to form a stop for the shutter to limit its swinging movement when released.

Referring now more particularly to Figs. 9, 11, 12, 15 and 17 the main operating shaft 32 is provided with a ratchet disc 84 engaged by pawl 85 (see Fig. 5) to permit counter-clockwise rotation only of shaft 32, or when considered from the front of the machine and the direction in which the operator's handle is turned the rotation is in a clockwise direction and to this disc is connected a connecting rod 86 pivoted eccentrically on disc 84 as at 87. A slider or sliding plate 88 is also provided and the upper end of connecting rod 86 is pivoted thereto as at 89 on slider connecting rod pivot boss 90 (Fig. 15). The slider plate 88 slides upward and downward in parallel slider guides 91 (see also Fig. 7). A shutter resetting bar 92 (Figs. 9 and 17) having a rounded interlocking lever engaging corner 93 and a shutter resetting slot 94, is secured to one edge of the slider block. Operation of the main operating arm 33, as will be understood, causes rotation of shaft 32 carrying with it ratchet disc 84 and thereby causes slider 88 to move downward and upward in slider guides 91 in much the same way as the piston and connecting rod of a steam engine slides in the cross head guides as will be readily understood.

It should be noted that shutter spring 59 (Fig. 9) is at least twice as strong as trigger spring 66, and also that the interlocking lever 69 is shown in its free position in Fig. 9 in which position the tension of the spring 74 causes lever 69 to take a position in which pivot 70, spring 74 and pins 75 and 76 all lie in the same straight line, thereby permitting lever 69 to rock either clockwise or counterclockwise from said position.

*Operation of coin receptor mechanism*

Assuming that the parts are in the position shown in Fig. 7 the machine is ready to receive a coin to be deposited by the passenger. The shutter 57 is held in the position shown by coin trigger 60 which extends across slot 7 and blocks for the time being the deposit of a coin. The notch 62 in the end of coin trigger 60 engages the end of shutter 57 so that a condition of equilibrium is obtained in which spring 59 (Fig. 9) is stretched and spring 66 is contracted. Arm 72 of locking arm 69 projects into the recess 68 and arm 71 of the locking arm extends laterally into the path of projection 93 of shutter resetting bar 92 as it moves downward with the slide 88. It will be noted that under these conditions the main operating arm 33 cannot be rotated because downward movement of plate 88 causes the shutter resetting bar 92 of the latter to impinge against arm 71 of lever 69, and lever 69 is held against rotation by reason of arm 72 extending into the recess 68 of the shutter 57 while the shutter is held against movement by coin trigger 60 as already explained. It will therefore be seen that unless a coin is deposited and the trigger released the machine cannot be operated.

When a coin is deposited, downward pressure on the coin displaces the notch 62 and releases the coin trigger 60 which holds the shutter 57 against the tension of spring 59. As the trigger 60 is pushed down slightly and released, pin 65 moves in slot 67 against the tension of spring 66, and shutter 57 is left free to swing over the coin slot. Spring 59 which is a more powerful spring than its opposing spring 66 draws the shutter 57 rapidly to the left covering the coin slot 7 and, in conjunction with the connecting rod 63 rotates coin trigger 60 against the tension of the relatively weak spring 66. The position of both the shutter and trigger at this stage of the operation is shown in Fig. 9. The connecting rod 63, pins 64 and 65 and the curve of the left side of shutter 57 are so constructed and arranged that the distance between shutter 57 and trigger 60 permit only one of the largest coins at a time to pass down into the machine. Also, it will be noted that rotation of shutter 57 frees arm 72 of lever 69 for rotation under the action of spring 74 which draws lever 69 to the position indicated in Fig. 9, in which interlocking hook 73 enters slot 77, but only partially yet sufficiently to lock shutter 57 in closed position while arm 71 of lever 69 continues to project into the path of downward movement of the bar 92 on the slider 88.

After the deposit of a coin it will be apparent that shutter 57 (Fig. 9) extends across the coin slot blocking the opening and preventing the deposit of an additional coin and cannot now be pushed back to open the slot because of the position of locking hook 73 in slot 77. It is also noted that the movement of shutter 57, by virtue of the shape of the upper end thereof, has impelled the coin downwardly through the passageway between the shutter 57 and trigger 60 to the coin classifier jaws 11 and 12 (Fig. 7) where it may be observed through the inspection window 10. If the operator desires to collect the coin he may do so by operating the control arm 33 by rotating it once in a clockwise direction. Passing over the action of the collecting mechanism which will be explained later, operation of the control arm resets the coin receptor mechanism in the following manner. Sliding plate 88 moves downwardly under the action of connecting rod 86 and since lever 69 is now free to rotate by a slight amount, the lower end 93 of bar 92 on the slider block 88 displaces arm 71 from its path of movement, rotating lever 69 in a clockwise direction and causing hook 73 to slide further into slot 77. When the slider 88 has reached its downward limit of travel it begins to return upward. It will be understood that arm 71 has been pressed against the side wall of bar 92 by the action of spring 74 and as notch 94 in slider 88 moves upward and passes arm 71 the latter is forced therein by the spring 74 so that the lower end 93 of bar 92 engages arm 71 and lever 69 is rotated in a counterclockwise direction withdrawing locking hook 73 from slot 77. Arm 72 impinges on projection 95 of shutter 57 thereby rotating the shutter in a clockwise direction from the position shown in Fig. 9 to the position shown in Fig. 7 against the tension of spring 59, while connecting rod 63 swings coin trigger 60 approximately to the position shown in Fig. 7. The trigger 60 is drawn into final position by the tension of spring 66; and by reason of lost motion between pin 65 and trigger 60, a slight amount of play is provided which permits the parts to reach equilibrium with the notch 62 in engagement with the pointed left hand side of shutter 57. The coin receptor mechanism has now been returned to the position from which it started and a complete cycle has been made.

Coin classifier

The coin deposited by the passenger passes through slot 7 (Fig. 7), between the edge of the coin trigger 60 and the shutter 57, said trigger and shutter defining a passageway which is of sufficient width to permit only one largest coin to pass therethrough at a time. The coin passes downwardly coming to rest between the fixed classifier jaw 11 and the movable classifier jaw 12. The coin is prevented from travelling sideways by reason of spacer plate 98 having a vertical edge 99 against which the edge of the coin is adapted to impinge and which also serves to separate backing plate 56 from front plate 1 and thereby provide space for the shutter and coin trigger already described. This space is of a thickness, from front to back, somewhat in excess of the thickest coin used, that is a half-dollar. The fixed classifier jaw 11 is secured to the front plate 1 by suitable means such as screws 100 and the movable jaw 12 is secured to front plate 1 by a suitable pivot pin 101 and is provided with a pivot pin 102 the purpose of which will be described later. Both the fixed jaw 11 and movable jaw 12 have edges provided with circular indentations 103 and 104 adapted to receive various coins at different positions depending upon their denomination; for example, a dime is supported at the lowest point, a penny at the next higher point, a nickel at the next higher, a quarter at the next higher, and a half-dollar at the top. The series of curves are provided for the purpose of supporting the coins of one denomination at approximately the same point regardless of whether the coin is worn or unworn.

Operation of coin classifier

The operation of the coin classifier is very simple and as already pointed out requires no operation of the mechanism of the machine. The coin deposited by the passenger, after being dropped, passes by gravity between the jaws 11 and 12 of the classifier and takes a position depending upon its size and remains in such position until released by an outward swinging movement of the movable jaw 12 on its pivot 101. The swinging movement of the jaw results from the operation of other mechanism which will be described later.

Coin distributor mechanism—gate control

A slot or passageway 107 (Fig. 7) is provided which I term a quarter passage and which receives only quarters. An additional passage 108 is also provided which receives only nickels. Finally a passage 109 is provided adapted to receive and convey pennies, dimes and half-dollars and also nickels and quarters when the nickels or quarters magazines are full, to receptacle 44. The passageway 106 serves to convey rejected coins to the change return cup 8. A pair of gates 111 and 112 are provided in the form of swinging arms which normally close or obstruct the quarter and nickel passages but which may be selectively swung out of the way to open either of these passages as desired. Another gate 110 is mounted for partial rotation on the shaft 113 and controls the rejector passage 106. This gate is normally open as shown in Fig. 7 so that in order to reject a coin, the coin only need be released from the classifier jaws and it drops by gravity through passage 106 to the cup 8. When the coin inserted in the machine is accepted by the operator this gate 110 is closed so as to cover the rejector passage 106 and the coin is thereby directed into the upper end of passage 109. The mechanism which operates and controls this gate will be described later. Gate 111 mounted on shaft 114 controls the quarter passage 107 and similarly gate 112 mounted on shaft 115 controls the nickel passage 108. It is clear that no gate is necessary to control passage 109 since if gates 110, 111 and 112 are all closed, coins drop by gravity into and through passage 109, and on the other hand if any one of the gates is open the coin is not permitted to pass through passage 109, because an open gate at any one of the passages 106, 107 or 108, is so arranged as to obstruct passage 109.

Referring now to Figs. 12–18, the main operating shaft 32 is provided with ratchet disc 84 as already described, connected through connecting rod 86 to slider 88. The slider 88 carries a projection 120, provided with a rounded lower end 121. The front plate 1 of the machine carries a stud 122 upon which is rotatably mounted a gear 125 carrying a hub. The nut 124 retains the gear on the stud. A cam plate 123 is rotatably mounted upon the hub of gear 125 although the cam plate may be separately mounted upon the stud 122 or the cam plate may carry the hub and the gear mounted upon this hub. A yielding driving connection consisting of the spring 126 which is secured at one end to the pin 127 on the cam plate and the other to the pin 128 on the gear with one or more turns of the intermediate portion circling the stud 122 or the hub to give sufficient flexibility. A resilient or yieldable driving connection between the plate and gear is thus provided such that rotation of plate 123 in a clockwise direction drives the gear 125 through spring 126 whereas rotation of the plate 123 in a counter-clockwise direction drives gear 125 through a rigid connection formed by pin 128 and a circular slot 129. A master return spring 130 of sufficient strength to return all parts of the mechanism to normal position is provided having one end attached to pin 127 on plate 123 and having the other end attached to a suitable fixed point 132. A suitable gear 135 is mounted for rotation on rod 58 and arranged to mesh with gear 125. A bell crank lever having arms 136 and 137 is provided likewise mounted for rotation on the stud 58 and connected rigidly to gear 135. A lever arm 138 is pivoted at 139 on arm 136 and is provided with a stop or limit pin 140 which prevents rotation of lever arm 138 from its normal position about pivot 139 in a clockwise direction. For the purpose of enabling a limited rotation of arm 138 about pivot 139 in a counter-clockwise direction spring 141 is provided connected at one end to a suitable point on arm 138 and at the other end to a suitable point on lever 136.

Bell crank levers 143 and 144 are provided mounted upon pivots 145 and 146, and having arms 147 and 148. Bell crank lever 143 is pivotally connected to connecting rod 149 and bell crank lever 144 is similarly pivotally connected to connecting rod 150. At its lower end the connecting rod 149 is pivotally connected to one arm of bell crank lever 151 and the other arm of bell crank lever 151 is connected through connecting rod 153 to lever arm 155 mounted on shaft 114 to which is secured the quarter gate 111 (Fig. 7). In a similar manner the lower end of connecting rod 150 is connected to one arm of bell crank lever 152, the other arm of which is connected to connecting rod 154, which is connected in turn to arm 156 mounted on shaft 115 carrying the nickel gate 112 (Fig. 7). Suitable springs 157 and 158 are provided to hold bell crank levers 151 and 152 in their normal positions shown in Fig. 12. The bell crank levers 151 and 152 are mounted on a suitable pivot 159 and limited in their rotation under the pull of springs 157 and 158 by the gates 111 and 112 when they assume a closed position in the side of passage 109.

The mechanism controlling gates 111 and 112 has been described and there remains gate 110 which normally closes passage 109 as shown in Fig. 7, and the passage 106 leading to the cup 8 is therefore normally open so that if the classifier jaw is operated with the gate 110 in the position shown in Fig. 7, the coin would be ejected from the machine. Coins accepted by the operator require therefore the operation of gate 110 to direct the accepted coin into the machine and the mechanism to effect such operation will now be described. Gate 110 is mounted on shaft 113 which has a lever 162 (Fig. 12) secured thereto on the other side of the plate 56 from the gate. The end of the lever 162 is pivotally connected to one end of a long bar 163 which is bent in order to avoid other mechanism and the other end of bar 163 is connected to the end of a cam lever 164 which is pivoted at 165 and is normally impelled to the right by the coiled spring 166. This spring also retains the gate 110 in open position through the various levers and bar just described. Cam lever 164 has a cam edge 167 which is directly in the path of a pin 168 mounted upon the vertical slider 263 (Fig. 12). The means by which the slider 263 secures its vertical movement will be described, it being sufficient to know for an understanding of the mechanism controlling gate 110 that this slider is stationary and has no vertical movement when a deposited coin is to be rejected by the operator. For every accepted coin, the slider 263 moves downward and closes gate 110 through the agency of the mechanism described.

As will be seen in Fig. 9 a push rod 169 is connected to the pivot 102 (Fig. 7) in the movable classifier jaw 12 said push rod being operable by means of cam 170 secured to the main shaft 32. The push rod 169 is normally maintained at its right hand extremity of movement by means of spring 171 having one end suitably connected to the push rod and its other end connected to a guide pin 172 mounted on the plate member 1 and projecting through a slot 173 in the push rod. The pivot 102 of the push rod is connected to the movable classifier jaw through the arcuate slot 174 in the plate 56. One or both of the slots 173 and 174 serve as limit stops for the push rod 169 to keep the latter out of contact with the cam 170 excepting when the push rod is being operated.

Referring now more particularly to Fig. 12, there is provided positioning means or a feeler finger 180 mounted on feeler finger push rod 181 which is pivoted at 139 to the lever arm 136. Feeler finger 180 projects through feeler finger slot 182 which is approximately centered with respect to the position of rest of the coins in the coin classifier. The feeler finger slot 182 has a series of feeler finger notches 183 along one edge. There is one such notch for each denomination of coin, the top notch being provided for half-dollars, the one below it for quarters, the next for nickels, and the last two for pennies and dimes respectively. Each notch is positioned so that it is approximately on a level with or preferably slightly below the level of the upper edge of its respective coin as it rests in the classifier. Finally, a suitable receptacle 184 (Figs. 24–26) is provided for the quarters delivered through delivery passage 107 and the chute 185 leading to receptacle 184 and similarly, a nickel receptacle 186 is provided for the nickels delivered through passage 108 and the chute 187 leading to said receptacle 186.

The feeler finger slots 182 has been shown as vertical or approximately coinciding with the axis of the classifier or to express it differently approximately coinciding with the centers of the coins as they rest in the classifier jaws. In the preferred structure however the feeler finger slot extends at an angle to the axis of the classifier so that when a coin is viewed through the slot the edge of the coin has a distinct angle or incline with respect to the sides of the slot. The feeler finger therefore engages this incline of the coin edge and the feeler finger is readily directed into its respective notch. Where the slot coincides with the axis of the classifier or the center lines of the coins as they rest in the classifier the coin edge is at right angles or practically flat with respect to the edges of the slot 182 and the feeler finger engages the flat coin edges and is not as easily directed into its respective notch 183.

*Operation of coin distributor mechanism— Gate control*

It has already been pointed out that the main operating shaft 32 cannot be rotated until a coin has been deposited and has found its way to the coin classifier. Assuming that a coin has been deposited which has taken up its proper position in the coin classifier the next operations are as follows: Main shaft 32 is rotated in a counter-clockwise direction as viewed from Fig. 12 by rotation of the main operating crank 33, which causes downward movement of slider 88 as already described. The rounded end 121 of projection 120 impinges upon cam plate 123 and rotates the same in a clockwise direction driving gear 125 through spring 126 as already described, and thereby driving gear 135 in a counter-clockwise direction. The rotation of gear 135 causes similar rotation of lever arm 136 rigidly connected thereto and feeler finger 180 is pushed downwardly in slot 182 by the action of connecting rod 181 until it comes in contact with the edge of the coin between the classifier jaws and is deflected by the coin edge into its respective notch 183. Further downward movement of the feeler finger 180 is thereby prevented which in turn prevents further rotation of arm 136, gear 135 and gear 125. The cam plate 123 however is permitted to continue its rotation because of its yieldable driving connection with the gear 125 through the spring 126 and slot 129. Further rotation of the main shaft 32 brings cam 170 (Fig. 9) against the end of push rod 169 and forces the same to the left thereby swinging the movable classifier jaw 12 (Fig. 7) to the left about its pivot 101 and enabling the coin to drop by gravity through the spread or open classifier jaws.

Before the coin is released from between the jaws of the classifier, assuming, of course, that the coin is accepted by the operator, the gate 110 must be closed. It is to be understood that gate 110 closes for all accepted coins and only remains open when a coin is to be rejected. As previously mentioned sliding plate 263 moves downward at all times excepting when the deposited coin is to be rejected. Pin 168 (Figs. 9 and 12) moves downwardly with a sliding plate and engages the inclined edge 167 of lever 164 and forces it to the left. See Fig. 12. This movement is transmitted by bar 163 to gate lever 162, rotating it in a counter-clockwise direction which rotates gate 110 in a counter clockwise direction as viewed in Fig. 7. Rotation of this gate opens passage 109 and closes the ejection passage 106.

Since the gates 110, 111 and 112 are closed when the coin is released, the coin, which will be assumed to be a half-dollar, finds its way through passage 109 into the receptacle 44. When the main shaft 32 has completed a half turn the pivot 87 begins to move upward instead of downward thereby returning slider 88 to initial position. The spring 130 returns cam plate 123 to its initial position as soon as permitted by the return of slider 88 carrying projection 120, and the rigid connection between plate 123 and gear 125 for counter-clockwise movement as already described rotates gear 125 in a counter-clockwise direction driving gear 135 in a clockwise direction, returning arm 136 to normal position and moving feeler finger 180 to its initial position at the top of slot 182.

If the passenger deposits a quarter instead of a half-dollar the quarter comes to rest in the coin classifier in the indentations 103, 104 (Fig. 7) adapted to receive a quarter which means that the coin assumes a lower position between the classifier jaws than that taken by the half-dollar. The feeler finger 180 (Fig. 12) therefore moves downward farther in the slot than it did for the half-dollar before it engages the edge of the coin and is then deflected into the next lower notch 183. The arm 136 is rotated in a counter-clockwise direction as before described but in this instance arm 138 (Fig. 12) is moved a sufficient distance to strike against arm 147 of bell crank lever 143 thereby rotating the same in a clockwise direction, lifting connecting rod 149, rotating bell crank lever 151 in a clockwise direction, rotating lever 155 and shaft 114 in a clockwise direction and thereby opening quarter gate 111 while gate 110 is closed as described above. Further rotation of the main shaft 32 causes the actuation of push rod 169 as previously described which releases the coin from the classifier jaws and enables the coin to fall into the quarter receptacle 184 (Fig. 24) through passage 107 and chute 185 by reason of the position of gate 111. The return of the mechanism to normal or starting position is the same as described for the half dollar.

If the passenger has deposited a nickel, upon the operation of the main shaft 32, the feeler finger 180 moves still farther downward into the slot 182 before it engages the coin edge and is then deflected into the third notch 183. The arm 138 in this instance engages and passes arm 147 thereby momentarily opening the quarter gate 111 as already described but releasing the same when it has passed by which immediately closes under the action of spring 157. Finder arm 138 next impinges upon lever arm 148 rotating bell crank lever 144 in a clockwise direction, lifting connecting rod 150, rotating bell crank lever 152 in a clockwise direction and by means of connecting rod 154 and lever arm 156 rotates shaft 115 in a clockwise direction and opens the nickel gate 112, whereby release of the coin in the manner already described permits it to drop into the nickel receptacle 186, (Fig. 24) through passage 108 and chute 187. The return of the mechanism is the same as already described except that it is to be noted that arm 138 is free to rotate in a counter-clockwise direction upon its pivot 139 in order to pass by the bell crank arm 147 after which the spring 141 returns it to its initial position against the pin stop 140.

In case the passenger deposits either a penny or a dime and the conductor collects the same, the feeler finger 180 moves downward as described until it engages the edge of the coin and is deflected into its respective notch 183. The arm 138, as it rotates in a counter-clockwise direction, passes arms 147 and 148 in turn thereby opening gates 111 and 112 momentarily in turn. The gates are quickly closed again by springs 157 and 158 and gate 110 is closed as previously described, so that when the coin is released by operation of push rod 169 the gates are all in closed position and the coin drops into passageway 109. The return of the mechanism to initial position is the same as previously described except that in this instance arm 138 moves in a counter-clockwise direction on pivot 139 on passing bell crank arm 148 as well as 147. As will be now understood the feeler finger returns to initial position as before described.

It is to be noted in this connection that cam 170 (Fig. 9) is so disposed upon the main shaft 32 that it does not operate to release the coin from the coin classifier until the proper gates have been opened to direct the coin into the proper receptacle, as determined by the feeler finger 180. Also, the purpose of the resilient drive between cam plate 123 and gear 125 for clockwise rotation of the plate will now be understood. It is clear that plate 123 must rotate far enough to carry feeler finger 180 down below the lowermost coin if necessary, but at the same time the feeler finger may stop at any intermediate position when there is a coin in the classifier which would jam the machine, were not some suitable yielding connection provided such as the connection between plate 123 and gear 125.

Coin distributor mechanism—Magazine loading mechanism

It has already been pointed out that pennies, dimes, and half-dollars or such coins as are not used for change making are deposited in a common receptacle 44 through passageway 109 whereas quarters are deposited in a quarter receptacle 184 and nickels in a nickel receptacle 186 through passageways 107 and 108 respectively. The purpose of separating quarters and nickels from other coins which has also been pointed out previously, is to utilize quarters and nickels deposited in making change. Since a large number of quarters and nickels must be carried to assure change making by the machine at all times a relatively large pocket or magazine must be provided for holding each of these coins, and apparatus must be provided for automatically conveying the quarters and nickels, received by the machine and deposited in the quarter receptacle and the nickel receptacle, from these receptacles to the respective carriers, holding devices or magazines, from whence they may be delivered by the machine in making change.

By referring to Fig. 4 it will be noted that the machine is provided with a horizontal sub-panel 190 which carries the quarter and nickel receptacles 184 and 186 (Fig. 24) also the quarter magazine 191 and nickel magazine 192 adjacent thereto. A support 193 preferably integral with the sub-panel and at right angles thereto is rigidly bolted or secured to the front panel 1. A suitable spacer block 194 supports receptacles 184 and 186 slightly above sub-panel 190 (Figs. 23–26) and openings are provided in the spacer block 194 of the same size and configuration as the respective receptacles so as to permit under certain conditions, a quarter or nickel to drop upon a shuttle plate 195 (Fig. 19) secured to sub-panel 190 by the screws 196. A depression 197 (Figs. 44–52) is formed in the shuttle plate 195 extending under both receptacles 184 and 186, the edges of which depression have bevels 198 and 199 (Figs. 44–47). Rounded hollows 200 and 201 for each receptacle are depressed in the shuttle plate 195 adjacent the bevels 198 and 199 to enable the coin to tilt more readily as it is being pushed up the bevel into its receptive magazine.

A relatively thin shuttle 204 (Figs. 21 and 50) which is slightly thinner than a quarter or nickel is provided and arranged to slide laterally in depression 197. The shuttle 204 must be thinner than the thinnest worn coin in order to prevent it from engaging the edges of two coins in the coin receptacle. This thinness of the shuttle may result in the shuttle riding over the edge of the coin as it is being shoved into the coin magazine while the coin is in an inclined position as shown in Fig. 45 and jam the machine. To avoid this the shuttle has a channel 209 (Figs. 51-52) at its midsection which slides in the groove 210 of the shuttle plate 195. This in effect increases the thickness of the shuttle and prevents the jamming above referred to. The thin shuttle has also a tendency to slip underneath the coin when it is almost completely transferred to the coin magazine and the coin in this position half in the magazine and half out of it would also cause jamming. The rocker 211 is therefore pivoted within the shuttle channel 209 on pin 212 and has its ends on either side of the pivot at a slight angle to each other so that the end cooperating with the shuttle to transfer a coin to the magazine projects above the shuttle. A contact bar 213 (Fig. 45) is disposed between the coin receptacle 184 and 186 which engages the top surface of the rocker. Disposed beneath the shuttle plate is a pressure bar 214 held resiliently in position by the spring 215 encircling a screw 216 which passes freely through a hole 217 (Fig. 44) in the pressure bar and is threaded into the shuttle plate 195 thereby giving the bar freedom to tilt angularly or recede downward as a whole. The pressure bar has a pair of wings 218 (Fig. 48) at both ends projecting through slots 219 in the shuttle plate into the depression 197. The wings form a resilient flat bottom for the coins so that they will lie flat or horizontally upon the plate 195 regardless of the depressions 200 and 201.

The shuttle 204 is provided with a guide arm 205 (see Figs. 21 and 50) adapted to slide in a slot 206 in the sub-panel 190 and the guide arm carries a stud 207 to which a head 208 (Fig. 23) is secured. A connecting rod 222 has one end pivoted to the head 208 and its other end pivotally connected to the end of a shuttle operating lever 223 (Fig. 9) which is pivotally mounted to the plate 1 at 224. A cam pin or roller 225 is secured to lever 223 and follows in the cam groove 226 of the cam plate 227 which is mounted upon the main shaft 32. The cam groove controls the movement of the shuttle and its return thereby dispensing with a return spring for the shuttle.

Figure 6:
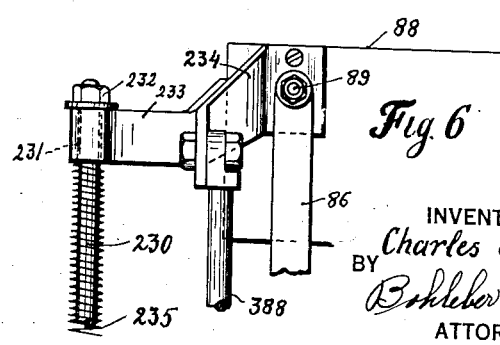
Fig. 6 shows the cushioning and nickel receptacle plunger connections with the sliding plate.

A nickel receptacle plunger 228 (Figs. 5 and 45) is adapted to reciprocate in the nickel receptacle 186 and covers the opening from the nickel chute 187 and prevents the coin from passing to the receptacle while the shuttle is in motion. The plunger, carrying a stop plate 229 at its upper end, is supported on the rod 230 connected at its upper end by a lost motion arrangement consisting of a large hole 231 (see Fig. 6) in the extension 233 through which rod 230 freely passes. The nut 232 on the end of the rod 230 permits longitudinal movement of the rod 230 through the hole 231. The extension 233 is fixed to and forms part of the bracket 234. A spring 235 circles the rod 230 and gives the plunger its yieldable characteristic. The bracket is mounted upon the slider 88 and reciprocates vertically with the slider.

*Operation of magazine loading mechanism*

When a quarter is deposited in the machine it passes to the classifier jaws and remains in this position until the jaws are released by the cam 170 (Fig. 9) operating the push rod 169. The quarter drops through passage 107 and chute 185 and into the quarter coin receptacle 184. As soon as the operating handle is turned and rotates shaft 32, the cam 227 cooperating with the cam pin or roller 225 swings lever 223 to reciprocate the coin shuttle 204, so that when the classifier jaws release the coin, if it is a quarter, it drops upon the shuttle at the bottom of the receptacle. As the shuttle returns to the initial position to the right indicated in Fig. 44, uncovering the bottom of the receptacle, the quarter drops onto the bottom of the recess 197 (Figs. 44 and 45). Upon the next operation of the machine, the edge of the shuttle engages the edge of the quarter and pushes it up the incline 198 and underneath the stack of coins in the quarter magazine 191 pushing the stacked coins up so that the newly deposited coin takes the lowermost position in the magazine.

Since the deposited coins are loaded into the change magazines at the bottom which places the coin directly into ejecting position from the magazine as a change coin, it is important that the change coin ejecting mechanism is not functioning when the shuttle is pushing or loading a deposited coin into the magazine. The shuttle therefore begins to operate immediately upon rotation of the operating handle and completes its loading of a quarter into the quarter magazine before any change ejecting mechanism begins to operate or in particular before the quarter change ejecting mechanism operates as would be the case if a half dollar has been deposited in the machine. The shuttle cam groove 226 is so shaped with the long dwell 226a, corresponding to more than half of a revolution of the operating handle, retaining the shuttle at the extreme left position of its movement as viewed in Figure 44 until the nickel and quarter ejecting mechanism has operated and then the shuttle moves to its extreme position at the right and projecting a nickel into the nickel magazine 192 if one is in the nickel receiver 186 and finally returns to its initial position upon the operating handle reaching the end of a complete revolution.

The pressure bar 214 assists the transfer of the coin into the magazine by pressing upward on the coin and the channel 209 enables the shuttle to continue engaging the edge of the coin as the edge sinks into the hollow 200. The rocker 211, as the pivot pin 212 passes to the left from central position under bar 213, is engaged upon its upper surface by bar 213 thereby raising the left hand end of the rocker which contacts with the coin edge as the coin assumes a horizontal position under the pressure of the column of coins above it in the magazine and gives the last push to the coin which transfers the coin entirely within the magazine. Although a thin shuttle is necessary to assure only one coin being transferred at each reciprocation of the shuttle, the channel 209 and the rocker 211 in effect gives the shuttle a greater thickness when necessary during the various angles and positions taken by the coin during the transfer.

If a nickel is deposited the nickel is released from the classifier jaws in the same manner and in the same sequence of operations as the quarter. In the case of the nickel however the plunger 228 in the receptacle 186 moves downward as slider 88 moves downward closing the entry into the receptacle from the chute 187 and retaining the nickel in the chute until the plunger returns to its raised position at which time the shuttle 204 has returned to its initial position covering the bottom of the nickel receptacle 186 and the nickel then drops upon the shuttle. Upon the next actuation of the machine the nickel drops onto the shuttle plate 195 at the bottom of the nickel receptacle when the shuttle 204 moves to the left and is carried into the nickel magazine 192 upon the return movement of the shuttle in the same manner that the quarter is carried into the quarter magazine, the shutter being assisted by the channel 209, pressure bar 214 and rocker 211 as described for the quarter. The plunger 228 is also long enough to reach the bottom of the receptacle and if a coin should assume an angular position therein, the plunger, impelled by the spring 235, presses the nickel so that it lies flat on the shuttle.

It will now be seen that the quarter and the nickel in the receptacles 184 and 186 respectively are removed therefrom and loaded in the receptive magazines by the shuttle which is returned to its initial positon by the cam 227 before the movable classifier jaw 12 opens to allow a new coin to drop into the proper receptacle so that the receptacles are always first cleared of the coin therein before an additional coin is delivered thereto which prevents jamming of the machine which may result from more coins accumulating in these receptacles than there is space for.

*Change delivery mechanism—Quarter delivery*

It has been pointed out how the quarters collected by the machine are carried to the quarter magazine 191. It will now be explained how the quarters are delivered from this magazine in case it is necessary to deliver a quarter in making change.

Referring now to Fig. 21 there is provided a quarter delivery slide 240 lying directly upon the sub-panel 190 and having an opening formed therein of just sufficient size to accommodate a quarter with proper clearance. Quarter delivery slide 240 is preferably a little less in thickness than a worn quarter and slides in a guide slot or recess 242 in sub-panel 190. Slide 240 carries a projecting drive pin 243 adapted to be engaged in the slot 244 of the bifurcated lever arm 245 (Fig. 24) which is pivoted at 246 to the sub-panel 190. A spring 247 yieldingly maintains the lever arm 245 at its counter-clockwise extremity of movement shown in Fig. 23, which maintains the slide 240 with its opening 241 registering with the coins in quarter magazine 191, in such manner that when a quarter is delivered to the magazine as described, it rests upon the shuttle plate 195 but is within the opening 241 of the delivery slide 240, ready to be moved laterally on movement of the slide. A connecting rod 248 is eccentrically pivoted to lever arm 245 at 249 and has its other end pivotally connected at 250 to the driving lever 251 the latter being pivoted at one end 252 on sub-panel 190 and the other end extending to the recess 253 in the sub-panel.

Referring more particularly to Figs. 7 and 9 there is provided a quarter delivery plate 255 carrying a cam surface 256 and guiding slots 257 and 258 cooperating with the guide pins 259 and 260 secured to the front panel 1. A third slot 261 is provided in plate 255 in which a guide screw 262 is adapted to slide, this screw being threaded into plate 263 so that in normal upper position of the plates 255 and 263 the screw is at the upper end of the slot. Recess 253 in sub-panel 190 permits vertical movement of the cam 256 in contact with the lever 251 and thereby rock this lever in a clockwise direction about its pivot 252.

*Operation of quarter delivery mechanism*

It will now be seen that downward movement of sliding plate 255, caused by mechanism which will be described later, carries cam 256 downward, forcing lever 251 to rotate in a clockwise direction and thereby carrying connecting rod 248 to the right as shown in Fig. 24 which in turn rotates lever arm 245 clockwise. This movement is transmitted by the pin 243 to the quarter slide 240 with its recess 241 containing a quarter thereby removing the quarter from the bottom of the pile in the quarter magazine 191 and carrying it forward over opening 264 (see Figs. 19–21) where it immediately drops downward into an opening (Fig. 21) leading to the change return cup 8. Spring 247 returns arm 245, connecting rod 248 and lever 251 back to initial position upon withdrawal of the cam 256 by the upward movement of plate 255 which is accomplished by spring 265, the upward tension of the spring being transmitted to plate 255 by the screw 262 engaging the upper end of the slot 261. Upon the quarter slide 240 returning to initial position, the lowermost quarter in the magazine 191 drops into recess 241 of the slide and rests upon shuttle plate 195 and the mechanism is ready to deliver another quarter.

*Change delivery mechanism—Nickel delivery*

A change delivery lever 270 (Fig. 21) is pivoted on a suitable pivot 271 as for example a stud bolt mounted upon sub-panel 190 and is provided with a recess 272 of just the proper size to receive a nickel. The change delivery lever is preferably slightly less in thickness than a worn nickel, and is adapted to oscillate in a depression 273 provided therefor in sub-panel 190 to carry the nickel. The change lever 270 makes as many oscillations as there are nickels to be returned as change therefor. If four nickels are to be returned lever 270 oscillates four times for one revolution of the main operating crank. These operations must necessarily be very rapid and hence the ejector finger 274 (Figs. 41-42-43) assists and assures the ejection of the nickels from the lever recess 272, by pressing down upon the nickel in the recess in the following manner. The finger is a semi-circular member pivoted at 275 and has an extension 276 projecting into the path of the lever 270, a spring 277 normally keeping the finger in raised position. The lever 270 is also provided with a projection 278 to which one end of a connecting link 279 (Fig. 23) is pivotally connected and the other end of the link is eccentrically pivoted at 280 (Fig. 31) to a driving disk 281 which is secured to a stud 282 rotatably mounted in an arm 283 of the plate 284. It might be stated at this point that the shuttle, quarter change slide and nickel change lever, are covered by a plate 285 secured to sub-panel 190 by screws 286, the plate having slots or openings 287, 288 and 289 through which the driving means for the mechanism above enumerated respectively project. A spring centering pawl 290 (Fig. 24) is secured to the spacer block 194 and has its end bent to form a projection 291 which springs into a notch 292 provided in the periphery of the driving disk 281 in such manner as to center the change lever recess 272 accurately in position of registry with the coins in the nickel magazine 192 and with the path of the nickels from the nickel receptacle 186.

A driving pinion 296 secured to stud 282, meshes with a gear 297 which is rotatably mounted upon a shaft 298 secured to plate 284. Rigidly secured to gear 297 is a ratchet wheel 299 and freely mounted upon shaft 298 is another gear 300 having a pawl plate 301 rigidly secured thereto and carrying a spring pressed pawl 302 adapted to cooperate with ratchet wheel 299 so that counter clockwise rotation of the pawl 302 as viewed in Figs. 27 and 28 drives gear 297; clockwise rotation does not. A driving rack 303 (Figs. 9 and 27), normally held in its right hand extremity of movement by spring 304, meshes with gear 300. The rack is rigidly secured to a sliding ratchet bar 305 having a guide slot 306 (Figs. 12 and 32) within which a guide pin 307 slides. A guide 308 also assists in maintaining the ratchet bar and rack in position. The ratchet bar is engaged by a pawl 309 (Fig. 9) which is pivotally mounted on the end of an arm 312 of a bell crank lever pivoted at 260 to front panel 1. The other arm 313 of the bell crank lever is connected to one end of a relatively short connecting link 314 and the other end of the link is pivoted to the sliding plate 315 which plate has a long extension 316 and a short extension 317. Sliding plate 263 has a shoulder 318 which projects underneath the lower edge of plate 315.

Referring now to Figures 12-15-17-18, the sliding plate 88 has spaced parallel guide bars 319 rigidly secured to its face upon which a smaller sliding block 320 is adapted to slide, the block 320 having a pivot 321 which serves as a driving pivot for the connecting rod 322 which connects the sliding block 320 with the arm 137. Sliding block 320 has also a rearwardly extending frame 323 which offers additional support for the axially slidable movable means or master control finger 324 which is pressed forward by a spring 325 encircling the finger and pressing against a collar 326 secured to the finger. The finger 324 normally extends through the slot 327 in slider 88 far enough to engage in the notches 328 upon the upper edge of vertically slidable plates 255, 316 or 317 and 263, there being one notch for each denomination of coin received by the machine as shown in Fig. 9.

*Operation of nickel delivery mechanism*

The slider 88 in its downward movement rotates cam plate 123 which in turn rotates gears 125 and 135 and arm 137 which causes downward movement of the feeler finger 180 and lateral movement of the master control finger 324 through their respective connecting rods 181 and 322. See Fig. 12. The feeler finger moves downward in the classifier until it engages a coin edge, and is deflected into a notch 183 which halts its further movement, and therefore also halts the rotation of gears 135 and 125. The yielding connection between cam plate 123 and gear 125 enables the cam plate to continue its rotation after the gears 125 and 135 have halted and thereby prevents jamming of the machine. Since the feeler finger controls the master control finger lateral movement of the master control finger 324 along the guides 319 is also halted and it engages notch in the slider plate 263 depending upon the denomination of the coin in the classifier. The notches on plate 263 prevent further lateral movement of the master control finger after it has contacted with the plate. With the master control finger 324 engaging a particular notch on the slider plate 263 and moving downward, it will control and cause some movement of the arm 322 and feeler finger 180. This is partly obviated by the length of the connecting rod 322 but in order to insure that the feeler finger 180 is engaging the coin or coin notch 183 when the coin is released from the classifier jaws so that lever arm 138 is controlling the proper gate, the classifier jaws are released immediately upon the master control finger engaging the proper notch on the plate 263. Since the face of the lever arms 147 and 148 are long enough to enable some movement of the feeler finger without closing the respective gates the coin will have ample time after its release from the classifier to drop through its respective passage before the gate closes upon the return movement of the feeler finger. If a dime is in the classifier, feeler finger 180 travels down in slot 182 until it engages the edge of the dime, which being the smallest of the coins received by the machine, takes the lowermost position in the classifier jaws and is deflected into the lowermost notch 183. This controls the lateral position of the control finger 324 which will take a position over the notch at the extreme right in Fig. 12 which is the 10¢ notch shown in Fig. 9. The control finger on its downward movement will contact first with sliding plate 263 in the 10¢ notch operating mechanism which will be later explained and finally engages with and forces the arm 317 on plate 315 downward rotating bell crank lever 312, 313 (Fig. 9) in a clockwise direction. The pawl 309 on the arm 312 moves the ratchet bar 305 to the left which carries rack 303 to the left, rotating gear 300 (Fig. 27) in a counter-clockwise direction and by means of pawl 302 rotating ratchet wheel 299 in a counter-clockwise direction which rotates gear 296 and finally driving eccentric plate 281. The ejector lever 270 (Fig. 21) is therefore given an oscillating movement because of its connection through link 279 to the eccentric plate 281, and a change coin is carried from the magazine 192 in the cut-out 272 over delivery passage 234.

The ejector lever 270 moves very rapidly in fact so rapidly that the nickel in the cut-out 272 does not have time to drop by its own weight from the ejector lever. The ejector finger 274 (Figs. 41-43) is therefore provided. The finger has an extension 276 which projects into the path of the ejector lever so that when the nickel in the cut-out of the lever is over the discharge opening 234, the extension is engaged which swings the finger 274 into the cut-out instantaneously expelling the nickel therefrom. The ejector lever engages the finger on its return movement which swings the finger to its raised position where it is held by the spring 277.

In case the passenger has deposited a penny, feeler finger 180 (Fig. 12) travels downwardly in slot 182 until it engages the edge of the coin and is deflected into its particular notch 183 and the master control finger 324 moves laterally to the right until it is over the notch 328 as indicated by the notch for pennies in Fig. 9. Since the penny is a larger coin than the dime, the feeler finger takes the next higher position in the classifier and the lateral position of the master control finger is controlled by the position of the feeler finger. The downward movement of the control finger in this position actuates no change return mechanism. Similarly if a nickel is deposited, downward movement of the control finger 324 in the nickel position actuates no change return mechanism. If a quarter is deposited the control finger 324 contacts with arm 316 driving plate 315 downward to the full extent of its movement which is four times the movement already described when the passenger deposits a dime, thereby oscillating ejector lever 270 through four oscillations and carrying the four lowermost nickels from nickel magazine 192 successively over delivery cut-out 234 from whence they are instantaneously ejected by ejector finger 274. If the passenger deposits a half-dollar the control finger 324 moves into the notch shown at the extreme left in Fig. 12 and actuates plate 315 as just described to return four nickels and also actuates the plate 255 of the quarter delivery mechanism as previously described thereby returning to the passenger one quarter and four nickels. Return of the slider 315 to normal position permits spring 304 (Fig. 27) to return rack 303 to its initial position, rotating gear 300 in a clockwise direction thereby carrying pawl 302 (Fig. 28) in a clockwise direction without rotating ratchet wheel 299 as will be readily understood.

Attention is brought to the fact that all three of the plates 255, 263 and 315 are returned to their upward or normal position under the action of the single spring 265 by means of slot 261 and pin 262 which returns plate 255 and shoulder 318 which returns plate 315. It is also to be noted that plate 263 may descend while plates 255 and 315 remain stationary or plates 315 and 263 may descend together or their descent may begin at different times while plate 255 remains stationary or all three plates may descend together.

In all of the above it will be observed that there is returned to the passenger from coins of higher denominations an amount of change corresponding to the payment of one fare.

Multiple fare mechanism

It has already been pointed out that a fare selector is provided by means of which the conductor may cause the machine to operate to collect more than one fare from the coins of higher denominations deposited therein. In this particular instance provision is made for the collection of as many as five fares but it will be understood that this is by way of example only and the machine may readily be arranged to collect as many fares as desired up to the value of the largest coin deposited.

Referring now to Fig. 37 there is provided a slide bar 332 supported in spaced relation from the front panel 1 by means of a rod 298 to which one end of the bar 332 is secured. The other end of the bar is preferably bent at right angles and secured to the sub-panel 190. A pawl lifting cam 334 adapted to engage the pin 349 on the pawl 309 (Fig. 32) is arranged for sliding movement on the bar 332 and is provided with an upwardly extending projection 335 to which is pivotally connected one end of a connecting rod 336 the latter having its other end pivoted at 337 to a lever arm 338 which in turn is pivoted on rod 58. The fare selector shaft 22 carries a disc 339 on which is provided a cam 340 having a plurality of steps or flats, one step being provided for each fare collection numeral provided upon plate 15 in Figure 1. The fare selector shaft likewise carries ratchet wheel 341 having a tooth for every fare over one desired to be collected by the machine. A detent arm 342 terminating in a hook 343 is provided pivotally mounted on pin 172 and having an extension 24 projecting through the side wall of the machine. An extension 347 of the detent arm 342 projects into the path of a pin 348 positioned near the periphery of the ratchet disk 84 (Fig. 12) and serves as a cam to withdraw the hook 343 (Fig. 32) from the ratchet wheel 341 against the tension of a spring 344 which resiliently retains the hook 343 against the ratchet wheel 341. The pin 348 and ratchet disk 84 are shown in dot dash lines on Fig. 32. A spring 345 is provided having one end attached to connecting rod 336 and its other end attached to a fixed point (not shown) for the purpose of maintaining the pawl lifting cam 334 at its right hand extremity of travel and also to keep the lever arm 338 in contact with the cam 340. A spiral spring 346 encircling shaft 22 returns the ratchet wheel 341, cam 340 and the fare selector lever 20 to their initial positions.

Operation of multiple fare mechanism.

In case it is desired to collect two fares from a quarter or a half-dollar deposited by the passenger, fare selector 20 shown in Fig. 1 will be rotated in a clockwise direction by the operator until it arrives opposite the number 2 on fare selector indicator 15. This rotates fare selector shaft 22 in a counter-clockwise direction, as viewed from Fig. 32 by an amount just sufficient to allow hook 343 to drop behind the second tooth on ratchet 341 thereby holding the fare selector at that position. Shaft 22 carries with it the cam 340 which engages with and rotates lever arm 338 in a clockwise direction causing the connecting rod 336 to move to the left and also pawl lifter cam 334 to the left against the tension of spring 345. The position taken by the lever arm 338 when two fares are to be collected is indicated by the first dotted circle a to the left of pivot 337 and in Fig. 33 is shown the position of the cam 340.

The pin 349 on pawl 309 is engaged by the pawl lifter cam and raises the pawl out of engagement with the first tooth of rack 305 (see Fig. 12). Pawl lifter cam 334 is moved a distance to the left so that when the machine is operated to collect the fare and return the change as previously described the pawl 309, instead of engaging the first tooth of rack 305 engages the second tooth thereof, and therefore ratchet bar 305 and also rack 303 are moved only three-fourths of a full stroke which results in the change ejector lever 270 being oscillated three times instead of four and removing only three nickels from the nickel magazine for delivery. Upon completion of the delivery of the change coins and release of the deposited coin from the classifier jaws the pin 348 on the ratchet disk 84 engages the extension 347 of detent arm moving it sufficiently to withdraw the hook 343 from the ratchet wheel 341 so that spring 346 may return the cam and ratchet wheel to their original position and return the multiple fare lever 20 to numeral 1 of the multiple fare collecting dial 15. It will be seen that it is not necessary for the operator to remember to reset the machine to collect only one fare after it has been set to collect more than one since the operation of the machine automatically resets itself to collect one fare. The operation to collect three or four fares from a quarter or a half dollar is analogous to that already described, the only difference being that to collect three fares, fare selector 20 is rotated to fix the pointer at 3 which in turn rotates shaft 22 to such a point that hook 343 drops behind the second tooth of ratchet wheel 341. Under the influence of cam 340 which takes the position shown in Fig. 34, lever arm 338 moves to the position shown in the second dotted circle $b$, and cam 334 slides to the left a sufficient distance so that pawl 309 is not permitted to drop until it has passed over one-half or two of the teeth of ratchet bar 305. Under these circumstances ejector lever 270 makes only half as many oscillations or two to be exact and therefore releases only two nickels into the change return cup.

In a corresponding manner if the fare selector is set to indicate and collect four fares, hook 343 is dropped behind the third tooth of ratchet wheel 341, cam 340 takes the position shown in Fig. 35 and lever arm 338 swings to position $c$ thereby moving cam 334 to the left a sufficient distance so that pawl 309 does not drop until it has passed over three teeth of ratchet bar 305 and ejector lever 270 makes only one oscillation thereby delivering only one nickel. Finally if the machine is set to collect five fares hook 343 drops behind the last tooth of ratchet 341, the position taken by cam 340 is shown in Fig. 36 and dotted circle $d$ shows position of arm 338 whereby cam 334 is moved to the left so that pawl 309 does not drop until it has passed completely over all the teeth in ratchet bar 305 and therefore ejector lever 270 will not be operated at all.

The description given above is based on the assumption that the passenger had deposited either a quarter or a half-dollar. If the passenger deposits a dime the operation is slightly different. In case of a deposit of a quarter or a half-dollar the master change control finger 324 (Fig. 12) impinges on arm 316 and causes rotation of bell crank lever 312, 313 through a complete stroke as previously explained. If however, the passenger deposits a dime the master change control finger impinges upon the short arm 317 and as previously pointed out moves bell crank 312, 313 through only one quarter of its normal movement thereby oscillating the ejector lever 270 once only and delivers only one nickel in return. If the fare selector is set to collect two fares when the passenger has deposited a dime it will be observed that the position of cam 334 prevents pawl 309 from dropping into engagement with rack 305 and therefore no change is returned, although three nickels would have been returned had the passenger deposited a quarter or a half-dollar instead of a dime.

It will be clear that if it is desired to provide a machine which will make change without subtracting the amount to be collected, it is only necessary to provide longer arms 316 and 317 or to change the ratio of gears 297, 296 from 4 to 1 to 5 to 1, whereby the ejector lever 270 will make five oscillations when a quarter is deposited and two when a dime is deposited. Plate 255 will remain as shown in making complete change for a half dollar. It will be understood that if only a change making machine is desired, the multiple fare and counting mechanisms may be omitted as unnecessary.

Counter mechanism

It has already been pointed out that downward movement of the master change control finger 324 carries downward plate 263 against the tension of the spring 265 which actuates certain counter mechanism now to be described. Fare selector lever arm 338 (Fig. 37) carries a positioning link 352 pivotally secured at one end approximately at the midpoint 353 of the arm, the other end 354 of the link being slidably mounted in slot 355 of an arm 356 which is pivotally mounted at 168 on plate 263 and slidably pivoted at 357 in the slot 355. Pivot 357 is secured to an upright bracket 358. The end 354 of positioning link 352 is also pivoted to connecting rod 359 the other end of which is pivotally connected at 360 to a rack 361 mounted for vertical movement on a rack slide 362. The spring 345 (Fig. 32) maintains arm 338 and therefore the connecting rod 352 at its right hand extremity of movement. A gear 363 meshing with rack 361 is provided on the shaft of a master counter 364 provided with lost motion such that clockwise rotation of gear 363 actuates the counting mechanism, and counterclockwise rotation of the gear has no effect. The structure by which this takes place is a part of the counting mechanism which is per se no part of my invention but may be purchased in the open market and is not therefore described in detail. The master counter shaft carries also a bevel gear 365 for engagement with another gear 366 shown in dotted lines in Fig. 37 for operating a trip counter or trip register.

Operation of counting mechanism

If the fare selector is set to collect one fare the lever 338 remains in the position shown in Fig. 37. Upon the operation of the machine as previously described, master change control finger 324 (Fig. 12) moves to the right and downward impinging upon plate 263 and moving it downward thereby carrying pivot 168 downward and moving the right hand end of lever 356 downward. Lever 356 pivots at point 357 and the left hand or slotted end of the lever is therefore raised carrying the end 354 of rod 359 with it which gives an upward movement to rack 361 thereby rotating gear 363 and actuating the counter 364. The length of stroke of the connecting rod 359 and the amount of rotation of gear 363 in this instance will be so chosen as to cause the counter 364 to record one fare. Upward movement of master control finger 324 allows plate 263 to slide upward under the influence of the spring 265 carrying pivot 168 with it, and returning rack 361 to its initial position thereby rotating gear 363 in a counter-clockwise direction which as previously stated does not affect the master counter.

If now the fare selector is set to collect two fares, cam 340 carried on fare selector shaft 22 will be rotated counterclockwise, as viewed from Fig. 37, the cam taking the position shown in Fig. 33 thereby forcing lever 338 and positioning link 352 a greater distance to the left and swinging the lower end 354 of connecting rod 359 about pivot 360 in a clockwise direction. It will now be seen that the distance from the lower end of connecting rod 359 to the pivot 357 is greater than before and consequently downward movement of plate 263 under the action of master control finger 324 will cause connecting rod 359 to move the counter rack 361 upward twice the distance moved for one fare, thereby causing greater rotation of the counter gear 363. In this instance the rotation given the counter gear is sufficient to register two fares upon the master counter 364. The release of the fare control shaft 22 as previously described and return of plate 263 to its initial upward position, similarly returns all parts of the counting mechanism to their initial positions under the influence of their respective springs in the same manner as described for the recording or counting of a single fare.

The operation of the counting mechanism to record three, four and five fares is similar to that already described for the recording of two fares, the difference being that for three, four and five fares selector shaft 22 is rotated a greater amount thereby cam 340 causing lever 338 and positioning link 352 to assume a correspondingly greater distance to the left which moves the lower end 354 of connecting rod 359 a progressively greater distance in the slot 355 from the pivot 357 of lever arms 356 and thereby progressively increasing the upward movement of rack 361 and the rotation of master counter gear 363 to record three, four or five fares.

Rejection mechanism

Referring to Figs. 4, 16 and 18 the rejector push rod 26 is shown slidably mounted in a supporting boss 27 and having its inner end positioned directly opposite the end of master control finger 324 when this finger is in its normal inoperative position, that is when the finger is at the extreme left of the slide rods as shown in Fig. 18 and the sliding plate 88 is at its extreme upward position. The two ends practically abut each other excepting for a thin clearance space. The rejector push rod is held outward by the spring 29. (See Fig. 18.) The master control finger frame 323 has a hook 370 pivoted thereon by a pin 371 and held in position by spring 372 on the underside of frame 323. The opposite end of the hook has a hook release 373 projecting rearwardly which extends out far enough to engage the projection 374 mounted upon bracket 358 when the slider 88 with the frame 323 and its associated mechanism reaches its lowermost position of movement (Fig. 4).

Referring now to Figs. 4 and 5 there are provided rejection counters for each size of coin or slug which is passed into the machine. In this example there is provided a dime counter 376, a penny counter 377, a nickel counter 378, a quarter counter 379 and a half-dollar counter 380. A suitable operating lever and associated mechanism is provided for each counter as will be seen from Figs. 4 and 5 the lower ends of which levers 381, 382, 383, 384 and 385 are L-shaped or have a right angled extension for operating the counters individually, to record the number of rejections of each particular size of coin. Return springs are provided (not shown) for returning each of the rejection counter levers and its associated mechanism to its initial position.

Operation of rejection mechanism

If the collector observes that the coin deposited by the passenger is a counterfeit or slug he will then operate rejector push button 25 as seen in Figs. 4 and 5 pushing it in as far as it will go. The end of the push rod immediately contacts with the end of the master control finger 324 which also recedes or moves to the left as viewed in Figure 4 or to the right as viewed in Figure 18 carrying collar 326 with it. The collar depresses hook 370 which then snaps in back of the collar thereby holding the master control finger in this receded position as shown by dotted lines in Fig. 18. In this position the master control finger clears all the change making plates 255, 315 and 263 which therefore are not operated as the finger moves downwardly when the operating handle 33 is rotated but the rear or opposite end of the finger extends far backward so that it engages the L-portions of the levers 381 (Fig. 4), 382, 383, 384 and 385 and actuates their respective counters depending upon the size of the slug in the classifier jaws 11, 12. It is clear that the feeler finger 180 and its control of the position of the slider block 320 and therefore the position of the master control finger 324 on the plate 88 remains unaffected by actuation of the rejector push rod.

In order to release the master control finger, the projection 374 (Fig. 4) engages the hook release 373 of the hook 370 when the sliding block 88 reaches its extreme lowermost position and thereby swings the hook from in back of the collar 326 and the master control finger is returned to its normal position by the spring 325. It will be observed that in the receded position of the master change control finger 324 two results are secured: (1) the finger is moved to such a position that in its downward movement it actuates no change delivery mechanism or collection counting mechanism and (2) the opposite end of the master change control finger engages the outwardly extending portion of one of the rejection counter levers to actuate one of the rejection counters. It is also to be noted that operation of the rejector push rod 26 locks the master control finger in position to reject so that it is impossible to do anything but reject the coin in the classifier jaws.

Inasmuch as the slider plate 263 is not engaged and carried downward by the master control finger 324 the gate mechanism, controlling gate 110 (Fig. 7), is not operated when the operating handle is actuated so that this gate remains in the position shown in Fig. 7 with the passage 106 open to the change return receptacle 8. The slug released from the classifier jaws by the mechanism previously described drops through the passage 106 to the return receptacle.

Cushioning mechanism

As previously described upon rotation of the operating handle 33 the slider 88 is carried down by means of the connecting rod 86 and rotatable plate 84 and master control finger 324 engages the plates 255, 315 and 263 and carries them downward against the tension of the spring 265. When the connecting rod and plate 84 have passed through a half cycle the force of the spring and the manual force upon the handle are both exerted in the same direction which tends to effect a rapid return of the parts mentioned to starting position and would result in a severe shock at the end of the cycle if means were not provided to overcome the same.

A cushioning means of the visual air or coil piston cylinder type has therefore been provided which consists of a piston rod 388 (Figs. 5 and 6) to which a piston or plunger is secured which reciprocates in the cylinder 389 mounted upon the sub-panel 190. The rod is secured to the end of a bracket 390 (Figs. 6 and 15) which is fastened to the slider 88 by means of screws 391 and stud 89. The piston and cylinder form the usual air or oil cushioning or shock absorbing device.

Full change coin receptacle mechanism

Since many nickels are deposited in a fare collecting machine of this character which are stored in a change making receptacle, the nickel change coin storage receptacle will become full and if some means are not provided for such a contingency the machine would jam. For this reason mechanism has been provided which disconnects the operating means for the nickel gate and renders it inoperable which mechanism functions when the receptacle is full of change coins. Two methods of accomplishing this result is shown, the preferred form being the mechanism shown in Figs. 13 and 14.

In these figures the tubular coin magazine 192 is shown in which a weight 395 is freely slidable. The weight has a manual handle 396 (see Fig. 41) projecting through slot 397 running lengthwise of the magazine so that it may be lifted or raised in the magazine by the operator. The top of the magazine has a slot 415 (see Figs. 13 and 14) through which the arm 416 projects into the magazine and into the path of the weight. The arm is fixed to a shaft 417 pivoted on a bracket 418 secured to the magazine and a bracket 419 secured to plate 56 and upon the shaft is fixed a displacement arm 420, the end of which engages the shoulder 421 of a sliding pivot 422 to which the nickel gate arm 144 is secured. The sliding pivot 422 slides longitudinally upon the elongated pivot 146 and a spring 423 surrounding the pivot 146 abuts the nut 424 and the shoulder 421 to hold the sliding pivot 422 in operative position at the left of the elongated pivot 146 as viewed in Fig. 14.

Another method of rendering the gate to the nickel change coin receptacle inoperative is shown in Figs. 38–41 where the same weight 395 is shown within the tubular magazine 192 and free to move upwardly therein as the change coins are loaded into the bottom of the magazine. At the top of the magazine is a short slot 398 through which a pin 399 projects far enough to be in the path of weight 395 when it is pushed to the top of the magazine by the coins added at the bottom of the column. Pin 399 is secured to a sleeve 400 slidably mounted upon the magazine 192 which sleeve carries a rod 401, pivoted at 402 to lever 403 which is pivoted at 404. The outer end of lever 403 is adapted to engage and raise the connecting rod 154 (Figs. 38–40) which has an L-shaped slot comprising a long slot 407 and a short slot 408 extending at right angles to the long slot and joined therewith. The lever 156 controlling the gate 112 (Fig. 7) to the nickel passage 108 has a pivot screw 409 which is free to slide in the slots 407, 408 and normally lies in the short slot as shown in Fig. 38.

Operation of full change coin receptacle mechanism

The weight 395 has a double purpose namely to give sufficient weight on the change coins when there are only a few coins in the magazine so that rapid and positive descent of these coins is secured into recess 272 of the ejector 270 as the change coin ejector rapidly removes coins from the bottom of the column and (referring to Figs. 13 and 14) also to engage the arm 416 when the magazine is full of nickels, and pushes it upward as the weight is raised by the adding of coins at the bottom of the column as previously explained. Upward movement of arm 416 rotates shaft 417 and swings the displacement arm 420 so that the sliding pivot 422 is moved to the right as viewed in Fig. 14 which carries the arm 148 of bell crank lever 144 out of the path of the lever arm 138 which does not engage arm 148 and the nickel gate is not operated and remains closed. Lowering of the weight 395 by the ejection of the change coins from the magazine leaves the arm 416 free to drop which it does under the influence of spring 423 and the shoulder 421 which engages displacement arm 420. This restores arm 148 into the path of lever arm 138 thus enabling the operation of the nickel gate upon operation of the machine.

Operation of the second form of mechanism which renders the nickel gate inoperative when the nickel change coin receptacle is full, will be understood from Figs. 38–41 where the weight 395 moves upwardly as the change coins are inserted in the bottom of the magazine and engages the pin 399. The upward movement of the pin 399 which carries sleeve 400 upward also raises lever 403 through connecting rod 401 which in turn raises rod 154. Normally the pivot screw 409 lies in the short slot 408 but when the connecting rod 154 is raised this pivot screw is removed therefrom and rests in the long slot 407. It is apparent from Figs. 38–40 that as long as the pivot screw is in the short slot, any longitudinal movements of rod 154 transmitted from bell crank 151 and rod 149 will rotate the lever arm 156 and therefore operate the nickel gate 112 (Fig. 7) secured to the pivot 115. However when the connecting rod 154 is lifted so that pivot screw 409 is in the long slot any longitudinal movement of rod 154 will not cause rotation of lever arm 156 and the pivot screw will merely slide in the long slot and therefore gate 112 which is controlled by lever 156 will remain closed over nickel passage 108 and the nickels will therefore pass over the gate to the passage 109 and into the general coin receptacle 44 at the bottom of the machine.

The nickel magazine is the only change coin receptacle which has been provided with mechanism for disconnecting the gate controlling the passage leading to a change coin receptacle but it is clear that the quarter gate mechanism and quarter change coin magazine may be provided with similar mechanism for preventing quarters from being loaded into the change magazine when it is full. Also if other change magazines for other denominations of coins are provided then these additional change magazines also may be equipped with full magazine mechanism.

What I claim is:—

1. In apparatus of the class described, a coin classifier comprising supports at different elevations for coins of different sizes, a feeler finger movable in said classifier to engage a coin therein, a slidable control finger whose position is determined by the feeler finger engaging a coin, a plurality of change sliders one or more of which are engaged by the control finger depending upon the position of the finger, and change making mechanism controlled by said change sliders.

2. In apparatus of the class described, a coin classifier comprising supports at different elevations for coins of different sizes, a feeler finger movable in said classifier to engage a coin therein, a slidable control finger whose position is determined by the feeler finger engaging a coin, a plurality of change sliders one or more of which are engaged by the control finger depending upon the position of the finger, change making mechanism controlled by said change sliders, and means to release the coin from the classifier.

3. In apparatus of the class described, a coin classifier having one fixed jaw and one swinging jaw, a feeler finger movable in said classifier to engage a coin therein, a slidable control finger whose position is determined by the feeler finger engaging a coin, a plurality of change sliders one or more of which are engaged by the control finger depending upon the position of the finger, change making mechanism controlled by said change sliders, and means to rotate the swinging jaw of the classifier.

4. In apparatus of the class described a coin classifier comprising a pair of coacting jaws adapted to support coins of different sizes at different elevations, a feeler finger movable in said classifier to engage a coin therein, a slidable control finger whose position is determined by the feeler finger engaging a coin, a plurality of change sliders one or more of which are engaged by the control finger depending upon the position of the finger, an operating shaft, and a cam on said operating shaft to swing the classifier jaw to release the coin.

5. In apparatus of the class described, a coin classifier comprising supports at different elevations for coins of different sizes, a feeler finger movable in said classifier to engage a coin therein, a slidable control finger whose position is determined by the feeler finger engaging a coin, a plurality of change sliders one or more of which are engaged by the control finger depending upon the position of the finger, change making mechanism controlled by said change sliders, an operating shaft, and connecting means between said operating shaft and feeler finger to drive said finger from the operating shaft.

6. In apparatus of the class described, a coin classifier, a feeler finger movable in said classifier to engage a coin therein, a slidable control finger whose position is determined by the feeler finger engaging a coin, a plurality of change sliders one or more of which are normally engaged by the control finger, and a rejector device for rendering said control finger inoperative to engage the change sliders.

7. In apparatus of the class described a coin classifier, a passage having a rejected and an accepted coin branch leading from said classifier, a gate normally covering said accepted branch and adapted to swing and cover said rejected branch, means to normally swing said gate to cover the rejected branch, and a rejector device to render said gate swinging means inoperative.

8. In apparatus of the class described a coin classifier, a passage having a rejected and an accepted coin branch leading from said classifier, a pivoted gate normally covering said accepted branch and adapted to swing and cover the rejected branch, an operating shaft, a slidable master control finger driven by the operating shaft, said master control finger having a retracted position, means engageable by the master control finger in its normal position to swing the gate over the rejected passage, and a rejector device for retracting the master control finger to prevent its engagement with the gate swinging means.

9. In apparatus of the class described a coin classifier, a passage having a rejected and an accepted coin branch leading from said classifier, a gate normally covering said accepted branch and adapted to swing and cover said rejected branch, a feeler finger movable in said classifier to engage a coin therein, a slidable control finger whose position is determined by the feeler finger engaging a coin, a plurality of change sliders one or more of which are engaged by the control finger depending upon the position of the finger, change making mechanism controlled by said change sliders, gate swinging mechanism operated by said change sliders to rotate the gate to cover the rejected passage, and a rejector device to prevent said control finger from engaging the change sliders.

10. In apparatus of the class described a coin classifier, a passage having a rejected and an accepted coin branch leading from said classifier, a gate normally covering said accepted branch and adapted to swing and cover said rejected branch, a feeler finger movable in said classifier to engage a coin therein, a slidable control finger whose position is determined by the feeler finger engaging a coin, a plurality of change sliders one or more of which are engaged by the control finger depending upon the position of the finger, change making mechanism controlled by said change sliders, gate swinging mechanism operated by said change sliders to rotate the gate to cover the rejected passage, a rejector device to prevent said control slider from engaging the change sliders, and means to release the coin from the classifier.

11. In apparatus of the class described, a coin classifier, a feeler finger movable in said classifier to engage a coin therein, a slidable control finger whose position is determined by the feeler finger engaging a coin, three change sliders one or more of which are engaged by the control slider depending upon the position of the latter slider, a counter controlled by one of said change sliders, nickel change making mechanism controlled by another of the sliders, quarter change making mechanism controlled by the third slider, and means to release said coin from said classifier.

12. In apparatus of the class described, a coin classifier, a feeler finger movable in said classifier to engage a coin therein, a master control finger having lateral movement controlled by the feeler finger engaging a coin, a vertical slider carrying said master control finger, a plurality of change sliders one or more of which are engaged by the master control finger depending upon its lateral position, a counter controlled by one of said change sliders, and change making mechanisms controlled by said other change sliders.

13. In apparatus of the class described, a coin classifier, a feeler finger movable in said classifier to engage a coin therein, a laterally and vertically slidable master control finger whose lateral position is determined by the feeler finger engaging a coin, a change slider engageable by said master control finger in its vertical movement at a time determined by its lateral position, and change mechanism controlled by the change slider.

14. In apparatus of the class described, a coin classifier, a feeler finger, movable in said classifier to engage a coin therein, a laterally and vertically slidable master control finger whose lateral position is determined by the feeler finger engaging a coin, a change slider engageable by said master control finger in its vertical movement at a time determined by its lateral position, change mechanism controlled by the change slider, and means to release the coin from the classifier.

15. In apparatus of the class described, a coin classifier, a feeler finger movable in said classifier to engage a coin therein, a laterally and vertically slidable master control finger whose lateral position is determined by the feeler finger engaging a coin, a change slider engageable by said master control finger in its vertical movement, said change slider having a plurality of arms of different lengths along its lateral edge engageable by said master control finger to determine the amount of movement given to said change slider, and change mechanism controlled by the change slider.

16. In apparatus of the class described, a coin classifier, a feeler finger movable in said classifier to engage a coin therein, a laterally and vertically slidable master control finger whose lateral position is determined by the feeler finger engaging a coin, a plurality of change sliders engageable by said master control finger in its vertical movement dependent upon the lateral position of the control finger, and change mechanism controlled by the change sliders.

17. In apparatus of the class described, a coin classifier, a feeler finger movable in said classifier to engage a coin therein, a laterally and vertically slidable master control finger whose lateral position is determined by the feeler finger engaging a coin, a change slider engageable by said master control finger in its vertical movement thereby transmitting vertical movement to the change slider, the extent of said vertical movement depending upon the lateral position of the control finger, a change coin magazine, and a change ejector for the magazine which ejects coins the number of which is proportional to the extent of vertical movement of the change slide.

18. In apparatus of the class described, a coin classifier, a feeler finger movable in said classifier to engage a coin therein, a laterally and vertically slidable master control finger whose lateral position is determined by the feeler finger engaging a coin, a change slider engageable by said master control finger in its vertical movement thereby transmitting vertical movement to the change slider, the extent of said vertical movement depending upon the lateral position of the control finger, a change coin magazine, and an oscillating change ejector for the magazine which ejects one coin for each oscillation, the number of oscillations being proportional to the extent of vertical movement of the change slide.

19. In apparatus of the class described, a coin classifier, a feeler finger movable in said classifier to engage a coin therein, a laterally and vertically slidable master control finger whose lateral position is determined by the feeler finger engaging a coin, a change slider engageable by said master control finger in its vertical movement thereby transmitting vertical movement to the change slider, the extent of said vertical movement depending upon the lateral position of the control finger, a change coin magazine, an oscillating ejector for the magazine, an eccentric driving the ejector, and gears connecting the eccentric to the change slide so that a predetermined number of oscillations is made proportional to a predetermined extent of movement of the change slide.

20. In apparatus of the class described, a coin classifier, a feeler finger movable in said classifier to engage a coin therein, a laterally and vertically slidable master control finger whose lateral position is determined by the feeler finger engaging a coin, a change slider engageable by said master control finger in its vertical movement thereby transmitting vertical movement to the change slider, the extent of said vertical movement depending upon the lateral position of the control finger, a change coin magazine, an oscillating change ejector for the magazine which ejects one coin for each oscillation, the number of oscillations being proportional to the extent of vertical movement of the change slider and an ejector finger for pressing the coin out of the oscillating ejector.

21. In apparatus of the class described, a coin classifier, a plurality of passages leading from said classifier, a change coin magazine to which one of said passages lead, a gate covering the entrance to said magazine passage and adapted to obstruct another of the passages when it is swung open, means to open said gate controlled by the proper denomination of coin in the classifier, change making mechanism controlled by the denomination of coin in the classifier for removing coins from said magazine, and means to release the coin from said classifier.

22. In apparatus of the class described a coin classifier, a plurality of passages below said classifier, change coin magazines to which said passages lead, gates covering the entrances to said passages, means to swing one of said gates open dependent upon the denomination of coin in the classifier, change making mechanism controlled by the denomination of coin in the classifier for removing change coins from at least one of the magazines, and means to release the coin from the classifier.

23. In apparatus of the class described a coin classifier, a plurality of change passages and a rejector passage leading therefrom, a change magazine, gates normally closing said passages leading to the change magazine, a gate normally open to said rejector passsage, means to close said ejector passage gate, ejector means to render said ejector passage gate closing means inoperative, means to open a gate leading to said change magazine controlled by the denomination of coin in the classifier, and means to release the coin from the classifier.

24. In apparatus of the class described a coin classifier, a plurality of passages leading from said classifier, a change coin magazine to which one of said passages lead, a gate covering the entrance to said magazine passage and adapted to obstruct another of the passages when it is swung open, a feeler finger movable in said classifier adapted to engage the edge of a coin therein, means for opening the gate controlled by the position of the feeler when engaging a predetermined denomination of coin in the classifier, change making mechanism controlled by the denomination of the coin in the classifier for removing coins from the magazine, and means to release the coin from the classifier.

25. In apparatus of the class described a coin classifier, a plurality of passages leading from said classifier, a change coin magazine to which one of said passages lead, a gate covering the entrance to said magazine passage and adapted to obstruct another of the passages when it is swung open, a feeler finger movable in said classifier adapted to engage the edge of a coin therein, a lever engageable by the finger at a position determined by a predetermined denomination of coin in the classifier, connecting means between said lever and gate, and means to release the coin from the classifier.

26. In apparatus of the class described, a coin classifier, a feeler finger movable in said classifier to engage a coin therein, a slidable control finger, a connecting means between said control finger and the feeler finger so that the position of the control finger is determined by the position of the feeler finger engaging a coin, a plurality of change sliders one or more of which are engaged by the control finger depending upon the position of the finger, change making mechanism controlled by said change sliders, an operating shaft, and connecting means between said operating shaft and the feeler finger to drive said feeler finger from the operating shaft.

27. In apparatus of the class described a coin classifier, a feeler finger movable in said classifier to engage a coin therein, a slider block, a master control finger slidably mounted upon said slider block for lateral movement thereon, a connecting rod between said master control finger and the feeler finger so that the lateral position of the control finger is determined by said feeler finger, an operating shaft, a driving connection between said operating shaft and slider block, a driving means between said slider block and the feeler finger, and a plurality of change making mechanisms engageable by the master control finger dependent upon the lateral position of the finger.

28. In apparatus of the class described a coin classifier, a feeler finger movable in said classifier to engage a coin therein, a slider block, a master control finger slidably mounted upon said slider block for lateral movement thereon, a connecting rod between said master control finger and the feeler finger so that the lateral position of the control finger is determined by said feeler finger, an operating shaft, a driving connection between said operating shaft and slider block, a lost motion driving means between said slider block and the feeler finger, and a plurality of change making mechanisms engageable by the master control finger dependent upon the lateral position of the finger.

29. In apparatus of the class described a coin classifier, a feeler finger movable in said classifier to engage a coin therein, a slider block, a master control finger slidably mounted upon said slider block for lateral movement thereon, a connecting rod between said master control finger and the feeler finger so that the lateral position of the control finger is determined by said feeler finger, an operating shaft, a driving connection between said operating shaft and slider block, a gear secured to the feeler finger, a lost motion driving means connecting said gear and the slider block, and a plurality of change making mechanisms engageable by the master control finger dependent upon the lateral position of the finger.

30. In apparatus of the class described a coin classifier, a feeler finger movable in said classifier to engage a coin therein, a slider block, a master control finger slidably mounted upon said slider block for lateral movement thereon, a connecting rod between said master control finger and the feeler finger so that the lateral position of the control finger is determined by said feeler finger, an operating shaft, a driving connection between said operating shaft and slider block, a gear secured to the feeler finger, a second gear in mesh with said first gear, a plate projecting into the path of the slider block and rotated thereby, a lost motion connection between said plate and second gear, and a plurality of change making mechanisms engageable by the master control finger dependent upon the lateral position of the finger.

31. In apparatus of the class described, a coin classifier, a feeler finger movable in the classifier to engage the edge of a coin therein, a master control finger movable laterally, connecting means connecting the feeler finger and the master control finger which connection results in the control finger taking a lateral position determined by the denomination of coin in the classifier, a slider, a plurality of steps on said slider one of which is engageable by the master control finger which determines extent of movement of slider, a pawl operable by said slider, a rack engaged by said pawl and movable a distance proportional to extent of movement of slider, a change magazine, a change ejector operable to eject coins the number of which is proportional to extent of movement of the rack, and an operating shaft having driving connection with the master control finger.

32. In apparatus of the class described, a coin classifier, a passage leading from said classifier, a plurality of branches leading from said passage, a coin receptacle at the end of each branch, pivoted gates closing the branches, a feeler finger movable in said classifier to engage the edge of a coin therein, means operable by the feeler finger when engaging a predetermined denomination of coin to open one of the gates, means to release the coin from the classifier to deposit it in its proper receptacle, change coin magazines adjacent the receptacles, a shuttle transferring the coin from the receptacle to the magazine, and an operating shaft for driving the shuttle and feeler finger.

33. In apparatus of the class described, a coin classifier, a passage leading from said classifier, a plurality of branches leading from said passage, a coin receptacle at the end of each branch, pivoted gates closing the branches, a feeler finger movable in said classifier to engage the edge of a coin therein, means operable by the feeler finger when engaging a predetermined denomination of coin to open one of the gates, means to release the coin from the classifier to deposit it in its proper receptacle, change coin magazines adjacent the receptacle, a shuttle transferring the coin from the receptacle to the magazine, an operating shaft connected to said feeler finger, and a cam on the operating shaft to drive the shuttle.

34. In apparatus of the class described, a coin classifier, a feeler finger movable in said classifier to engage a coin therein, change making mechanism for returning change coins controlled by the feeler finger, a single manually manipulable fare selector, means controlled by said fare selector which renders the change making mechanism inoperable for a predetermined amount of its operation determined by the number of fares to be collected, and operating means to drive the change making mechanism.

35. In apparatus of the class described, a change slider having a predetermined amount of movement, change making mechanism adapted to return a predetermined number of change coins for a full movement of the slider, a driving means between the slider and the change making mechanism, a fare selector, means controlled by said fare selector to render said driving means inoperative during a part of the full movement of the slider to return less than the full predetermined number of coins, and an operating means to drive the slider.

36. In apparatus of the class described, a change slider having a predetermined amount of movement, change making mechanism adapted to return a predetermined number of change coins for a full movement of the slider, a driving means between the slider and the change making mechanism, a fare selector, means controlled by said fare selector to render said driving means inoperative during a part of the full movement of the slider to return less than the full predetermined number of coins, a registering counter, counter connections set by the fare selector to register the number of fares to be collected and operated by the slide, and operating means to drive the slide.

37. In apparatus of the class described, a change slider having a predetermined amount of movement, change making mechanism adapted to return a predetermined number of change coins for a complete movement of the slider, a pawl driven by said slider, a rack engaged by the pawl and driving the change making mechanism, a fare selector, means controlled by the fare selector to hold the pawl out of engagement with the rack for a portion of the movement of the slider to return less than the predetermined number of change coins ejected for a full movement of the slider, and an operating means to drive the slider.

38. In apparatus of the class described, a coin classifier, a feeler finger movable in the classifier to engage a coin therein, a change slider, a plurality of arms of different lengths provided on the change slider to determine extent of movement of the slider, a master control finger having lateral movement to selectively engage one of said arms, a connecting rod connecting the feeler finger and the master control finger to determine lateral position of the control finger and the arm it will engage on the change slider, a pawl driven by the slider, a rack engaged by the pawl, change making mechanism driven by the rack, a fare selector, means controlled by the fare selector to hold the pawl out of engagement with the rack for a portion of the movement of the slider to return less than the predetermined number of change coins ejected for a full movement of the slider, and an operating means to drive the slider.

39. In apparatus of the class described, a coin classifier, a feeler finger movable in the classifier to engage a coin therein, a change slider, a plurality of arms of different lengths provided on the change slider to determine extent of movement of the slider, a master control finger having lateral movement to selectively engage one of said arms, a connecting rod connecting the feeler finger and the master control finger to determine lateral position of the control finger and the arm it will engage on the change slider, a pawl driven by the slider, a rack engaged by the pawl, a gear driven from the rack, an eccentric driven by the gear, an ejector lever driven by the eccentric, a change coin magazine from which coins are ejected by the ejector lever, a fare selector, means controlled by the fare selector to hold the pawl out of engagement with the rack for a portion of the movement of the slider to return less than the predetermined number of change coins ejected for a full movement of the slider, and an operating means to drive the slider.

40. In apparatus of the class described, a coin classifier, a feeler finger movable in said classifier to engage a coin therein, a laterally slidable master control finger, a connection between the feeler and control fingers thereby determining the lateral position of the latter, a slider engageable by the control finger when the feeler finger engages a coin in the classifier, a slotted lever pivoted at its midpoint, and engageable by the slider to rotate it, a counter driving rod having its end slidable in the slot of the slotted lever, a fare selector, change making mechanism controlled by the fare selector, connecting means between the fare selector and the connector driver to position the end of the driver in the slot relative to the pivotal point of the slotted lever, a registering counter connected to the counter driving rod, and an operating means to drive the control finger.

41. In apparatus of the class described, a fare collecting means to collect a fare from a deposited coin, a slide, a pivoted lever rotatable by the slide about its pivot, a counter driving rod having one end slidable along the pivoted lever, a registering counter connected to the other end of the driving rod, a fare selector connected to the counter driving rod with which the position of the end of the rod is adjusted relatively to the pivot of pivoted lever to register the number of fares collected, and an operating means to drive the fare collecting means.

42. In apparatus of the class described, a fare collecting means to collect a fare from a deposited coin, a slide, a pivoted lever rotatable by the slide about its pivot, a counter driving rod having one end slidable along the pivoted lever, a registering counter connected to the other end of the driving rod, a fare selector connected to the counter driving rod with which the position of the end of the rod is adjusted relatively to the pivot of pivoted lever to register the number of fares collected, a ratchet to secure the fare selector in selected position, and an operating means to drive the fare collecting means.

43. In apparatus of the class described, a fare collecting means to collect a fare from a deposited coin, a slide, a pivoted lever rotatable by the slide about its pivot, a counter driving rod having one end slidable along the pivoted lever, a registering counter connected to the other end of the driving rod, a fare selector connected to the counter driving rod with which the position of the end of the rod is adjusted relatively to the pivot of pivoted lever to register the number of fares collected, a ratchet to secure the fare selector in selected position manual means to release the ratchet in case of error, and an operating means to drive the fare collecting means.

44. In apparatus of the class described, a fare collecting means to collect a fare from a deposited coin, a slide operated therewith, a pivoted and slotted lever rotatable by the slide about its pivot, a counter driving rod, having its end slidable in the slot of the lever, a counter connected to the other end of the driving rod, a fare selector connected to the counter driving rod with which the position of the end of the rod in the slot relative to the pivot of the slotted lever is adjusted to register the number of fares collected, and an operating means to drive the slide.

45. In apparatus of the class described, a fare collecting means to collect a fare from a deposited coin, a slide operated therewith, a pivoted and slotted lever rotatable by the slide about its pivot, a counter driving rod having its end slidable in the slot of the lever, a counter connected to the other end of the driving rod, a fare selector, a cam rotatable by the fare selector, means controlled by the cam to position the end of the counter driving rod in the slot relatively to the pivot of the slotted lever to register the number of fares collected, and an operating means to drive the fare collecting means.

46. In apparatus of the class described, a fare collecting means to collect a fare from a deposited coin, a slide operated therewith, a pivoted and slotted lever rotatable by the slide about its pivot, a counter driving rod having its end slidable in the slot of the lever, a counter connected to the other end of the driving rod, a fare selector, a cam rotatable by the fare selector, a lever engageable by the cam and adapted to be rotated thereby, a link connecting the lever and the end of the counter driving rod in the slot relatively to the pivot of the slotted lever to register the number of fares collected, and an operating means to drive the fare collecting means.

47. In apparatus of the class described, a fare collecting means to collect a fare from a deposited coin, a slide operated therewith, a pivoted and slotted lever rotatable by the slide about its pivot, a counter driving rod having its end slidable in the slot of the lever, a counter connected to the other end of the driving rod, a fare selector, a cam rotatable by the fare selector, a ratchet to hold the cam in rotated position, means controlled by the cam to position the end of the counter driving rod in the slot relatively to the pivot of the slotted lever to register the number of fares collected, and an operating means to drive the fare collecting means.

48. In apparatus of the class described, a fare collecting means to collect a fare from a deposited coin, a slide operated therewith, a pivoted and slotted lever rotatable by the slide about its pivot, a counter driving rod having its end slidable in the slot of the lever, a counter connected to the other end of the driving rod, a fare selector, a cam rotatable by the fare selector, a ratchet to hold the cam in rotated position, an error lever to release the ratchet, means controlled by the cam to position the end of the counter driving rod in the slot relatively to the pivot of the slotted lever to register the number of fares collected, and an operating means to drive the fare collecting means.

49. In apparatus of the class described, a fare collecting means to collect a fare from a deposited coin, a slide operated therewith, a pivoted and slotted lever rotatable by the slide about its pivot, a counter driving rod having its end slidable in the slot of the lever, a counter connected to the other end of the driving rod, a fare selector, a cam rotatable by the fare selector, a ratchet to hold the cam in rotated position, means controlled by the cam to position the end of the counter driving rod in the slot relatively to the pivot of the slotted lever to register the number of fares collected, an operating means to drive the fare collecting means, and automatic means to release the ratchet upon collection of the fare.

50. In apparatus of the class described, a fare collecting means to collect a fare from a deposited coin, a slide operated therewith, a pivoted and slotted lever rotatable by the slide about its pivot, a counter driving rod having its end slidable in the slot of the lever, a counter connected to the other end of the driving rod, a fare selector, a cam rotatable by the fare selector, a ratchet to hold the cam in rotated position, and automatic means to release the ratchet upon collection of the fares.

51. In apparatus of the class described, a coin classifier having a pivoted jaw, coin releasing means to swing the pivoted jaw of the classifier, a fare collecting means to collect a fare from the deposited coin, a slide, a pivoted lever rotatable by the slide about its pivot, a counter driving rod having one end slidable along the pivoted lever, a registering counter connected to the other end of the driving rod, a fare selector connected to the counter driving rod with which the position of the end of the rod is adjusted relatively to the pivot of pivoted lever to register the number of fares collected, a ratchet to secure the fare selector in selected position, ratchet releasing means connected with the classifier coin releasing means, and operating means to drive the fare collecting means.

52. In apparatus of the class described, a coin chute, a trigger normally closing the chute and removable therefrom by pressure of a coin being inserted, a shutter connected to and released by the trigger to close the chute when a coin has been inserted, a pivoted locking hook rotatable into a slot in the shutter to lock it in closed position, an arm on said hook, and an operating means engaging the arm to release the locking means and reset the shutter and trigger in normal position.

53. In apparatus of the class described, a coin chute, a trigger normally closing the chute and removable therefrom by pressure of a coin being inserted, a shutter connected to and released by the trigger to close the chute when a coin has been inserted, a pivoted locking hook rotatable into a slot in the shutter to lock it in closed position, an arm on said hook engaging and rotating said shutter to normal position, a second arm on said hook, and an operating means engaging the second arm to release the locking means and reset the shutter and trigger in normal position.

54. In apparatus of the class described, a coin chute, a trigger normally closing the chute and removable therefrom by pressure of a coin being inserted, a shutter connected to and released by the trigger to close the chute when a coin has been inserted, a pivoted locking hook rotatable into a slot in the shutter to lock it in closed position, an arm on said hook engaging and rotating said shutter to normal position, a second arm on said hook, a slide engaging the second arm of the hook releasing it and reset the trigger and shutter in normal position, fare collecting and change making mechanism operated by the slide, and operating means connected to and driving the slide.

55. In apparatus of the class described, a coin classifier, a passage leading therefrom, a change coin magazine, a branch passage leading to the magazine from the first passage, a gate normally closing the branch passage, means opening the gate when a coin of a certain denomination rests in the classifier to direct the coin to the magazine and becoming inoperable when the magazine is full of change coins, change making mechanism for removing coins from the magazine, and operating means to drive the change making mechanism.

56. In apparatus of the class described, a coin classifier, a passage leading therefrom, a change coin magazine, a branch passage leading to the magazine from the first passage, a gate normally closing the branch passage, means opening the gate when a coin of a certain denomination rests in the classifier to direct the coin to the magazine, means operated by the coins in the magazine when the magazine is full to render the gate opening means inoperable, change making mechanism for removing coins from the magazine, and operating means to drive the change making mechanism.

57. In apparatus of the class described, a coin classifier, a feeler finger movable in the classifier to engage a coin therein, a passage leading from the classifier, a branch passage leading from the first passage, a gate normally closing the branch passage, a lever operated by the feeler finger when engaging a coin of a predetermined denomination, connecting means between the lever and the gate to open the gate when the lever is operated, means controlled by the coins in the magazine when full to break the connecting means to render the gate inoperable by the lever, change coin mechanism to eject change from the magazine, and operating means to drive the change making mechanism.

58. A change making machine comprising common means for receiving coins of different denominations and having provisions for locating said coins in different positions, a plurality of change magazines, an ejector for each of said magazines, and normally inoperative mechanism common to said ejectors for actuating the same, said mechanism being provided with means cooperating with a coin while in the first mentioned means to render the same operative to actuate one of said ejectors.

59. A change making machine comprising change return mechanism, and means for receiving a coin into operative position in the machine, said means comprising a device actuated by the deposit of a coin into said receiving means for preventing the insertion of a second coin therein, in combination with mechanism for actuating said change return mechanism, said actuating mechanism comprising means for rendering said device inoperative so as to enable another coin to be inserted into operative position in said receiving means.

60. A change making machine comprising change return mechanism, and means for receiving a deposited coin into operative position in the machine, said means comprising a device actuated by the deposit of a coin into said receiving means for preventing the deposit of a second coin therein, in combination with mechanism controlled by the deposited coin for actuating said change return mechanism, said actuating mechanism comprising means for rendering said device inoperative so as to enable another coin to be deposited into operative position in said receiving means, and means cooperating with the receiving means for normally preventing the operation of said actuating mechanism.

61. A change making machine comprising change return mechanism, and common means including a common passageway for receiving a deposited coin of any denomination into operative position in the machine, said means comprising a device actuated by the deposit of such a coin into said receiving means for preventing the deposit of a second coin therein, in combination with mechanism controlled by the deposited coin for actuating said change return mechanism, and means operated by said actuating mechanism for rendering said device inoperative so as to enable another coin to be deposited into operative position in said receiving means.

62. A change making machine comprising change return mechanism, a chute through which a coin is adapted to be deposited in the machine, a trigger normally in the path of the coin through said chute but removable therefrom by pressure of the coin being deposited, and a shutter connected to and released by the trigger to close the chute when a coin has been deposited, in combination with mechanism controlled by the deposited coin for actuating said change return mechanism, and means operated by said actuating mechanism to restore the shutter and trigger to normal position.

63. A change making machine comprising change return mechanism, a coin chute, a trigger normally closing the chute and removable therefrom by pressure of the coin being deposited, and a shutter connected to and released by the trigger to close the chute when a coin has been inserted, in combination with mechanism controlled by the deposited coin for actuating said change return mechanism, and means operated by said actuating mechanism to restore the shutter and trigger to normal position.

64. A change making machine comprising change return mechanism, a coin chute, a trigger normally in the path of the coin passing through said chute and removable therefrom by pressure of the coin being inserted, a shutter connected to and released by the trigger to close the chute when a coin has been inserted, and locking means securing the shutter in closed position, in combination with mechanism controlled by the deposited coin for actuating said change return mechanism, and means operated by said actuating mechanism to release the locking means and restore the shutter and trigger to normal position.

65. A change making machine comprising change return mechanism, a common chute for receiving deposited coins of any denomination into operative position in the machine, a passageway for conducting the coin from said chute to a storage receptacle in the machine, a second passageway for conducting the coin from said chute to the exterior of the machine, a trigger normally in the path of the coin passing through the chute and removable therefrom by pressure of the coin being deposited, a shutter connected to and released by the trigger to close the chute when a coin has been inserted, and locking means securing the shutter in closed position, in combination with mechanism controlled by the deposited coin for actuating said change return mechanism, and means operated by said actuating mechanism to release the locking means and restore the shutter and trigger to normal position, and means for selectively discharging said coin from its operative position into either of said passageways.

66. A change making machine comprising a change return mechanism, a common chute for receiving deposited coins of any denomination into operative position therein, a passageway for conducting the coin from said chute to a storage receptacle in the machine, a second passageway from said chute to the exterior of the machine, and means for the admission of a deposited coin into operative position in the chute, said means comprising a device actuated by the deposit of a coin into said chute for preventing the insertion of a second coin therein, in combination with mechanism for actuating said change return mechanism, said actuating mechanism comprising means for rendering said device inoperative so as to enable another coin to be inserted into operative position in said receiving means, and means for selectively discharging said coin from its operative position in said chute into either of said passageways.

67. A change making machine comprising change return mechanism, a common chute for receiving deposited coins of any denomination into operative position therein, a passageway for conducting the coin from said chute to a storage receptacle in the machine, a second passageway from said chute to the exterior of the machine, and means for controlling the admission of a deposited coin into operative position in the chute, said means comprising a device actuated by the deposit of a coin into said chute for preventing the deposit of a second coin therein, in combination with mechanism controlled by the deposited coin for actuating said change return mechanism, said actuating mechanism comprising means for rendering said device inoperative so as to enable another coin to be deposited into operative position in said chute, means for selectively discharging said coin from its operative position in said chute into either of said passageways, and means cooperating with the controlling means for normally preventing the operation of said actuating mechanism.

68. A change making machine comprising change return mechanism, a common chute for receiving deposited coins of any denomination into operative position therein, a passageway for conducting the coin from said chute to a storage receptacle in the machine, a second passageway from said chute to the exterior of the machine, and common means controlling the admission of a deposited coin of any denomination into operative position in the chute, said means comprising a device actuated by the deposit of such a coin into said receiving means for preventing the deposit of a second coin therein, in combination with mechanism controlled by the deposited coin for actuating said change return mechanism, means operated by said actuating mechanism for rendering said device inoperative so as to enable another coin to be deposited into operative position in said receiving means, means for selectively discharging said coin from its operative position in the chute into either of said passageways, and means cooperating with said coin admission controlling mechanism for normally preventing the operation of said actuating mechanism.

69. A change making machine comprising change return mechanism, a coin collecting receptacle, and means for receiving a coin into operative position in the machine, said means comprising a device actuated by the deposit of a coin into said receiving means for preventing the insertion of a second coin therein, in combination with mechanism controlled by the deposited coin for actuating said change return mechanism, said actuating mechanism comprising means for rendering said device inoperative so as to enable another coin to be inserted into operative position in said receiving means, and means operated by said actuating mechanism for discharging said coin from its operative position into said coin collecting receptacle.

70. A change making machine comprising change return mechanism, a coin storage receptacle, and means for receiving a deposited coin into operative position in the machine said means comprising a device actuated by the deposit of a coin into said receiving means for preventing the deposit of a second coin therein, in combination with mechanism controlled by the deposited coin for actuating said change return mechanism, said actuating mechanism comprising means for rendering said device inoperative so as to enable another coin to be deposited into operative position in said receiving means, means operated by said actuating mechanism for discharging said coin from its operative position into said coin storage receptacle, and means cooperating with the receiving means for normally preventing the operation of said actuating mechanism.

71. A change making machine comprising change return mechanism, a coin storage receptacle, and common means including a common passageway for receiving a deposited coin of any denomination into operative position in the machine, said means comprising a device actuated by the deposit of such a coin into said receiving means for preventing the deposit of a second coin therein, in combination with mechanism controlled by the deposited coin for actuating said change return mechanism, means operated by said actuating mechanism for rendering said device inoperative so as to enable another coin to be deposited into operative position in said receiving means, and means operated by said actuating mechanism for discharging said coin from its operative position into said storage receptacle.

72. A change making machine comprising a change return mechanism, a common chute for receiving deposited coins of any denomination into operative position therein, a passageway for conducting the coin from said chute to a storage receptacle in the machine, a second passageway from said chute to the exterior of the machine, and means for the admission of a deposited coin into operative position in the chute, said means comprising a device actuated by the deposit of a coin into said chute for preventing the insertion of a second coin therein, in combination with mechanism for actuating said change return mechanism, said actuating mechanism comprising means for rendering said device inoperative so as to enable another coin to be inserted into operative position in said receiving means, means actuated by said actuating mechanism for discharging said coin from its operative position in said chute into the first mentioned passageway, and a manually operated device for controlling the discharge by said actuating device of the coin from said chute into the second passageway.

73. A change making machine comprising change return mechanism, a common chute for receiving deposited coins of any denomination into operative position therein, a passageway for conducting the coin from said chute to a storage receptacle in the machine, a second passageway from said chute to the exterior of the machine, and means for controlling the admission of a deposited coin into operative position in the chute, said means comprising a device actuated by the deposit of a coin into said chute for preventing the deposit of a second coin therein, in combination with mechanism controlled by the deposited coin for actuating said change return mechanism, said actuating mechanism comprising means for rendering said device inoperative so as to enable another coin to be deposited into operative position in said chute, means actuated by said actuating mechanism for discharging said coin from its operative position in said chute into the first mentioned passageway, a manually operated device for controlling the discharge by said actuating device of the coin from said chute into the second passageway, and means cooperating with the controlling means for normally preventing the operation of said actuating mechanism.

74. A change making machine comprising change return mechanism, a common chute for receiving deposited coins of any denomination into operative position therein, a passageway for conducting the coin from said chute to a storage receptacle in the machine, a second passageway from said chute to the exterior of the machine, and common means controlling the admission of a deposited coin of any denomination into operative position in the chute, said means comprising a device actuated by the deposit of such a coin into said receiving means for preventing the deposit of a second coin therein, in combination with mechanism controlled by the deposited coin for actuating said change return mechanism, means operated by said actuating mechanism for rendering said device inoperative so as to enable another coin to be deposited into operative position in said receiving means, means actuated by said actuating mechanism for discharging said coin from its operative position in the chute into the first mentioned passageway, a manually operated device for controlling the discharge by said actuating device of the coin from said chute into the second passageway, and means cooperating with said coin admission controlling mechanism for normally preventing the operation of said actuating mechanism.

75. A change making machine comprising a chute for receiving a deposited coin into operative position in the machine, a passageway leading from said chute to a storage receptacle in the machine, and a passageway leading from said chute through which deposited coins are adapted to be ejected, in combination with change return mechanism, mechanism for discharging a deposited coin from said chute into the first mentioned passageway, said discharging mechanism comprising means for actuating said change return mechanism, and manually controlled means for rendering said discharging mechanism inoperative to actuate said change return mechanism and for rendering the same operative to discharge the coin deposited into the second mentioned passageway.

76. A change making machine, comprising a chute for receiving a deposited coin into operative position in the machine, a passageway leading from said chute to a storage receptacle in the machine, and a passageway leading from said chute through which deposited coins are adapted to be ejected, in combination with change return mechanism, mechanism for discharging a deposited coin from said chute into the first mentioned passageway, said discharging mechanism comprising means for actuating said change return mechanism, means cooperating with said change return mechanism to control the amount of change to be returned, and manually controlled means for rendering said discharging mechanism inoperative to actuate said change return mechanism and for simultaneously rendering the same operative to discharge the coin deposited into the second mentioned passageway.

77. A change making machine comprising means for receiving a deposited coin into operative position in the machine, a plurality of passageways leading from said means into the machine, in combination with change return mechanism, and mechansim for discharging a deposited coin from said means into one of said passageways, said mechanism comprising means for actuating said change return mechanism and also comprising means controlled by the size of the coin deposited for determining into which passageway said coin is discharged.

78. A change making machine comprising a chute for receiving a deposited coin, a plurality of passageways leading from said chute into the machine, in combination with change return mechanism, and mechanism for discharging a deposited coin from said chute into one of said passageways, said mechanism comprising means for actuating said change return mechanism and also comprising means controlled by the size of the coin deposited for determining into which passageway the coin is discharged.

79. A change making machine comprising means for receiving a deposited coin into operative position in the machine, a plurality of passageways leading from said means into the machine, and a passageway through which the deposited coin is adapted to be ejected, in combination with change return mechanism, mechanism for discharging a deposited coin from said means into one of said plurality of passageways, said discharging mechanism comprising means for actuating said change return mechanism, and manually controlled means for rendering said discharge mechanism inoperative to actuate said change return mechanism and for rendering the same operative to discharge the deposited coin into the passageway through which it is ejected.

80. A change making machine comprising means for receiving a deposited coin into operative position in the machine, a plurality of passageways leading from said means into the machine, and a passageway through which the deposited coin is adapted to be ejected, in combination with change return mechanisms, mechanism for discharging a deposited coin from said means into one of said plurality of passageways, said discharging mechanism comprising means for actuating said change return mechanism, means cooperating with said change return mechanism to control the amount of change to be returned, and manually controlled means for rendering said discharge mechanism inoperative to actuate said change return mechanism and for rendering the same operative to discharge the deposited coin into the passageway through which it is ejected.

81. A change making machine comprising a common chute for receiving deposited coins of any denomination into operative position in the machine, a passageway leading from said chute to a storage receptacle in the machine, and a passageway leading from said chute through which deposited coins are adapted to be ejected, in combination with change return mechanism, mechanism for discharging a deposited coin of any denomination from said chute into the first mentioned passageway, said discharging mechanism comprising means common to the different denomination of coins deposited for actuating said change return mechanism, and manually controlled means for rendering said discharging mechanism inoperative to actuate said change return mechanism and for simultaneously rendering the same operative to discharge the coin deposited into the second mentioned passageway.

82. A change making machine, comprising a common chute for receiving deposited coins of any denomination into operative position in the machine, a passageway leading from said chute to a storage receptacle in the machine, and a passageway leading from said chute through which deposited coins are adapted to be ejected, in combination with change return mechanism, mechanism for discharging a deposited coin of any denomination from said chute into the first mentioned passageway, said discharging mechanism comprising means common to the different denominations of coins deposited for actuating said change return mechanism, means cooperating with said change return mechanism to control the amount of change to be returned, and manually controlled means for rendering said discharging mechanism inoperative to actuate said change return mechanism and for simultaneously rendering the same operative to discharge the coin deposited into the second mentioned passageway.

83. A change making machine comprising common means for receiving deposited coins of any denomination into operative position in the machine, a plurality of passageways leading from said means into the machine, in combination with change return mechanism and mechanism for discharging a deposited coin from said means into one of said passageways, said mechanism comprising means common to the different denomination of coins deposited for actuating said change return mechanism and also comprising means controlled by the size of the coin deposited for determining through which of said passageways said coin is discharged.

84. A change making machine comprising a chute for receiving a deposited coin, a plurality of passageways leading from said chute into the machine, in combination with change return mechanism, mechanism for discharging a deposited coin from said chute into one of said passageways, said mechanism comprising means for actuating said change return mechanism and also comprising means controlled by the size of the coin deposited for determining into which passageway the coin is deposited, and means for varying the number of fares to be collected from a deposited coin.

85. A change making machine comprising means for receiving a deposited coin of any denomination into operative position in the machine, a plurality of passageways leading from said means into the machine, and a passageway through which a deposited coin is adapted to be ejected, in combination with change return mechanism, mechanism for discharging a deposited coin from said means into one of said plurality of passageways, said discharging mechanism comprising means for actuating said change return mechanism, means for determining the number of fares to be collected from said coin, and manually controlled means for rendering said discharge mechanism inoperative to actuate said change return mechanism and for rendering the same operative to discharge the deposited coin into the passageway through which a coin is ejected.

86. A change making machine comprising common means for receiving deposited coins of different denominations into operative position in the machine, a plurality of passageways leading from said means into the machine, and a passageway through which the deposited coins are adapted to be ejected, in combination with change return mechanisms, mechanism for discharging a deposited coin from said means into one of said plurality of passageways, said discharging mechanism comprising means for actuating said change return mechanism, means common to the different denominations of coins deposited and cooperating with said change return mechanism to collect a predetermined number of fares from any such coins, and manually controlled means for rendering said discharge mechanism inoperative to actuate said change return mechanism and for rendering the same operative to discharge a deposited coin into the passageway through which said coin in ejected, and means controlled by the size of the coin deposited for determining through which of said plurality of passageways the coin is to be discharged into the machine.

87. A change making machine comprising means for receiving deposited coins into operative position in the machine, a plurality of storage receptacles, and mechanism for discharging the coins from said means into said receptacles, said mechanism including means controlled by the size of the coin deposited for determining into which receptacle the coin is discharged in combination with change return mechanism adapted to be actuated in timed relationship with respect to said discharging mechanism.

88. A change making machine comprising means for receiving deposited coins into operative position in the machine, a plurality of storage receptacles, and mechanism for discharging the coins from said means into said receptacles, said mechanism including means controlled by the size of the coin deposited for determining into which receptacle the coin is discharged, and means cooperating with said mechanism for rejecting any coin in the receiving means from the machine.

89. A change making machine comprising a plurality of storage receptacles, and mechanism for inserting deposited coins into said receptacles, said mechanism including means controlled by the size of the coin deposited for determining into which receptacle the coin is inserted in combination with change return mechanism adapted to be actuated in timed relationship with respect to said inserting mechanism.

90. A change making machine comprising a plurality of storage receptacles, and mechanism for conveying deposited coins into said receptacles, said mechanism including movable means common to the different denominations of coins and controlled by the size of the coin deposited for determining into which receptacle the coin is conveyed, in combination with means for utilizing coins conveyed to one or more of said receptacles for change making.

91. A change making machine comprising a plurality of storage receptacles, mechanism for conveying deposited coins into said receptacles, said mechanism including movable means controlled by the size of the coin deposited for determining into which receptacle the coin is conveyed, means cooperating with said mechanism for rejecting any coin from the machine, and means for utilizing coins conveyed to one or more of said receptacles for change making.

92. A change making machine comprising a plurality of change magazines, mechanism for conveying deposited coins to said magazines, said mechanism including means controlled by the size of the coin deposited for determining into which magazine the coin is conveyed, a storage chamber, means for loading the magazines from the bottom thereof, and means controlled by the height of the coins in a magazine for discharging the deposited coins of that denomination directly into the storage chamber.

93. A change making machine comprising a change magazine, mechanism for conveying deposited coins to said magazine, a storage chamber, means for loading the magazine from the bottom thereof, and means controlled by the height of the coins in said magazine for discharging the deposited coins directly into the storage chamber.

94. A change making machine comprising a plurality of change magazines, mechanism for conveying deposited coins to said magazines, said mechanism including means controlled by the size of the coin deposited for determining into which magazine the coin is conveyed, a storage chamber, means for loading the magazines from the bottom thereof, means controlled by the height of the coins in a magazine for discharging the deposited coins of that denomination directly into the storage chamber, and means for returning change from said magazines.

95. A change making machine comprising a change magazine, mechanism for conveying deposited coins to said magazine, a storage chamber, means for loading the magazine from the bottom thereof, means controlled by the height of the coins in said magazine for discharging the deposited coins directly into the storage chamber, and means for utilizing the coins in said magazine for change making.

96. A change making machine comprising change return mechanism, means for receiving a coin into operative position in the machine, said means comprising a device actuated by the deposit of a coin into said receiving means for preventing the insertion of a second coin therein, and means for automatically locking said device in its actuated position, in combination with mechanism for actuating said change return mechanism, said actuating mechanism comprising means for unlocking said device and for rendering the same inoperative so as to enable another coin to be inserted into operative position in said receiving means.

97. A change making machine comprising change return mechanism, common means including a common passageway for receiving a deposited coin of any denomination into operative position in the machine, said means comprising a device actuated by the deposit of such a coin into said receiving means for preventing the deposit of a second coin therein, and means for automatically locking said device in its actuated position, in combination with mechanism controlled by the deposited coin for actuating said change return mechanism, and means operated by said actuating mechanism for unlocking said device and for rendering the same inoperative so as to enable another coin to be deposited into operative position in said receiving means.

98. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a lever and connecting rod adapted to actuate said register and means for varying the purchase between said lever and connecting rod in accordance with the number of fares collected.

99. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a lever arm, a connecting rod having one end slidably connected thereto, and means for sliding the end of said rod along said lever to vary the stroke of said rod.

100. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a lever arm, a connecting rod, and means for varying the stroke of said connecting rod.

101. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a lever arm having a slot therein, a connecting rod having one end slidably mounted in said slot, and means for variously positioning said rod in said slot to vary the stroke of said rod.

102. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a lever, a connecting rod adapted to have one end thereof operatively positioned along said lever at various points with respect to the fulcrum thereof and means for varying at will the position of said connecting rod with respect to said fulcrum.

103. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a collector index, a lever, a connecting rod adapted to have one end thereof operatively positioned along said lever at various points with respect to the fulcrum thereof, and means actuated by said collector index for varying at will the position of said connecting rod with respect to said fulcrum.

104. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a collector index, a lever, a connecting rod adapted to have one end thereof operatively positioned along said lever at various points thereof, and means for varying at will the position of said connecting rod and lever in accordance with a predetermined setting of said collector index.

105. A change making machine comprising, means for receiving deposited coins of different denominations, mechanism for collecting one or a plurality of fares from a deposited coin by returning various amounts of change therefor, and a register adapted to record the maximum number of fares which the machine may collect in a single operation, in combination with controlling means operated by said collecting mechanism for actuating said register in accordance with the number of fares collected, said controlling means comprising a collector index, a lever arm, a connecting rod adapted to have one end thereof operatively positioned along said lever at various points with respect to the fulcrum thereof and cam actuated means operated by the collector index for varying at will the position of said connecting rod with respect to said fulcrum.

106. In a change making machine, means for receiving deposited coins of different denominations and means for automatically distributing and stacking said coins in the machine according to the denomination thereof, said means including mechanism for stacking said coins at the bottom of stacks of previously distributed coins of the same denomination.

107. In a change making machine, means for receiving deposited coins of different denominations and means for selectively distributing said coins according to the denomination thereof, in combination with means for stacking certain of said coins from the bottom of a column thereof.

108. A change making machine having a magazine for receiving deposited coins for change making purposes, means for making change, and means for introducing said coins into said magazine thru the bottom thereof.

109. A change making machine having, means for making change and means for utilizing deposited coins for change making purposes comprising, in combination, a magazine in which coins to be utilized are adapted to be stored, and means for introducing said coins into said magazine thru the bottom thereof.

110. In a change making machine, means for receiving deposited coins of different denominations, means for selectively distributing and collecting said coins in the machine according to their denominations, and magazines each adapted to receive coins of the same denomination but different from the coins received by another of said magazines, in combination with means for introducing coins into said magazines thru the bottoms thereof.

111. In a change making machine, means for receiving deposited coins of different denominations, change return mechanism, a plurality of change storage magazines in cooperative relationship with said change return mechanism, and means for actuating said mechanism to eject change coins from said magazines, in combination with means for selectively distributing the coins deposited according to the denominations thereof, and means for introducing deposited coins into said magazines thru the bottom thereof.

112. A change making machine comprising, means for receiving deposited coins of different denominations, change return mechanism, a plurality of change storage magazines in cooperative relationship with said change return mechanism, and means for actuating said change return mechanism to eject change from said magazines, in combination with means for distributing the coins deposited according to the denominations thereof, and means comprising a reciprocating shuttle for introducing deposited coins into the magazines thru the bottom thereof.

113. A change making machine comprising, means for receiving deposited coins of different denominations, a plurality of change magazines and means for depositing said coins according to denomination in said magazines thru the bottoms thereof, in combination with change return mechanism adapted to successively actuate said depositing means and eject change from said magazines.

114. A change making machine comprising, means for receiving deposited coins of different denominations, a plurality of magazines each adapted to respectively receive coins of the same denominations but different from the coins received by another of said magazines, means for introducing coins into said magazines thru the bottoms thereof, and means for distributing said coins among said magazines according to the denomination of said coins, in combination with change return mechanism adapted to successively actuate said introducing means and said distributing means and eject change from said magazines.

115. A change making machine comprising, means for receiving deposited coins of different denominations, a plurality of magazines each adapted to respectively receive coins of the same denomination but different from the coins received by another of said magazines, means for introducing coins into said magazines thru the bottoms thereof, and means for distributing said coins among said magazines according to the denominations of said coins, in combination with change return mechanism adapted to successively actuate said introducing means and said distributing means and eject change from one or more of said magazines.

116. A change making machine comprising means for receiving deposited coins of different denominations, means for ejecting change for the coins deposited, and means for selectively distributing and storing coins of certain denominations for change making, said means comprising a plurality of storage magazines corresponding to the denomination of the coins to be stored therein, in combination with means operated by said ejecting means for introducing coins into said magazines thru openings in the bottoms thereof.

117. A change making machine comprising means for receiving deposited coins of different denominations, means for ejecting change for the coins deposited, and means for selectively distributing and storing certain of the coins deposited, said means comprising storage magazines corresponding to the denomination of the coins to be stored, in combination with means operated by said ejecting means for successively introducing coins into the bottoms of said magazines and thereafter ejecting one or more change coins therefrom.

118. A change making machine comprising means for receiving deposited coins of different denominations, means for ejecting change for the coins deposited, and means comprising storage magazines corresponding respectively to the different denominations of the deposited coins for distributing and storing change coins, in combination with, means operated by said ejecting means for introducing a coin into the bottom of one of said magazines and thereafter ejecting one or more coins from said magazine.

119. In an apparatus of the class described, a slider arranged to control the delivery of change for deposited coins, means for rejecting deposited coins, a counter adapted to record the coins rejected, and a finger normally adapted to operate said slider and also adapted to be longitudinally adjusted to actuate said counter, comprising in combination, means for adjusting said finger longitudinally from slider engaging position to counter engaging position, and means for operating said rejecting means and said finger whereby to actuate said counter and record the rejection of said coin.

120. In an apparatus of the class described, a plurality of sliders arranged to control the delivery of change for deposited coins, means for rejecting at will said coins, a plurality of counters corresponding respectively to coins of different denominations and adapted to record the coins rejected, a finger mounted for lateral movement and normally adapted to operate said sliders, and also adapted to be longitudinally adjusted to actuate one of said counters, and means for shifting said finger laterally to a position corresponding to the denomination of a coin deposited, comprising in combination, means for adjusting said finger longitudinally from slider engaging position to counter engaging position and means for operating said rejecting means and said finger whereby to actuate one of said counters to record the rejection of coins.

121. In an apparatus of the class described, a plurality of sliders arranged to control the delivery of change for deposited coins, means for rejecting said coins at will, a plurality of counters corresponding respectively to coins of different denominations and adapted to record the coins rejected, a finger mounted for lateral movement and normally adapted to operate said sliders, and also adapted to be longitudinally adjusted to actuate one of said counters, and a connecting rod having one end secured to said finger for laterally shifting said finger to a position corresponding to the denomination of a coin deposited, comprising in combination, means for adjusting said finger longitudinally from slider engaging position to counter engaging position, and means for operating said rejecting means and said finger whereby to actuate one of said counters to record the rejection of coins.

122. In an apparatus of the class described, a plurality of sliders arranged to control the delivery of change for deposited coins, means for rejecting said coins, a plurality of counters corresponding respectively to coins of different denominations and adapted to record the coins rejected, a finger mounted for lateral movement and normally adapted to operate said sliders and also adapted to be longitudinally adjusted to actuate one of said counters, and means for shifting said finger laterally to a position corresponding to the denomination of a coin deposited, comprising in combination, means comprising a pushbutton operable from the exterior of the machine for adjusting said finger longitudinally from slider engaging position to counter engaging position, and means for operating said rejecting means, and said finger whereby to actuate one of said counters to record the rejection of coins.

123. A change making machine comprising, means for receiving deposited coins of different denominations, magazines correspondingly respectively to the denominations of the coins deposited for storing change coins, means for introducing coins into said magazines thru the bottom thereof, and change return mechanism in cooperative relationship with the bottom of said magazines for collecting one or a plurality of fares from a deposited coin by returning various amounts of change therefor in combination with, means for actuating said introducing means and said change return mechanism.

124. A change making machine comprising, means for receiving deposited coins of different denominations, magazines corresponding respectively to the denominations of the coins deposited for storing change coins, means for introducing coins into said magazines thru the bottom thereof in combination with, change return mechanism adapted to eject change from said magazines and means for successively actuating said introducing means and said change return mechanism.

125. A change making machine comprising, means for receiving coins of different denominations, magazines corresponding respectively to the different denominations of coins deposited for storing change coins, means comprising a reciprocating shuttle for introducing the coins into said magazines thru the bottom thereof, in combination with change return mechanism in cooperative relationship with the bottom of said magazines for returning various amounts of change for the coins received and means common to the coins of different denominations for actuating said shuttle and said change return mechanism.

126. A change making machine comprising, means for receiving deposited coins of different denominations, magazines corresponding respectively to the denominations of the coins deposited and in which change coins are adapted to be stored, means for loading said magazines with change coins thru openings in the bottoms thereof, said loading means comprising a reciprocating shuttle adapted to push coins edgewise into said magazines, and a rocker mounted on said shuttle for increasing the effective contact area between said shuttle and the coins in combination with change return mechanism in cooperative relationship with the openings in the bottoms of said magazines for ejecting various amounts of change for the coins deposited, and means for successively actuating said loading means and said change return mechanism.

127. A change making machine comprising, means for receiving deposited coins of different denominations, a magazine for storing change coins, means for loading said magazine thru an opening in the bottom thereof, said loading means adapted to push coins edgewise into said magazine, and a rocker mounted on said loading means for increasing the effective contact area between said loading means and said coin, in combination with change return mechanism in cooperative relationship with the opening in the bottom of said magazine and adapted to eject various amounts of change for the coins deposited, and means for actuating said loading means and said change return mechanism.

128. A change making machine comprising, means for receiving deposited coins of different denominations, change return mechanism, a plurality of change receptacles, a plurality of change storage magazines in cooperative relationship with said change return mechanism and means for actuating said change return mechanism to eject change coins from said magazines, in combination with means for selectively distributing and depositing said coins one at a time in said receptacles according to denomination, and means for transferring said coins from said receptacles to the bottom of said magazines.

129. A change making machine comprising, means for receiving deposited coins of different denominations, and means for storing said coins in magazines corresponding respectively to the denominations of the coins deposited, said storing means comprising means for introducing the coins into said magazines thru the bottom thereof, in combination with change return mechanism comprising a reciprocating lever adapted to eject change from one of said magazines, means for successively actuating said storing means and said change return mechanism, and means for varying the number of times said lever is reciprocated in accordance with the amount of change to be returned.

130. A change making machine comprising, means for receiving deposited coins of different denominations and means for storing said coins in magazines corresponding respectively to the denominations of the coins deposited, said storing means comprising means for introducing the coins into said magazines thru openings in the bottoms thereof, in combination with change return mechanism comprising a plurality of reciprocating ejectors adapted to eject change from said magazines, means for successively actuating said storing means and said change return mechanism and means for selectively varying the amount of change returned from said magazines.

131. A change making machine comprising, means for receiving deposited coins of different denominations and mechanism for collecting one or a plurality of fares from a deposited coin by returning various amounts of change therefor, said mechanism comprising, a change coin holder, a reciprocatory coin slide for removing change coins from said holder, in combination with a coin ejector adapted to be actuated by said coin slide for automatically ejecting change coins from said slide.

132. A change making machine comprising, means for receiving deposited coins of different denominations, change return mechanism, a plurality of change receptacles, a chute for each receptacle adapted to conduct deposited coins thereto and discharge them at an angle thereinto, a plug in said receptacle adapted to close the opening to said chute, a plurality of change storage magazines in cooperative relationship with said change return mechanism, means for actuating said change return mechanism to eject change coins from said magazines, means for selectively depositing coins in said receptacles according to denomination, and means for transferring said coins one at a time from said receptacles to the bottom of said magazines, in combination with means for rendering said plug inoperative to close said chute after said transferring means has been operated.

133. In a change making machine, means for receiving deposited coins of different denominations and mechanism for auomatically stacking the coins of a particular denomination in the machine, said mechanism comprising means for depositing the coins of said particular denomination at the bottom of a stack of previously stacked coins of the same denomination.

134. In a change making machine, means for receiving deposited coins of different denominations, means for automatically distributing said coins in the machine according to the denomination thereof, and mechanism for automatically stacking coins of one denomination, said mechanism including means for stacking said coins of one denomination at the bottom of a stack of previously stacked coins of the same denomination.

135. A multiple fare change making machine comprising at least one coin receiving passage, a magazine for change coins, means to eject change coins from the magazine, reciprocating means controlling the ejecting means to eject one or more coins from the magazine for each coin deposited, said reciprocating means having a variable movement of uniform units in extent and reciprocating one unit for each coin ejected from the magazine, means controlled by the deposited coin for determining the number of units to be traversed by the reciprocating means during said coin ejecting movement, and manually controlled means for varying the number of units traversed by the reciprocating means whereby one or more fares may be collected from a deposited coin.

136. A multiple fare change making machine comprising at least one coin receiving passage, a magazine for change coins, means to eject change coins from the magazine, reciprocating means controlling the ejecting means to eject one or more coins from the magazine for each coin deposited, said reciprocating means having a variable movement of uniform units in extent and reciprocating one unit for each coin ejected from the magazine, means controlled by the deposited coin for determining the number of units to be traversed by the reciprocating means during said coin ejecting movement, and manually controlled means for varying the number of coins ejected.

137. A multiple fare change making machine comprising at least one coin receiving passage, a magazine for change coins, means to eject change coins from the magazine, reciprocating means controlling the ejecting means to eject one or more coins from the magazine for each coin deposited, said reciprocating means having a variable movement of uniform units in extent and reciprocating one unit for each coin ejected from the magazine, means controlled by the deposited coin for determining the number of units to be traversed by the reciprocating means during said coin ejecting movement, and a single manually manipulable means for varying the number of coins ejected by the reciprocating means for coins of like denomination.

138. A change making machine comprising means for receiving and gauging coins of different denominations deposited therein, a magazine for coins, and means controlled by the deposited coin of predetermined denomination for conveying said coins from said coin receiving means and stacking the same in the bottom of said magazine.

139. A change making machine comprising means for receiving and gauging coins of different denominations deposited in said machine, a plurality of magazines, and means controlled by the coin denomination for conveying said coins from said coin receiving means to and stacking the same in the bottom of the respective magazines.

140. A change making machine comprising means for receiving and gauging coins of different denominations deposited in said machine, a magazine for coins, means controlled by the coin denomination for conveying deposited coins from said coin receiving means to and stacking the same in the bottom of said magazine, and means for discharging the requisite amount of change from said magazine.

141. A change making machine comprising means for receiving and gauging coins of different denominations deposited in said machine, magazines for coins, means controlled by the deposited coin denomination for conveying deposited coins from said coin receiving means to and stacking the same in the bottom of its respective magazines, and means for discharging the requisite amount of change from said magazine.

142. A change making machine comprising means for receiving coins of different denominations deposited in said machine, a magazine for coins, and means for conveying coins from said coin receiving means to the bottom of and stacking the same in said magazine, and means for utilizing the deposited coins in said magazine for change making.

143. A change making machine comprising a magazine for receiving deposited coins, means for conveying the deposited coins to the bottom of and stacking the same in said magazine, and means for ejecting the lowermost coin or coins in said stack for change making.

144. A change making machine comprising a common chute for receiving deposited coins of various denominations, a magazine for receiving deposited coins, means for conveying deposited coins to the bottom of and stacking the same in said magazine, and means for ejecting the lowermost coin or coins in said stack for change making.

145. A fare collecting machine comprising one or more coin receiving receptacles, a pair of magazines for deposited coins of different denominations, means for conveying a deposited coin to its respective receptacle, a single means for the pair of magazines for projecting the deposited coin from the receptacles into its respective magazine, and means to eject the lowermost coin or coins in said magazines for change making.

146. A fare collecting machine comprising one or more coin receiving receptacles, a pair of magazines for deposited coins of different denominations, means for conveying a deposited coin to its respective receptacle, a single means for the pair of magazines for projecting the deposited coin from the receptacle into the bottom of the respective magazine, and means to eject the lowermost coin or coins in said magazines for change making.

147. A fare collecting machine comprising one or more coin receiving receptacles, a pair of magazines for deposited coins of different denominations, means for conveying a deposited coin to its respective receptacle, a reciprocating shuttle between the pair of magazines for projecting the deposited coin from the receptacle into its respective magazine, and means to eject the lowermost coin or coins in said magazines for change making.

148. A change making machine comprising a coin classifier, means movable longitudinally in said classifier until it engages the coin deposited, a counter for each denomination of coin deposited, means controlled by the coin engaging position of the movable means to operate the respective counter of the deposited coin.

149. A change making machine comprising a coin classifier, means movable longitudinally in said classifier until it engages the coin deposited, a change coin magazine, ejecting means for the magazine, and means controlled by the position of the movable means for ejecting change coins dependent upon the denomination of the deposited coin.

150. A change making machine comprising a coin classifier, positioning means whose position is controlled by the denomination of coin in the classifier, a movable means engaged by the positioning means whose extent or lack of movement is controlled by the position of the positioning means, a change coin magazine, ejector mechanism for said magazine controlled by the movement of the movable means for determining the change coins ejected, and means for stacking deposited coin of predetermined denomination in the change magazine.

151. A change making machine comprising a coin classifier, positioning means whose position is controlled by the denomination of coin in the classifier, a movable means engaged by the positioning means whose extent or lack of movement is controlled by the position of the positioning means, a change coin magazine, ejector mechanism for said magazine controlled by the movement of the movable means for determining the change coins ejected, means controlled by the deposited coin of predetermined value for conveying the coin adjacent the coin magazine and means to insert the coin into the magazine.

152. A change making machine comprising a coin classifier, positioning means whose position is controlled by the denomination of coin in the classifier, a movable means engaged by the positioning means whose extent or lack of movement is controlled by the position of the positioning means, change coin magazines, ejector mechanisms for said magazines controlled by the movement of the movable means for determining the change coins ejected from one or more magazines and means controlled by the deposited coin for stacking the coin in its respective magazine.

153. A change making machine comprising a coin classifier, positioning means whose position is controlled by the denomination of coin in the classifier, a movable means engaged by the positioning means whose extent or lack of movement is controlled by the position of the positioning means, change coin magazines, ejector mechanism for said magazines controlled by the movement of the movable means for determining the change coins ejected from one or more magazines, means controlled by the deposited coin for conveying the coin adjacent its respective coin magazine, and means to insert the coin into its respective magazine.

154. A multiple fare change making machine comprising a plurality of selectively used coin receiving passages, a pair of magazines for deposited coins of different denominations, means for conveying the deposited coins through certain of said passages to positions adjacent to the magazines, means independent of the aforesaid means for stacking the deposited coin into its respective magazine, and means to eject the lowermost coin or coins in said magazines for change making.

155. A multiple fare change making machine comprising a plurality of selectively used coin receiving passages, a pair of magazines for receiving deposited coins of different denominations, means for conveying the deposited coins through certain of said passages to positions adjacent the bottom of the magazines, means common to the magazines for stacking the deposited coin in the bottom of the respective magazines and means to eject the lowermost coin or coins in said magazines for change making.

156. A multiple fare change making machine comprising a plurality of selectively used coin receiving passages, a pair of magazines for deposited coins of different denominations, means for conveying the deposited coins through certain of said passages to positions adjacent to the magazines, a reciprocating shuttle between the pair of magazines for stacking the deposited coin in its respective magazine and means to eject the lowermost coin or coins in said magazines for change making.

157. A multiple fare change making machine comprising a plurality of selectively used coin receiving passages, a pair of magazines for deposited coins of different denominations, means for conveying the deposited coins through certain of said passages to positions adjacent to the magazines, a reciprocating shuttle between the pair of magazines for stacking a deposited coin in its respective magazine, said shuttle inserting a coin in the bottom of one magazine in one direction of reciprocation and inserting a coin in the bottom of the other magazine upon the return reciprocation of the shuttle, and means to eject the lowermost coin or coins in said magazines for change making.

158. A multiple fare change making machine comprising at least one coin receiving passage, a magazine for change coins, change coin ejecting means, reciprocating means driving the ejecting means to eject one or more coins from the magazine for each coin deposited in said passage, said reciprocating means adapted to have a variable movement of uniform units in extent and to reciprocate one unit for each coin ejected from the magazine.

159. A multiple fare change making machine comprising at least one coin receiving passage, a magazine for change coins, change coin ejecting means, reciprocating means driving the ejecting means to eject one or more coins from the magazine for each coin deposited in said passage, said reciprocating means adapted to have a variable movement of uniform units in extent and to reciprocate one unit for each coin ejected from the magazine and means controlled by the deposited coin for determining the number of coins ejected from the magazine.

160. A multiple fare collecting machine comprising a single chute for receiving the deposited coins, a passageway common to all of the coins leading from said chute to enable the coins to be examined and directed therefrom into operative position in the machine, manually actuated coin controlled means for ejecting a change coin or coins controlled by any particular coin deposited, a single means for varying at the will of the operator the fraction returned of any particular coin deposited, and automatically actuated means for utilizing a plurality of denominations of coins deposited for change making.

161. A multiple fare collecting machine comprising a single chute for receiving the deposited coins of different denominations, means for ejecting a change coin or coins controlled by deposited coins of any denomination, in combination with means co-operating with the aforesaid means for ejecting a plurality of denominations of coins deposited for change making, and a single means for varying at the will of the operator the fraction returned of any particular coin deposited.

162. A multiple fare collecting machine comprising a single chute for receiving the deposited coins of different denominations, means for ejecting a change coin or coins controlled by deposited coins of different sizes, a single counter, and means for automatically registering on said counter the total number of fares collected by the machine, in combination with means for ejecting a plurality of coins of different denominations deposited for change making, and a single means for varying at the will of the operator the fraction returned of any particular coin deposited.

163. A multiple fare collecting machine comprising a common means for receiving coins of different sizes deposited therein, means for stacking a plurality of the denominations of the coins deposited for change making, means controlled by the size of the particular coin deposited for returning from said stacks the requisite amount of change, and means for varying at the will of the operator the fraction returned of any particular coin deposited.

164. A multiple fare collecting machine comprising means for receiving coins of different sizes deposited in the machine, means automatically controlled by the machine for depositing a plurality of the denominations of coins into a suitable receptacle provided for that purpose, means controlled by the sizes of a plurality of coins for stacking the same in the machine, means for ejecting the stacked coins for change making, and a single means for varying at the will of the operator the fraction returned of any particular coin deposited.

165. A multiple fare change making machine adapted for collecting a plurality of fares from coins of higher denominations deposited in said machine, comprising a compartment for receiving deposited coins, a magazine for coins, means for conveying coins from said compartment to the bottom of and stacking the same in said magazine, means for varying at the will of the operator the number of fares to be collected, and means for ejecting the deposited coins in said magazine for change making.

166. A multiple fare change making machine, comprising a magazine for receiving deposited coins, means for conveying the deposited coins to the bottom of and stacking the same in said magazine, means for varying at the will of the operator the number of fares to be collected, and means for ejecting the lowermost coin or coins in said stack for change making.

167. A multiple fare change making machine, comprising a common chute for receiving deposited coins of various denominations, a magazine for receiving deposited coins, means for conveying deposited coins from the chute to the bottom of and stacking the same in said magazine, means for varying at the will of the operator the number of fares to be collected, and means for ejecting the lowermost coin or coins in said stack for change making.

168. A multiple fare collecting machine comprising a passage for receiving and gauging the deposited coin, one of more change magazines, means for directing a deposited coin into its respective change magazine, ejecting means for ejecting change coins from said magazines and controlled by the coin deposited, and a single means for all the coins deposited controlling the ejecting means for varying at the will of the operator the number of change coins ejected from the magazine.

169. A multiple fare change making machine comprising a receptacle for receiving coins of any desired denomination deposited in the machine, a magazine for coins, means for conveying said coins from the receptacle and stacking the same in the magazine, means to eject the coins from the magazine, and a single means for controlling the number of coins ejected.

170. A multiple fare collecting machine comprising a passage for receiving the deposited coin, means for gauging the coin, one or more change magazines, means for directing a deposited coin into its respective magazine, ejecting means for ejecting change coins from the magazines and controlled by the position taken by the coin in the gauging means, and a single means for all the coins deposited controlling the ejecting means for varying at the will of the operator the number of change coins ejected from the magazine.

171. A multiple fare collecting machine comprising a passage for receiving the deposited coin, means in said passage for gauging the coin, one or more change magazines, means for directing a deposited coin into its respective change magazine, ejecting means for ejecting change coins from said magazines and controlled by the gauging means, and a single means for all the coins deposited controlling the ejecting means for varying at the will of the operator the number of change coins ejected from the magazine.

172. A multiple fare collecting machine comprising a single chute for receiving the deposited coins of different denominations, means for ejecting a change coin or coins controlled by deposited coins of any denomination in combination with means cooperating with the aforesaid means for ejecting a plurality of denominations of coins deposited for change making, a single means for varying at the will of the operator the fraction returned of any particular coin deposited, and an error means to reset the single means.

173. A change making machine comprising a change return mechanism, and means for receiving a coin into operative position in the machine, said means comprising arresting means for preventing the insertion of a second coin into said receiving means, in combination with mechanism including a deposited coin for actuating said change return mechanism, said actuating mechanism comprising means for rendering said arresting means inoperative so as to enable another coin to be received into operative position in the machine.

174. A change making machine comprising a passageway common to the various coins deposited and for receiving the same into operative position in the machine, manually actuated coin controlled means having a single coin controlled element for collecting a predetermined number of fares from the different coins deposited, and setting mechanism having a single actuating means for selectively varying the number of fares to be collected from the coins deposited.

175. A change making machine comprising a common passageway for receiving into operative position therein the various coins deposited in the machine, and a single means for all the coins deposited and controlled by the diameter of the coin deposited for collecting a fare therefrom, in combination with setting means having a single actuating means for collecting a predetermined number of fares from the coin deposited.

176. A change making machine comprising a passageway common to the various coins deposited and for receiving the same into operative position therein, a single means for all the coins deposited and controlled by the diameter of the coin for collecting a fare from each coin deposited, and setting mechanism having a single actuating means for collecting a predetermined number of fares from each coin deposited.

177. A change making machine comprising a common passageway for receiving into operative position the various coins deposited in the machine, and a single manually actuated means for all the coins deposited and controlled by the diameter of the coin deposited for collecting a fare therefrom, in combination with setting means having a single actuating means for selectively varying the number of fares to be collected from the coin deposited.

178. A change making machine comprising a common passageway for receiving into operative position therein the various coins deposited in the machine, and a single means for all the coins deposited and controlled by the diameter of the coin deposited for collecting a fare therefrom, in combination with setting means having a single actuating means for collecting and registering a predetermined number of fares from the coin deposited.

179. A change making machine comprising a passageway common to the various coins deposited and for receiving the same into operative position therein, a single means for all the coins deposited and controlled by the diameter of the coin for collecting a fare from each coin deposited, and setting mechanism having a single actuating means for collecting and registering a predetermined number of fares from each coin deposited.

180. A change making machine comprising a common passageway for receiving into operative position the various coins deposited in the machine, and manually actuated means having a single coin controlled element controlled by the diameter of the coin deposited for collecting a fare therefrom in combination with setting means having a single actuating means for selectively varying and for controlling the registering of the number of fares to be collected from the coin deposited.

181. A change making machine comprising a passageway common to coins of different sizes for receiving the same into operative position in the machine, means having a coin controlled element common to all the coins deposited for collecting a fare from each coin deposited, and setting mechanism common to the different sizes of coins for selectively varying and for registering the number of fares to be collected from each coin deposited.

182. A change making machine comprising a common passageway for normally receiving into operative position therein coins of different sizes, and means common to the different sizes of coins and controlled by the diameter of the same for collecting a predetermined number of fares therefrom, in combination with common means cooperating with the aforesaid means for registering the number of fares collected.

183. A change making machine comprising a common passageway for receiving into operative position therein the various coins deposited in the machine, and means, having a single element controlled by the diameter of the coin deposited, for collecting a fare therefrom, in combination with setting means having a single actuating means for collecting a predetermined number of fares from the coin deposited, and means for utilizing coins deposited for change making.

184. A change making machine comprising a passageway common to the various coins deposited and for receiving the same into operative position therein, means having a single element controlled by the diameter of the coin, for collecting a fare from each coin deposited, and setting mechanism having a single actuating element for collecting a predetermined number of fares from each coin deposited, and means for utilizing coins deposited for change making.

185. A change making machine comprising a common passageway for receiving into operative position therein the various coins deposited in the machine, and means having a single element controlled by the diameter of the coin deposited, for collecting a fare therefrom, in combination with setting means having a single actuating means for collecting and registering a predetermined number of fares from the coin deposited, and means for utilizing coins deposited for change making.

186. A change making machine comprising means for normally collecting a fare from coins of different diameters, common means for selectively varying the number of fares to be collected, a counter, means controlled by said common means for registering on said counter the number of fares collected by said machine, and means for utilizing coins deposited for change making.

187. In a change making machine, mechanism for collecting a predetermined number of fares from the coins deposited comprising means for receiving the coins into operative position in the machine, movable means for returning one or a plurality of change coins, means for moving said movable means, and means for controlling the extent of the movement of said movable means proportionate to the number of change coins to be returned.

188. A change making machine comprising means for receiving coins of different denominations into operative position in the machine, in combination with means common to the different sizes of coins deposited and controlled thereby for returning an amount of change equal to the difference between the value of the particular coin deposited and the value of the fare or of the charge made, and means having a single actuating element also common to the different sizes of coins deposited for varying the amount of change to be returned from any particular coin deposited in accordance with the desired number of fares to be collected or charges to be made.

189. In a change making machine, a common passageway for admitting coins of different denominations into operative position in the machine, coin ejecting mechanism, and means for actuating said ejecting mechanism, including mechanism variably controlled by the different denominations of coins deposited whereby an element is successively operated through a rectilinear movement and a movement normal thereto for ejecting an amount of change equal to the difference between the amount of the coin deposited and the fare to be collected.

190. A change making machine comprising a passageway common to the various coins deposited and for receiving the same into operative position in the machine, manually actuated coin controlled means, having a single coin controlled element for all coins deposited, for collecting a predetermined number of fares from the different coins deposited, and setting mechanism having a single actuating means for all the coins deposited, for varying the number of fares to be collected from the coins deposited, in combination with means for utilizing coins deposited for change making.

191. A change making machine comprising a common passageway for receiving into operative position the various coins deposited in the machine, and manually actuated means having a single coin controlled element controlled by the diameter of the coin deposited for collecting a fare therefrom, in combination with setting means having a single actuating element for varying the number of fares to be collected from the coin deposited, and means for utilizing coins deposited for change making.

192. A change making machine comprising a passageway common to the various coins deposited and for receiving the same into operative position therein, means having a single element controlled by the diameter of the coin for collecting a fare from each coin deposited, and setting mechanism having a single actuating element for collecting and controlling the registering of a predetermined number of fares from each coin deposited, in combination with means for utilizing coins deposited for change making.

193. A change making machine comprising a common passageway for receiving into operative position the various coins deposited in the machine, manually actuated means having a single element controlled by the diameter of the coin deposited for collecting a fare therefrom, and means for registering the fares collected, in combination with setting means having a single actuating means for varying and for controlling the registering of the number of fares to be collected from the coin deposited, and means for utilizing coins deposited for change making.

194. A change making machine comprising a common passageway for receiving into operative position therein coins of different sizes, fare collecting means common to the different sizes of coins and comprising a single manipulable member for determining the number of fares to be collected from each coin, and means common to the different sizes of coins and controlled by the diameter of the same and by the fare collecting means for collecting a predetermined number of fares therefrom, in combination with means cooperating with the aforesaid means and with the fare collecting means for registering the number of fares collected.

195. A change making machine comprising means common to the different sizes of coins deposited for collecting a predetermined number of fares therefrom, fare collecting means common to the different sizes of coins for determining the number of fares to be collected from each coin, a counter, and a single variably movable manually manipulable means cooperating with the aforesaid means and with the fare collecting means for registering upon said counter the total number of fares collected by the machine, and means automatically actuated as a result of the operation of the machine, for resetting said common means to normal position.

196. A change making and fare collecting machine comprising means for normally collecting a fare from coins of different sizes, in combination with means, comprising a single manually manipulable element, for selectively setting said collecting means to collect additional fares from said coins, and means, automatically actuated as a result of the operation of the machine, for resetting said manually manipulable element to normal position.

197. A change making and fare collecting machine comprising means for normally collecting a fare from coins of different sizes, means for recording the fares collected, in combination with means comprising a single manually manipulable element for simultaneously and selectively setting said collecting means and said recording means to respectively collect and record additional fares from said coins.

198. A change making and fare collecting machine comprising means for normally collecting a fare from coins of different denominations, in combination with means, comprising a single manually manipulable element, for selectively setting said collecting means to collect two or more fares from said coins, and means, automatically actuated as a result of the operation of the machine to collect two or more fares, for resetting said manually manipulable element to normal position.

199. A change making and fare collecting machine comprising means for normally collecting a fare from coins of different denominations, and means for recording the fare collected, in combination with means comprising a single manually manipulable element for simultaneously and selectively setting said collecting means and said recording means to respectively collect and record two or more fares from said coins.

200. In a fare collecting and change making machine, mechanism for ejecting change for deposited coins of different sizes, and mechanism for utilizing coins deposited for change making, said second mentioned mechanism comprising in combination, a receptacle in the machine for receiving coins, a tubular member adapted to hold a stack of coins in cooperative relationship with said ejecting mechanism and from which stack said mechanism is adapted to eject change, and means actuated by the ejecting mechanism for conveying the coins from said receptacle to said stack.

201. A change making machine comprising means for normally collecting a fare from coins of different diameters, common means for selectively varying the number of fares to be collected, means automatically actuated as a result of the operation of the machine for resetting said common means to normal position, a counter, and means controlled by said common means for registering on said counter the number of fares collected by said machine.

202. In apparatus of the class described a coin deposit passageway arranged to receive one coin of a range of denominations, means for classifying said coin, means for selectively collecting and distributing said coin according to denomination, or for rejecting said coin, and means for preventing deposit of a coin in said deposit passageway until a coin previously deposited has been cleared.

203. In apparatus of the class described, a coin deposit passageway arranged to receive one coin of a range of denominations, means for classifying said coin, means for selectively collecting said coin and distributing it in accordance with its denomination, and returning the proper amount of change in accordance with the amount to be collected by the machine and the denomination of coin deposited, or rejecting said coin, and means for preventing deposit of a coin in said deposit passageway until a coin previously deposited therein has been cleared.

204. In apparatus of the class described, a coin deposit passageway arranged to receive one coin of a range of denominations, means for classifying said coin, means for selectively controlling the amount to be collected by the machine from any coin deposited, means for selectively collecting said coin and distributing it in accordance with its denomination, and returning the proper amount of change in accordance with the amount to be collected and the denomination of the coin deposited, or rejecting said coin, and means for preventing deposit of a coin in said deposit passageway until a coin previously deposited therein has been cleared.

205. In apparatus of the class described, a coin deposit passageway arranged to receive one coin of a range of denominations, means for classifying said coin, means for selectively controlling the amount to be collected by the machine from any coin deposited, means for selectively collecting the said coin and distributing it to a coin magazine for later return as change or to a general receptacle, in accordance with its denomination and returning the proper amount of change in accordance with the amount to be collected and the denomination of the coin deposited, or rejecting said coin, and means for preventing deposit of a coin in said deposit passageway until a coin previously deposited therein has been cleared.

206. In apparatus of the class described, a coin deposit passageway arranged to receive a coin of a range of denominations, means for selectively collecting said coin and returning the proper change in accordance with the amount to be collected and the denomination of the coin deposited or rejecting said coin, means for registering the amount collected and means for registering the number and denomination of coins rejected.

207. In apparatus of the class described, a coin deposit passageway arranged to receive a coin of a range of denominations, means for selectively collecting said coin and returning the proper change in accordance with the amount to be collected and the denomination of the coin deposited, or rejecting said coin, means for registering the amount collected, means for registering the number and denomination of coins rejected, and means for preventing deposit of a coin in the coin deposit passageway until a coin previously deposited has been cleared.

208. In apparatus of the class described, a coin deposit passageway arranged to receive a coin of a range of denominations, means for collecting said coin and returning the proper change in accordance with the amount to be collected and the denomination of coin deposited, coin actuated means for preventing deposit of a coin in the coin deposit passage until a coin previously deposited has been cleared, and means for preventing operation of the machine after such clearing until a coin is deposited.

209. In apparatus of the class described, a coin deposit passageway arranged to receive one coin of a range of denominations, means for blocking said passageway against deposit of coins therein, said means being resiliently biased to blocking position, means normally extending into said passageway for maintaining said blocking means out of blocking position and arranged to be pushed out of normal position to release said blocking means by partial insertion of a coin in said deposit passageway, and means for connecting said blocking means and said maintaining means rigidly together with a relatively small amount of lost motion.

210. In apparatus of the class described, a coin deposit passageway arranged to receive one coin of a range of denominations, a shutter pivotally mounted for rotation into position to block said passageway against deposit of coins therein, and said shutter being resiliently biased to blocking position, a trigger pivotally mounted for movement across said passageway into position to maintain said shutter out of blocking position, but adapted to be moved from maintaining position by insertion of a coin in said passageway, and a rigid link having a small amount of lost motion connected to said trigger and said shutter.

211. In apparatus of the class described, a coin deposit passageway arranged to receive one coin of a range of denominations, means for blocking said passageway against deposit of coins therein, said means being resiliently biased to blocking position, means normally extending into said passageway for maintaining said blocking means out of blocking position and arranged to be pushed out of normal position to release said blocking means, by partial insertion of a coin in said deposit passageway, means for connecting said blocking means and said maintaining means rigidly together with a relatively small amount of lost motion, and means associated with said blocking means for preventing clearing operation of the machine until said blocking means is released to blocking position.

212. In apparatus of the class described, a coin deposit passageway arranged to receive one coin of a range of denominations, means for blocking said passageway against deposit of coins therein, said means being resiliently biased to blocking position, means normally extending into said passageway for maintaining said blocking means out of blocking position and arranged to be pushed out of normal position to release said blocking means, by partial insertion of a coin in said deposit passageway, means for connecting said blocking means and said maintaining means rigidly together with a relatively small amount of lost motion, means associated with said blocking means for preventing clearing operation of the machine until said blocking means is released to blocking position, and means for resetting said blocking means out of blocking position after the clearing operation of the machine.

213. In apparatus of the class described, a coin deposit passageway arranged to receive one coin of a range of denominations, a shutter pivotally mounted for rotation into position to block said passageway against deposit of coins therein, said shutter being resiliently biased to blocking position, a trigger mounted for movement across said passageway into position to maintain said shutter out of blocking position, but adapted to be moved from maintaining position by insertion of a coin in said passageway, a rigid connection having a small amount of lost motion between said shutter and said trigger, a slider arranged for reciprocation during the clearing operation of the machine, and interlocking means associated with said slider and said shutter for preventing clearing of the machine when said shutter is out of blocking position.

214. In apparatus of the class described, a coin deposit passageway arranged to receive one coin of a range of denominations, a shutter pivotally mounted for rotation into position to block said passageway against deposit of coins therein, said shutter being resiliently biased to blocking position, a trigger mounted for movement across said passageway into position to maintain said shutter out of blocking position, but adapted to be moved from maintaining position by insertion of a coin in said passageway, a rigid connection having a small amount of lost motion between said shutter and said trigger, a slider arranged for reciprocation during the clearing operation of the machine, interlocking means associated with said slider and said shutter for preventing clearing of the machine when said shutter is out of blocking position, and additional interlocking means associated with said slider and said shutter for locking said shutter in blocking position until released by upward movement of said slider during the clearing operation.

215. In apparatus of the class described, a coin deposit passageway arranged to receive one coin of a range of denominations, a shutter pivotally mounted for rotation into position to block said passageway against deposit of coins therein, said shutter being resiliently biased to blocking position, a trigger mounted for movement across said passageway into position to maintain said shutter out of blocking position, but adapted to be moved from maintaining position by insertion of a coin in said passageway, a rigid connection having a small amount of lost motion between said shutter and said trigger, a slider arranged for reciprocation during the clearing operation of the machine and interlocking means associated with said slider and said shutter for preventing clearing of the machine when said shutter is out of blocking position, said interlocking means being arranged to cooperate with said slider to reset said blocking means out of blocking position at the termination of the clearing operation.

216. In apparatus of the class described, a coin deposit passageway arranged to receive one coin of a range of denominations, a shutter pivotally mounted for rotation into position to block said passageway against deposit of coins therein, said shutter being resiliently biased to blocking position, a trigger mounted for movement across said passageway into position to maintain said shutter out of blocking position, but adapted to be moved from maintaining position by insertion of a coin in said passageway, a rigid connection having a small amount of lost motion between said shutter and said trigger, a slider arranged for reciprocation during the clearing operation of the machine, interlocking means associated with said slider and said shutter for preventing clearing of the machine when said shutter is out of blocking position, said interlocking means being arranged to cooperate with said slider to reset said blocking means out of blocking position at the termination of the clearing operation, and additional interlocking means associated with said slider and said shutter for locking said shutter in blocking position until released by upward movement of said slider during the clearing operation.

217. In apparatus of the class described, a pair of spaced classifier jaws having cooperating oppositely disposed faces provided with surfaces for supporting coins of predetermined different denominations in predetermined different positions regardless of wear on the coin, a feeler finger arranged to traverse the coin-holding space between said jaws along a predetermined path and to be angularly deflected by impact with a coin therein, means for rigidly supporting said finger in deflected position during clearing of the machine, and mechanism controlled by the position of said feeler finger.

218. In apparatus of the class described, a pair of spaced classifier jaws having cooperating oppositely disposed faces provided with surfaces for separating coins of predetermined different denominations in predetermined different positions regardless of wear on the coin, a feeler finger arranged to traverse the coin-holding space between said jaws along a predetermined path and to be deflected angularly by impact with a coin therein, means for rigidly supporting said finger in deflected position during clearing of the machine, said means comprising a plate having a notch in position to receive said finger at any point at which it may be deflected and mechanism controlled by the position of said feeler finger.

219. In apparatus of the class described, a pair of spaced classifier jaws having cooperating oppositely disposed faces provided with surfaces for supporting coins of predetermined different denominations in predetermined different positions regardless of wear on the coin, a feeler finger arranged to traverse the coin-holding space between said jaws along a predetermined path, and to be angularly deflected by impact with a coin therein, means for rigidly supporting said finger in deflected position during clearing of the machine, mechanism controlled by the position of said feeler finger, and means for releasing the coin from said classifier jaws after said finger is angularly deflected by said impact.

220. In apparatus of the class described, a pair of spaced classifier jaws having cooperating oppositely disposed faces provided with surfaces for separating coins of predetermined different denominations in predetermined different positions regardless of wear on the coin, a feeler finger arranged to traverse the coin-holding space between said jaws along a predetermined path and to be deflected angularly by impact with a coin therein, means for rigidly supporting said finger in deflected position during clearing of the machine, said means comprising a plate having a notch in position to receive said finger at any point at which it may be deflected, mechanism controlled by the position of said feeler finger, and means for separating said jaws to release the coin from said classifier after said finger is received in said notch.

221. In apparatus of the class described, means for automatically classifying deposited coins, a feeler finger arranged to be moved into a predetermined different position in accordance with the denomination of coin in said classifier, change delivery mechanism for delivering a varying quantity of change, and means for controlling the amount of change delivered in accordance with the final position of said feeler finger determined by the coin in said classifier.

222. In apparatus of the class described, means for automatically classifying deposited coins, a feeler finger arranged to be moved into a predetermined different position in accordance with the denomination of coin in said classifier and to be locked therein during clearing, change delivery mechanism for delivering a varying quantity of change and comprising a master change control finger arranged for movement in different positions to cause delivery of different amounts of change and means for regulating the position of said change control finger in accordance with the final position of said feeler finger.

223. In apparatus of the class described, a coin classifier, a feeler finger arranged to be moved into a predetermined different position in accordance with the denomination of coin in said classifier and to be locked therein during clearing, change delivery mechanism for delivering a varying quantity of change and comprising a master change control finger arranged for vertical movement in a plurality of spaced parallel paths to cause delivery of different amounts of change, and means for moving said change control finger laterally to a point determined by the final position of said feeler finger.

224. In apparatus of the class described, a coin classifier, a feeler finger arranged to be moved into a predetermined different position in accordance with the denomination of coin in said classifier, and to be locked therein during clearing, change delivery mechanism for delivering a varying quantity of change and comprising a vertical movable slide having laterally spaced portions of different length, and arranged to be driven by a master change control finger arranged for vertical movement to drive said slide and for lateral movement to control the amount of change to be delivered, and means for laterally positioning said change control finger in accordance with the final position of said feeler finger.

225. In apparatus of the class described, a coin classifier, a feeler finger arranged to be moved into a predetermined different position in accordance with the denomination of coin in said classifier, and to be locked therein during clearing, change delivery mechanism for delivering a varying quantity of change and comprising a vertically movable slide having laterally spaced portions of different length, and arranged to be driven by a master change control finger arranged for vertical movement to drive said slide and for lateral movement to control the amount of change to be delivered, and means for laterally positioning said change control finger in accordance with the final position of said feeler finger, said means comprising means for simultaneously driving said feeler finger and said master change control finger, and comprising a yielding and resilient, stress-transmitting member.

226. In apparatus of the class described, a coin classifier, a passageway for returned coins, means for passing cleared coins to said passageway, means for setting said passing means preliminary to the operation of the passing means to return cleared coins, a collection counter normally operatively connected to the clearing mechanism, so as to register collections, and means for rendering said counter unresponsive to operation of the clearing mechanism to clear a coin to be rejected.

227. In apparatus of the class described, a coin classifier, a passageway for returned coins, means for passing cleared coins to said passageway, means for setting said passing means preliminary to the operation of the passing means to return cleared coins, a collection counter normally operatively connected to the clearing mechanism so as to register collections, and means for rendering said counter unresponsive to operation of the clearing mechanism to clear a coin to be rejected, and means for registering the number of coins rejected.

228. In apparatus of the class described, a coin classifier, a passageway for returned coins, means for passing cleared coins to said passageway, means for setting said passing means preliminary to the operation of the passing means to return cleared coins, a collection counter normally operatively connected to the clearing mechanism so as to register collections, and means for rendering said counter unresponsive to operation of the clearing mechanism to clear a coin to be rejected, and means for registering the number of coins of each denomination rejected.

229. In a change making machine having change return mechanism, a coin box, a chute for receiving and conducting deposited coins to said coin box, a change coin magazine, a passageway leading from said chute for conveying change coins to a position adjacent said magazine, means for stacking said change coins in the bottom of said magazine, in combination with gate means for deflecting change coins from said chute to said passageway and means actuated by the change coins in said magazines for rendering said gate means inoperative when the magazine is full of said coins.

230. In a change making machine having a change return mechanism, a coin box adapted to receive deposited coins and a change coin magazine, in combination with means for normally conveying change coins to and stacking the same in the bottom of said magazine, and means controlled by the change coins in said magazine for directly conveying deposited coins into said coin box.

In testimony whereof I affix my signature.

CHARLES E. CHALMERS.